(12) United States Patent
Cuson et al.

(10) Patent No.: US 11,096,845 B2
(45) Date of Patent: Aug. 24, 2021

(54) WHEELCHAIR SUSPENSION

(71) Applicant: Invacare Corporation, Elyria, OH (US)

(72) Inventors: Robert L. Cuson, LaGrange, OH (US); Robert A. Bekoscke, Medina, OH (US); Daniel J. Stothard, North Olmsted, OH (US)

(73) Assignee: Invacare Corporation, Elyria, OH (US)

(*) Notice: Subject to any disclaimer, the term of this patent is extended or adjusted under 35 U.S.C. 154(b) by 665 days.

(21) Appl. No.: 15/918,730

(22) Filed: Mar. 12, 2018

(65) Prior Publication Data

US 2018/0360678 A1    Dec. 20, 2018

Related U.S. Application Data

(60) Continuation of application No. 14/690,678, filed on Apr. 20, 2015, now Pat. No. 9,913,768, which is a
(Continued)

(51) Int. Cl.
*A61G 5/10* (2006.01)
*A61G 5/04* (2013.01)
*A61G 5/06* (2006.01)

(52) U.S. Cl.
CPC ............. *A61G 5/10* (2013.01); *A61G 5/04* (2013.01); *A61G 5/042* (2013.01); *A61G 5/043* (2013.01);
(Continued)

(58) Field of Classification Search
CPC ...... A61G 5/10; A61G 5/1089; A61G 5/1078; A61G 5/04; A61G 5/042; A61G 5/043; A61G 5/06; B60G 2300/24; Y10S 180/907
See application file for complete search history.

(56) References Cited

U.S. PATENT DOCUMENTS

| X865514 | 9/1907 | Mullenmeister |
| 1,116,086 A | 11/1914 | Lewis |
| (Continued) | | |

FOREIGN PATENT DOCUMENTS

| CA | 2254372 | 5/2000 |
| CN | 1138825 A | 12/1996 |
| (Continued) | | |

OTHER PUBLICATIONS

Notice of Allowance from U.S. Appl. No. 10/762,977 dated Feb. 23, 2006.
(Continued)

*Primary Examiner* — Bryan A Evans
(74) *Attorney, Agent, or Firm* — Calfee, Halter & Griswold LLP

(57) ABSTRACT

Wheeled vehicles, such as wheelchairs, that are adapted to traverse obstacles are provided. The wheeled vehicles include a frame, drive wheels, front anti-tip wheels positioned in front of the drive wheels and rear anti-tip wheels positioned behind the drive wheels. One exemplary vehicle includes front anti-tip wheels supported by rigid arms that are fixed to the frame and drive assemblies that are independently suspended from the frame. Another exemplary vehicle includes a linkage that links the front and rear anti-tip wheels, such that movement of one of the front or rear anti-tip wheel relative to the frame causes movement of the other wheel relative to the frame.

16 Claims, 37 Drawing Sheets

Related U.S. Application Data division of application No. 12/900,548, filed on Oct. 8, 2010, now Pat. No. 9,010,470.

(60) Provisional application No. 61/250,222, filed on Oct. 9, 2009.

(52) U.S. Cl.
CPC .............. *A61G 5/06* (2013.01); *A61G 5/1078* (2016.11); *A61G 5/1089* (2016.11); *B60G 2300/24* (2013.01); *Y10S 180/907* (2013.01)

(56) References Cited

U.S. PATENT DOCUMENTS

| | | |
|---|---|---|
| 1,151,414 A | 8/1915 | Steinbach |
| 1,773,254 A | 9/1930 | Becker |
| 1,973,627 A | 9/1934 | Harter |
| 2,398,211 A | 4/1946 | du Pont |
| 2,427,482 A | 9/1947 | Wiessman |
| 2,767,995 A | 10/1956 | Stout |
| 2,949,153 A | 8/1960 | Hickman |
| 2,986,200 A | 5/1961 | Nobile |
| 3,104,112 A | 9/1963 | Crail |
| 3,174,176 A | 3/1965 | Olson |
| 3,191,990 A | 6/1965 | Rugg et al. |
| 3,195,670 A | 7/1965 | Dunn |
| 3,210,092 A | 10/1965 | Kraus et al. |
| 3,282,605 A | 11/1966 | Nihlean et al. |
| 3,314,672 A | 4/1967 | Persson |
| 3,506,079 A | 4/1970 | Madler et al. |
| 3,573,877 A | 4/1971 | Locke |
| 3,580,591 A | 5/1971 | Coffey |
| 3,589,700 A | 6/1971 | Ruet et al. |
| 3,592,282 A | 7/1971 | Soileau |
| 3,602,522 A | 8/1971 | Zamotin |
| 3,618,968 A | 11/1971 | Greer |
| 3,627,157 A | 12/1971 | Blatchly |
| 3,661,228 A | 5/1972 | Glasser |
| 3,664,450 A | 5/1972 | Udden et al. |
| 3,682,462 A | 8/1972 | Papousek |
| 3,689,103 A | 9/1972 | Meulendyk |
| 3,709,313 A | 1/1973 | James |
| 3,848,883 A | 11/1974 | Breacain |
| 3,862,751 A | 1/1975 | Schwaller |
| 3,876,012 A | 4/1975 | Regier |
| 3,881,773 A | 5/1975 | Rodaway |
| 3,883,153 A | 5/1975 | Singh et al. |
| 3,893,529 A | 7/1975 | Karchak, Jr. et al. |
| 3,901,337 A | 8/1975 | Cragg |
| 3,901,527 A | 8/1975 | Danziger et al. |
| 3,905,437 A | 9/1975 | Kaiho et al. |
| 3,917,312 A | 11/1975 | Rodaway |
| 3,930,551 A | 1/1976 | Cragg |
| 3,952,822 A | 4/1976 | Udden et al. |
| 3,953,054 A | 4/1976 | Udden et al. |
| 3,976,152 A | 8/1976 | Bell |
| 4,078,817 A | 3/1978 | Ferguson et al. |
| 4,108,449 A | 8/1978 | Rhodes |
| 4,118,020 A | 10/1978 | Myers |
| 4,119,163 A | 10/1978 | Ball |
| 4,128,137 A | 12/1978 | Booth |
| 4,190,263 A | 2/1980 | Powers |
| 4,222,449 A | 9/1980 | Feliz |
| 4,245,847 A | 1/1981 | Knott |
| 4,247,125 A | 1/1981 | Rayment |
| 4,264,085 A | 4/1981 | Volin |
| 4,310,167 A | 1/1982 | McLaurin |
| 4,333,681 A | 6/1982 | Nelson |
| 4,337,958 A | 7/1982 | Witt et al. |
| 4,341,278 A | 7/1982 | Meyer |
| 4,375,295 A | 3/1983 | Volin |
| 4,387,325 A | 6/1983 | Klimo |
| 4,405,142 A | 9/1983 | Whetstine |
| 4,436,320 A | 3/1984 | Brudermann et al. |
| 4,437,678 A | 3/1984 | Schultz |
| 4,455,029 A | 6/1984 | Taylor |
| 4,455,031 A | 6/1984 | Hosaka |
| 4,456,295 A | 6/1984 | Francu |
| 4,483,407 A | 11/1984 | Iwamoto et al. |
| 4,500,102 A | 2/1985 | Haury et al. |
| 4,513,832 A | 4/1985 | Engman |
| 4,515,385 A | 5/1985 | Christian |
| 4,542,918 A | 9/1985 | Singleton |
| 4,545,593 A | 10/1985 | Farnam |
| 4,545,616 A | 10/1985 | Booth |
| 4,556,229 A | 12/1985 | Bihler et al. |
| 4,565,385 A | 1/1986 | Morford |
| 4,592,570 A | 6/1986 | Nassiri |
| RE32,242 E | 9/1986 | Minnebraker |
| 4,618,155 A | 10/1986 | Jayne |
| 4,641,848 A | 2/1987 | Ayers |
| 4,655,471 A | 4/1987 | Peek |
| 4,687,068 A | 8/1987 | Pagett |
| 4,720,223 A | 1/1988 | Neights et al. |
| 4,721,321 A | 1/1988 | Haury et al. |
| 4,721,322 A | 1/1988 | Hawkins |
| 4,730,842 A | 3/1988 | Summers et al. |
| 4,736,983 A | 4/1988 | Furbee |
| 4,759,418 A | 7/1988 | Goldenfeld et al. |
| 4,763,910 A | 8/1988 | Brandli et al. |
| 4,805,712 A | 2/1989 | Singleton |
| 4,805,925 A | 2/1989 | Haury et al. |
| 4,811,966 A | 3/1989 | Singleton |
| 4,823,900 A | 4/1989 | Farnam |
| 4,826,194 A | 5/1989 | Sakita |
| 4,840,394 A | 6/1989 | Bickler |
| 4,861,056 A | 8/1989 | Duffy, Jr. et al. |
| 4,862,983 A | 9/1989 | Kreft |
| 4,886,294 A | 12/1989 | Nahachewski |
| 4,905,972 A | 3/1990 | Scowen |
| 4,919,441 A | 4/1990 | Marier et al. |
| 4,926,952 A | 5/1990 | Farman |
| 4,934,626 A | 6/1990 | Kimura |
| 4,951,766 A | 8/1990 | Basedow et al. |
| 4,962,942 A | 10/1990 | Barnett et al. |
| 4,967,864 A | 11/1990 | Boyer et al. |
| 4,989,890 A | 2/1991 | Lockard et al. |
| 5,020,816 A | 6/1991 | Mulholland |
| 5,042,607 A | 8/1991 | Falkenson et al. |
| 5,044,647 A | 9/1991 | Patterson |
| 5,044,648 A | 9/1991 | Knapp |
| 5,076,390 A | 12/1991 | Haskins |
| 5,076,602 A | 12/1991 | Robertson et al. |
| 5,113,959 A | 5/1992 | Mastov et al. |
| 5,123,495 A | 6/1992 | Littlejohn et al. |
| 5,125,468 A | 6/1992 | Coker |
| 5,137,295 A | 8/1992 | Peek |
| 5,156,226 A | 10/1992 | Boyer et al. |
| 5,176,393 A | 1/1993 | Robertson et al. |
| 5,180,025 A | 1/1993 | Yeh et al. |
| 5,180,275 A | 1/1993 | Czech et al. |
| 5,181,133 A | 1/1993 | Lipton |
| 5,181,733 A | 1/1993 | Tague |
| 5,183,133 A | 2/1993 | Roy et al. |
| 5,197,559 A | 3/1993 | Garin, III et al. |
| 5,203,610 A | 4/1993 | Miller |
| 5,209,509 A | 5/1993 | Gay et al. |
| 5,222,567 A | 6/1993 | Broadhead et al. |
| 5,228,709 A | 7/1993 | Kao |
| 5,230,522 A | 7/1993 | Gehlsen et al. |
| 5,241,876 A | 9/1993 | Mathis |
| 5,248,007 A | 9/1993 | Watkins et al. |
| 5,290,055 A | 3/1994 | Treat, Jr. |
| 5,294,141 A | 3/1994 | Mentessi et al. |
| 5,297,021 A | 3/1994 | Koerlin et al. |
| 5,301,964 A | 4/1994 | Papac |
| 5,316,328 A | 5/1994 | Bussinger |
| 5,341,533 A | 8/1994 | Seitz |
| 5,351,774 A | 10/1994 | Okamoto |
| 5,366,037 A | 11/1994 | Richey |
| 5,372,211 A | 12/1994 | Wilcox et al. |
| 5,403,031 A | 4/1995 | Gottschalk et al. |
| 5,419,571 A | 5/1995 | Vaughan |

(56) References Cited

U.S. PATENT DOCUMENTS

| | | |
|---|---|---|
| 5,435,404 A | 7/1995 | Garin, III |
| 5,447,317 A | 9/1995 | Gehlsen et al. |
| 5,464,271 A | 11/1995 | McFarland |
| 5,467,838 A | 11/1995 | Wu |
| 5,482,261 A | 1/1996 | Ortega |
| 5,485,140 A | 1/1996 | Bussin |
| 5,489,139 A | 2/1996 | McFarland |
| 5,513,875 A | 5/1996 | Tahara et al. |
| 5,518,081 A | 5/1996 | Thibodeau |
| 5,531,284 A | 7/1996 | Okamoto |
| 5,540,297 A | 7/1996 | Meier |
| 5,562,172 A | 10/1996 | Mick |
| 5,564,512 A | 10/1996 | Scheulderman |
| 5,575,348 A | 11/1996 | Goertzen et al. |
| 5,611,555 A | 3/1997 | Vidal |
| 5,628,377 A | 5/1997 | LaGloan |
| 5,701,122 A | 12/1997 | Canedy |
| 5,727,802 A | 3/1998 | Garven, Jr. et al. |
| 5,727,809 A | 3/1998 | Ordelman et al. |
| 5,762,155 A | 6/1998 | Scheulderman |
| 5,772,048 A | 6/1998 | Sopcisak |
| 5,772,226 A | 6/1998 | Bobichon |
| 5,772,237 A | 6/1998 | Finch et al. |
| D397,645 S | 9/1998 | Schaffner |
| 5,833,248 A | 11/1998 | Eguchi |
| 5,848,658 A | 12/1998 | Pulver |
| 5,851,018 A | 12/1998 | Curran et al. |
| 5,851,019 A | 12/1998 | Gill et al. |
| 5,853,059 A | 12/1998 | Goertzen et al. |
| D404,693 S | 1/1999 | Schaffner et al. |
| 5,855,387 A | 1/1999 | Gill et al. |
| 5,899,475 A | 5/1999 | Verhaeg et al. |
| 5,904,214 A | 5/1999 | Lin |
| 5,921,532 A | 7/1999 | Pierce et al. |
| 5,944,131 A | 8/1999 | Schaffner et al. |
| 5,954,351 A | 9/1999 | Koschinat |
| 5,957,474 A | 9/1999 | Mundy et al. |
| 5,964,473 A | 10/1999 | Degonda et al. |
| 5,988,304 A | 11/1999 | Behrents |
| 5,996,716 A | 12/1999 | Montiglio et al. |
| 6,003,624 A | 12/1999 | Jorgensen et al. |
| 6,029,763 A | 2/2000 | Swisher |
| 6,041,876 A | 3/2000 | Pulver et al. |
| 6,047,979 A | 4/2000 | Kraft et al. |
| 6,062,600 A | 5/2000 | Kamen et al. |
| 6,068,280 A | 5/2000 | Torres |
| 6,070,898 A | 6/2000 | Dickie et al. |
| 6,073,951 A | 6/2000 | Jindra et al. |
| 6,079,698 A | 6/2000 | Patterson et al. |
| 6,079,725 A | 6/2000 | Lazaros |
| D429,665 S | 8/2000 | Dickie |
| 6,095,271 A | 8/2000 | Dickie et al. |
| 6,129,165 A | 10/2000 | Schaffner et al. |
| 6,131,679 A | 10/2000 | Pulver et al. |
| 6,135,222 A | 10/2000 | Furukawa |
| 6,161,856 A | 12/2000 | Peterson |
| 6,168,178 B1 | 1/2001 | Garven, Jr. et al. |
| 6,176,335 B1 | 1/2001 | Schaffner et al. |
| 6,179,076 B1 | 1/2001 | Fernie et al. |
| 6,186,252 B1 | 2/2001 | Schaffner et al. |
| 6,196,343 B1 | 3/2001 | Strautnieks |
| 6,199,647 B1 | 3/2001 | Schaffner et al. |
| 6,206,119 B1 | 3/2001 | Wu |
| 6,209,670 B1 | 4/2001 | Fernie et al. |
| 6,217,114 B1 | 4/2001 | Degonda |
| 6,225,894 B1 | 5/2001 | Kyrtsos |
| 6,234,263 B1 | 5/2001 | Boivin et al. |
| 6,234,507 B1 | 5/2001 | Dickie et al. |
| 6,241,275 B1 | 6/2001 | Slagerman |
| 6,264,218 B1 | 7/2001 | Slagerman |
| 6,279,927 B1 | 8/2001 | Nishihira et al. |
| 6,312,000 B1 | 11/2001 | Pauls et al. |
| 6,322,089 B1 | 11/2001 | Dantele et al. |
| 6,341,657 B1 | 1/2002 | Hopely et al. |
| 6,341,671 B1 | 1/2002 | Ebersole |
| 6,347,688 B1 | 2/2002 | Hall et al. |
| 6,357,793 B1 | 3/2002 | Dickie et al. |
| 6,375,209 B1 | 4/2002 | Schlangen |
| 6,394,738 B1 | 5/2002 | Springer |
| 6,405,816 B1 | 6/2002 | Kamen et al. |
| 6,425,597 B1 | 7/2002 | Peterson |
| 6,428,020 B1 | 8/2002 | Steadman |
| 6,428,029 B1 | 8/2002 | Barclay |
| 6,429,541 B2 | 8/2002 | Takenaka et al. |
| 6,454,286 B1 | 9/2002 | Hosino |
| 6,460,641 B1 | 10/2002 | Kral |
| 6,460,869 B1 | 10/2002 | Tremouilles |
| 6,494,474 B1 | 12/2002 | Kramer, Jr. |
| 6,533,305 B1 | 3/2003 | Falk |
| 6,533,306 B2 | 3/2003 | Watkins |
| 6,543,564 B1 | 4/2003 | Kamen et al. |
| 6,543,798 B2 | 4/2003 | Schaffner et al. |
| 6,554,086 B1 | 4/2003 | Goertzen et al. |
| 6,568,030 B1 | 5/2003 | Watanabe et al. |
| 6,581,711 B1 | 6/2003 | Tuluie |
| 6,588,799 B1 | 7/2003 | Sanchez |
| 6,601,863 B1 | 8/2003 | Mentessi et al. |
| 6,640,916 B2 | 11/2003 | Schaffner et al. |
| 6,684,969 B1 | 2/2004 | Flowers et al. |
| 6,688,437 B2 | 2/2004 | Usherovich |
| 6,702,306 B1 | 3/2004 | Ockwell |
| 6,712,369 B2 | 3/2004 | Wu |
| 6,715,845 B2 | 4/2004 | Kamen et al. |
| D491,115 S | 6/2004 | Taylor |
| 6,776,430 B2 | 8/2004 | White et al. |
| 6,851,711 B2 | 2/2005 | Goertzen et al. |
| 6,857,490 B2 | 2/2005 | Quigg |
| 6,923,278 B2 | 8/2005 | Mulhern et al. |
| 6,923,280 B2 | 8/2005 | Goertzen et al. |
| 6,935,448 B2 | 8/2005 | Goertzen et al. |
| 6,938,923 B2 | 9/2005 | Mulhern et al. |
| 7,021,641 B2 | 4/2006 | Wu |
| 7,040,429 B2 | 5/2006 | Molnar et al. |
| 7,055,634 B2 | 6/2006 | Molnar |
| 7,066,290 B2 | 6/2006 | Fought |
| 7,083,195 B2 | 8/2006 | Goertzen et al. |
| 7,100,716 B2 | 9/2006 | Engels et al. |
| 7,175,193 B2 | 2/2007 | Wu |
| 7,219,755 B2 | 5/2007 | Goertzen et al. |
| 7,219,924 B2 | 5/2007 | Mulhern et al. |
| 7,232,008 B2 | 6/2007 | Levi et al. |
| 7,234,554 B2 | 6/2007 | Mulhern et al. |
| 7,264,272 B2 | 9/2007 | Mulhern et al. |
| 7,273,118 B2 | 9/2007 | Huang |
| 7,293,801 B2 | 11/2007 | Bertrand et al. |
| 7,316,282 B2 | 1/2008 | Mulhern et al. |
| 7,370,876 B2 | 5/2008 | Hsu et al. |
| 7,374,002 B2 | 5/2008 | Fought |
| 7,380,824 B2 | 6/2008 | Chen et al. |
| 7,389,835 B2 | 6/2008 | Mulhern et al. |
| 7,398,842 B2 | 7/2008 | Fontecchio et al. |
| 7,413,038 B2 | 8/2008 | Mulhern et al. |
| 7,461,897 B2 | 12/2008 | Kruse et al. |
| 7,472,767 B2 | 1/2009 | Molnar |
| 7,490,683 B2 | 2/2009 | Schaffner |
| 7,506,709 B2 | 3/2009 | Kiwak et al. |
| 7,516,984 B2 | 4/2009 | Tang |
| 6,196,343 C1 | 7/2009 | Strautnieks |
| 7,556,109 B2 | 7/2009 | Chen et al. |
| 7,597,163 B2 | 10/2009 | Goertzen et al. |
| 7,735,591 B2 | 6/2010 | Puskar-Pasewicz et al. |
| 7,766,106 B2 | 8/2010 | Puskar-Pasewicz et al. |
| 7,775,307 B2 | 8/2010 | Cheng |
| 7,828,310 B2 | 11/2010 | Vreeswijk et al. |
| D632,229 S | 2/2011 | Kruse |
| 7,882,909 B2 | 2/2011 | Pearlman et al. |
| 7,896,394 B2 | 3/2011 | Jackson et al. |
| 8,037,953 B2 | 10/2011 | Puskar-Pasewicz et al. |
| 8,113,531 B2 | 2/2012 | Zhou |
| 8,118,321 B2 | 2/2012 | Hunziker et al. |
| 8,172,015 B2 | 5/2012 | Molnar |
| 8,172,016 B2 | 5/2012 | Goertzen et al. |
| 8,177,257 B2 | 5/2012 | Dugas et al. |
| 8,186,463 B2 | 5/2012 | Hunziker et al. |

(56) References Cited

U.S. PATENT DOCUMENTS

| | | |
|---|---|---|
| 8,210,556 B2 | 7/2012 | Zhou et al. |
| 8,272,461 B2 | 9/2012 | Bekoscke et al. |
| 8,286,738 B2 | 10/2012 | Cheng |
| 8,297,388 B2 | 10/2012 | Lindenkamp et al. |
| 8,573,341 B2 | 11/2013 | Fought et al. |
| 8,794,359 B2 | 8/2014 | Bekoske |
| 8,910,975 B2 | 12/2014 | Bekoscke et al. |
| 9,010,470 B2 | 4/2015 | Cuson et al. |
| 9,308,143 B2 | 4/2016 | Bekoscke |
| 9,346,335 B2 | 5/2016 | Bekoscke et al. |
| 9,370,455 B2 | 6/2016 | Molnar |
| 9,603,762 B2 | 3/2017 | Bekoscke |
| 9,987,177 B2 | 6/2018 | Goertzen et al. |
| 10,265,229 B2 | 4/2019 | Bekoscke et al. |
| 2001/0011613 A1 | 8/2001 | Schaffner et al. |
| 2001/0013437 A1 | 8/2001 | Husted et al. |
| 2002/0023787 A1 | 2/2002 | Kamen et al. |
| 2002/0088657 A1 | 7/2002 | Brett et al. |
| 2002/0175027 A1 | 11/2002 | Usherovich |
| 2003/0030243 A1 | 2/2003 | Engels |
| 2003/0075365 A1 | 4/2003 | Fought |
| 2003/0122332 A1 | 7/2003 | Engels et al. |
| 2003/0168264 A1 | 9/2003 | Goertzen et al. |
| 2003/0168265 A1 | 9/2003 | Goertzen et al. |
| 2003/0201632 A1 | 10/2003 | Mulhern et al. |
| 2003/0205420 A1 | 11/2003 | Mulhern et al. |
| 2004/0004342 A1 | 1/2004 | Mulhern et al. |
| 2004/0032119 A1 | 2/2004 | Tran et al. |
| 2004/0060748 A1 | 4/2004 | Molnar |
| 2004/0084230 A1 | 5/2004 | Grymko et al. |
| 2004/0094944 A1 | 5/2004 | Goertzen et al. |
| 2004/0144580 A1 | 7/2004 | Wu |
| 2004/0150204 A1 | 8/2004 | Goertzen et al. |
| 2004/0159476 A1 | 8/2004 | Molnar |
| 2004/0168839 A1 | 9/2004 | Wu |
| 2004/0188152 A1 | 9/2004 | Schaffner |
| 2004/0232683 A1 | 11/2004 | Mulhern |
| 2004/0262859 A1 | 12/2004 | Turturiello |
| 2005/0034903 A1 | 2/2005 | Wu |
| 2005/0077694 A1 | 4/2005 | Levi et al. |
| 2005/0077714 A1 | 4/2005 | Mulhern et al. |
| 2005/0077715 A1 | 4/2005 | Mulhern et al. |
| 2005/0127631 A1 | 6/2005 | Schaffner |
| 2005/0151360 A1 | 7/2005 | Bertrand et al. |
| 2005/0206124 A1 | 9/2005 | Levi |
| 2005/0206149 A1 | 9/2005 | Mulhern et al. |
| 2005/0225040 A1 | 10/2005 | Goertzen et al. |
| 2005/0225041 A1 | 10/2005 | Longino |
| 2006/0021806 A1 | 2/2006 | Goertzen et al. |
| 2006/0076747 A1 | 4/2006 | Pauls et al. |
| 2006/0076748 A1 | 4/2006 | Pauls et al. |
| 2006/0082117 A1 | 4/2006 | Turturiellox |
| 2006/0086554 A1 | 4/2006 | Jackson et al. |
| 2006/0201723 A1 | 9/2006 | Hsu et al. |
| 2006/0213705 A1 | 9/2006 | Molnar |
| 2006/0244249 A1 | 11/2006 | Goertzen et al. |
| 2006/0249317 A1 | 11/2006 | Fought |
| 2006/0255581 A1 | 11/2006 | Goertzen et al. |
| 2006/0266565 A1 | 11/2006 | Fontecchio et al. |
| 2007/0018418 A1 | 1/2007 | Huang |
| 2007/0023209 A1 | 2/2007 | Wu |
| 2007/0039766 A1 | 2/2007 | Jackson et al. |
| 2007/0080003 A1 | 4/2007 | Koerlin et al. |
| 2007/0095582 A1 | 5/2007 | Stuijt et al. |
| 2007/0107955 A1 | 5/2007 | Puskar-Pasewicz et al. |
| 2007/0181353 A1 | 8/2007 | Puskar-Pasewicz et al. |
| 2007/0209848 A1 | 9/2007 | Tang |
| 2008/0053720 A1 | 3/2008 | Chen et al. |
| 2008/0083573 A1 | 4/2008 | Tseng |
| 2008/0087481 A1 | 4/2008 | Grymko et al. |
| 2008/0157513 A1 | 7/2008 | Cheng |
| 2008/0208394 A1 | 8/2008 | Fought |
| 2009/0091092 A1 | 4/2009 | Molnar |
| 2009/0121532 A1 | 5/2009 | Kruse et al. |
| 2009/0145677 A1* | 6/2009 | Zhou ............... A61G 5/043 180/65.1 |
| 2009/0295119 A1 | 12/2009 | Bloswich |
| 2010/0004820 A1 | 1/2010 | Bekoscke et al. |
| 2010/0013172 A1 | 1/2010 | Goertzen |
| 2010/0065346 A1 | 3/2010 | Porcheron |
| 2010/0084209 A1 | 4/2010 | Bekoscke et al. |
| 2010/0102529 A1 | 4/2010 | Lindenkamp et al. |
| 2010/0301576 A1 | 12/2010 | Dugas et al. |
| 2011/0083913 A1 | 4/2011 | Cuson et al. |
| 2011/0215540 A1 | 9/2011 | Hunziker |
| 2012/0217070 A1 | 8/2012 | Goertzen |
| 2012/0217713 A1 | 8/2012 | Molnar |
| 2012/0299262 A1* | 11/2012 | Bekoscke ............ A61G 5/1078 280/124.133 |
| 2013/0207364 A1 | 8/2013 | Bekoscke et al. |
| 2015/0196438 A1 | 7/2015 | Mulhern |
| 2016/0287456 A1 | 10/2016 | Bekoscke et al. |
| 2016/0318367 A1* | 11/2016 | Bekoscke ............ A61G 5/1089 |
| 2018/0028379 A1* | 2/2018 | Bekoscke ............ A61G 5/045 |
| 2020/0155387 A1* | 5/2020 | Bekoscke ............ A61G 5/06 |
| 2020/0206047 A1 | 7/2020 | Goertzen |
| 2020/0276065 A1 | 9/2020 | Mulhern |

FOREIGN PATENT DOCUMENTS

| | | |
|---|---|---|
| CN | 1839779 A | 10/2006 |
| CN | 101636139 A | 1/2010 |
| DE | 152186 | 9/1903 |
| DE | 2256934 | 5/1973 |
| DE | 1399822 | 8/1977 |
| DE | 19806500 | 3/2002 |
| DE | 10136368 | 5/2003 |
| DE | 10136369 | 5/2003 |
| EP | 18101 | 10/1980 |
| EP | 127929 | 12/1984 |
| EP | 268960 | 6/1988 |
| EP | 312969 | 4/1989 |
| EP | 339500 | 11/1989 |
| EP | 369791 | 5/1990 |
| EP | 419085 | 3/1991 |
| EP | 445171 | 9/1991 |
| EP | 511113 | 10/1992 |
| EP | 677285 | 10/1995 |
| EP | 702945 | 3/1996 |
| EP | 829247 | 3/1998 |
| EP | 841052 | 5/1998 |
| EP | 908165 | 4/1999 |
| EP | 908166 | 4/1999 |
| EP | 927551 | 7/1999 |
| EP | 988848 | 3/2000 |
| EP | 1147969 | 10/2001 |
| EP | 1279391 | 1/2003 |
| EP | 1279392 | 1/2003 |
| EP | 1434545 | 7/2004 |
| EP | 1479362 | 11/2004 |
| EP | 1513479 | 3/2005 |
| EP | 1522292 | 4/2005 |
| EP | 1522295 | 4/2005 |
| EP | 1582189 | 10/2005 |
| EP | 2226048 | 9/2010 |
| EP | 2111204 | 4/2011 |
| FR | 27505 | 7/1924 |
| FR | 2215054 | 8/1974 |
| FR | 2399822 | 3/1979 |
| FR | 2455886 | 12/1980 |
| FR | 2498925 | 8/1982 |
| FR | 2738147 | 7/1997 |
| FR | 2749502 | 12/1997 |
| FR | 2858764 | 2/2005 |
| GB | 151915 | 10/1920 |
| GB | 154369 | 12/1920 |
| GB | 265885 | 2/1927 |
| GB | 474349 | 10/1937 |
| GB | 841175 | 7/1960 |
| GB | 1503910 | 3/1978 |
| GB | 2040237 | 8/1980 |
| GB | 2061197 | 5/1981 |
| GB | 2141980 | 1/1985 |

(56) References Cited

FOREIGN PATENT DOCUMENTS

| | | |
|---|---|---|
| GB | 2224980 | 5/1990 |
| JP | 57-186589 | 11/1982 |
| JP | 03-011978 | 12/1989 |
| JP | 04-158864 | 6/1992 |
| JP | 07-328073 | 12/1995 |
| JP | 08-038552 | 2/1996 |
| JP | 410248877 | 9/1998 |
| JP | 11059506 | 3/1999 |
| JP | 2000 102569 | 4/2000 |
| JP | 2000 288032 | 10/2000 |
| JP | 2001 070347 | 3/2001 |
| JP | 2001 104391 | 4/2001 |
| JP | 2001 212181 | 8/2001 |
| JP | 2001 258948 | 9/2001 |
| JP | 2001 327545 | 11/2001 |
| JP | 2002 143223 | 5/2002 |
| JP | 2002 165841 | 6/2002 |
| JP | 2004 202264 | 7/2004 |
| SE | 431393 | 11/1983 |
| WO | 82/00445 | 2/1982 |
| WO | 84/04451 | 11/1984 |
| WO | 87/06205 | 4/1987 |
| WO | 89/06117 | 7/1989 |
| WO | 90/05515 | 5/1990 |
| WO | 90/06097 | 6/1990 |
| WO | 92/09463 | 6/1992 |
| WO | 93/24342 | 12/1993 |
| WO | 94/13241 | 6/1994 |
| WO | 94/15567 | 7/1994 |
| WO | 96/15752 | 5/1996 |
| WO | 97/44206 | 11/1997 |
| WO | 98/46184 | 10/1998 |
| WO | 99/17700 | 4/1999 |
| WO | 00/08910 | 2/2000 |
| WO | 00/09356 | 2/2000 |
| WO | 00/12040 | 3/2000 |
| WO | 00/54718 | 9/2000 |
| WO | 00/66060 | 11/2000 |
| WO | 01/01914 | 1/2001 |
| WO | 02/34190 | 5/2002 |
| WO | 03/030800 | 4/2003 |
| WO | 03/034969 | 5/2003 |
| WO | 03/049664 | 6/2003 |
| WO | 03/101364 | 12/2003 |
| WO | 04/16451 | 2/2004 |
| WO | 04/37569 | 5/2004 |
| WO | 07/11668 | 1/2007 |
| WO | 07/22387 A2 | 2/2007 |
| WO | 07/79346 | 7/2007 |
| WO | 08/124953 | 3/2008 |
| WO | 08/84462 | 7/2008 |
| WO | 08/97879 | 8/2008 |
| WO | 08/100759 | 8/2008 |

OTHER PUBLICATIONS

Notice of Allowance from U.S. Appl. No. 11/077,483 dated Aug. 9, 2007.
Office Action from U.S. Appl. No. 11/145,477 dated Mar. 28, 2006.
Office Action from U.S. Appl. No. 11/145,477 dated Sep. 8, 2006.
Response from U.S. Appl. No. 11/145,477 dated Dec. 12, 2006.
Notice of Allowance from U.S. Appl. No. 11/145,477 dated Jan. 8, 2007.
U.S. Patent Office Action from U.S. Appl. No. 11/209,001 dated Jul. 25, 2006.
Office Action from U.S. Appl. No. 11/209,001 dated Nov. 8, 2006.
Notice of Abandonment from U.S. Appl. No. 11/209,001 dated Jul. 10, 2007.
Office Action from U.S. Appl. No. 11/429,687 dated Apr. 9, 2008.
Response from U.S. Appl. No. 11/429,687 dated Jun. 17, 2008.
Notice of Allowance from U.S. Appl. No. 11/429,687 dated Sep. 8, 2008.
Office Action from U.S. Appl. No. 11/472,509 dated May 4, 2007.
Interview Summary from U.S. Appl. No. 11/472,509 dated Aug. 3, 2007.
Response from U.S. Appl. No. 11/472,509 dated Aug. 3, 2007.
Office Action from U.S. Appl. No. 11/472,509 dated Nov. 30, 2007.
Response from U.S. Appl. No. 11/472,509 dated Apr. 30, 2008.
Response from U.S. Appl. No. 11/472,509 dated Jul. 22, 2008.
Office Action from U.S. Appl. No. 11/472,509 dated May 15, 2009.
Response from U.S. Appl. No. 11/472,509 dated Nov. 15, 2009.
Office Action from U.S. Appl. No. 11/472,509 dated Sep. 2, 2010.
Response from U.S. Appl. No. 11/472,509 dated Jan. 3, 2011.
Notice of Appeal and Pre-Appeal Brief Request and Statement from U.S. Appl. No. 11/472,509, filed Mar. 2, 2011.
Interview Summary from U.S. Appl. No. 11/472,509, filed Mar. 2, 2011.
Non-Final Rejection from U.S. Appl. No. 11/472,509 dated Mar. 3, 2011.
Pre-Brief Appeal Conference Decision from U.S. Appl. No. 11/472,509 dated Mar. 23, 2011.
Non-Final Rejection from U.S. Appl. No. 11/472,509 dated Apr. 7, 2011.
Response from U.S. Appl. No. 11/472,509 dated Aug. 8, 2011.
Notice of Allowance from U.S. Appl. No. 11/472,509 dated Nov. 14, 2011.
Supplemental amendment identifying cross-references to related applications from U.S. Appl. No. 11/472,509 dated Aug. 7, 2012.
Notice of Allowance from U.S. Appl. No. 11/472,509 dated Oct. 19, 2012.
Office Action from U.S. Appl. No. 11/474,834 dated Mar. 21, 2007.
Response from U.S. Appl. No. 11/474,834 dated Jun. 28, 2007.
Office Action from U.S. Appl. No. 11/474,834 dated Sep. 20, 2007.
Response from U.S. Appl. No. 11/474,834 dated Nov. 20, 2007.
Notice of Allowance from U.S. Appl. No. 11/474,834 dated Jan. 17, 2008.
Office Action from U.S. Appl. No. 11/490,899 dated Nov. 8, 2006.
Office Action from U.S. Appl. No. 11/490,899 dated Jan. 9, 2007.
Response from U.S. Appl. No. 11/490,899 dated Mar. 20, 2007.
Notice of Allowance from U.S. Appl. No. 11/490,899 dated Jun. 6, 2007.
Notice of Allowance from U.S. Appl. No. 11/490,899 dated Feb. 10, 2009.
Notice of Allowance from U.S. Appl. No. 11/490,899 dated May 26, 2009.
Office Action from U.S. Appl. No. 12/118,099 dated Oct. 28, 2010.
Response to Office Action from U.S. Appl. No. 12/118,099 dated Apr. 25, 2011.
Notice of Allowance from U.S. Appl. No. 12/118,099 dated Jul. 28, 2011.
Notice of Allowance from U.S. Appl. No. 12/118,099 dated Jul. 3, 2013.
Office Action from U.S. Appl. No. 12/330,554 dated Apr. 11, 2011.
Response to Office Action from U.S. Appl. No. 12/330,554 dated Jul. 11, 2011.
Notice of Allowance from U.S. Appl. No. 12/330,554 dated Sep. 23, 2011.
Notice of Allowance from U.S. Appl. No. 12/330,554 dated Nov. 15, 2011.
"All-Terrain Wheelchair, Designer's Corner", Design News, Feb. 24, 1992, cover page and p. 54.
"Big Bounder Power Wheelchair: Conventional "Tubular" Style Frame"; http://www.wheelchair.com/bigbounderpage.htm, Accessed on the World Wide Web on Dec. 17, 2003, p. 1-4.
"Frog Legs: Smooth Ride Ahead"; http://www.froglegsinc.com/index.php, Accessed on the World Wide Web on Dec. 17, 2003, p. 105.
"Frog Legs Tires", http://mdtap.org/tt/1999.09/prod.html, Accessed on the World Wide Web on Dec. 17, 2003, p. 1-3.
Golden Technologies advertisement video http://youtu.be/TyEvrmoaHME.
"Invacare pronto M7I jr. Power Wheelchair Manual"; Accessed on the World Wide Web on Dec. 17, 2003.
"Invacare Storm Series TDX Power Wheelchairs Manual"; Accessed on the World Wide Web on Dec. 17, 2003, p. 1-24.

(56) References Cited

OTHER PUBLICATIONS

"Invacare Xterra Series GT Power Wheelchair Manual", Accessed on the World Wide Web on Dec. 17, 2003, p. 1-4.
"Jazzy 1122", Pride Mobile Products Corp., Accessed on the World Wide Web on Dec. 17, 2003, p. 1-2.
"Jazzy 1133", Pride Mobile Products Corp., Accessed on the World Wide Web on Dec. 17, 2003, p. 1-2.
"Jazzy 1170XL", Pride Mobile Products Corp., Accessed on the World Wide Web on Dec. 17, 2003, p. 1-2.
Kauzlarich, J. et al., "Wheelchair Caster Shimmy II: Damping", Journal for Rehabilitative Research and Development, May/Jun. 2000, vol. 37, No. 3, pp. 305-314.
McLauren, C., "Future Developments—Current Directions in Wheelchair Research", Journal for Rehabilitative Research and Development, Jul./Aug. 1985, vol. 42, No. 4 Suppl. No. 2, pp. 88-99.
"Bruno Independent Living Aids ISP 9001 Certified"; http://www.bruno.com/power_chairs.htm, Accessed on the World Wide Web on Dec. 17, 2003, p. 1-5.
"Top End Terminator SS Sports Wheelchair", http://phc-online.com/terminator_ss.htm, Accessed on the World Wide Web on Dec. 17, 2003, p. 1-5.
"TransActions of the Institute of Measurement and Control", The British Library of Science Technology and Business, vol. 24, Nov. 5, 2002, 15 pgs.
M.J. Lawn, et al. "Modeling of a Stair-Climbing Wheelchair Mechanism with High Single-Step Capability", IEEE TransActions on Neutral Systems and Rehabilitation Engineering, vol. 11, No. 3, Sep. 2003, pp. 323-332.
Quickie G-424 User Instruction Manual & Warranty, 930484 Rev. A (27 sheets) (alleged date not later than 2000).
10 photographs (8.5 x 11) of Quickie G-424 Wheelchair obtained Nov. 24, 2004.
Sunrise Medical, Inc., Power Products Parts Manual, 930307 Rev. K (264 double sided sheets), Jul. 2004. (Note: various dates are alleged therein based on wheelchair products listed including the Quickie G-424).
Permobil Chairman HD3 Owner's Manual dated May 2003, 52 pages.
Permobil C400 Power Wheelchair, Owner's Manual, version 6, 2010, Permobil AB, Sweden, 100 pgs.
Permobil C500 Power Wheelchair, Owner's Manual, version 6, 2010, Permobil AB, Sweden, 100 pgs.
Pride Mobility, Jet 3 Ultra Owner's Manual dated Jun. 2007, 43 pages.
Quantum Series Owner's Manual dated Feb. 2009, 43 pages.
"Bike" magazine article, "Ten Underrated Products You Probably Don't Own but Maybe Should" (in part), Jan. 1994, pp. 82 and 83.
"Bike" magazine article "Softride Contour", Mar. 1994, pp. 64-65.
"Mountain Bike Action", picture and caption describing "Body Shock", Jan. 1994, pp. 48.
International Search Report from PCT/US98/07543 dated Aug. 19, 1998.
International Search Report from PCT/US01/42656 dated Jan. 14, 2003.
International Search Report from PCT/US02/29996 dated Jun. 24, 2003, 2 pgs.
International Preliminary Examination Report from PCT/US02/29996 dated Dec. 11, 2003.
International Search Report from PCT/US02/29998 dated Dec. 12, 2002.
International Preliminary Examination Report from PCT/US02/29998 dated Jan. 13, 2004.
International Search Report and Written Opinion from PCT/US03/25736 dated Dec. 28, 2004.
International Search Report from PCT/US03/34124 dated Dec. 28, 2004.
International Preliminary Examination Report from PCT/US03/34124 dated Aug. 25, 2006.
International Search Report and Written Opinion from PCT/IB08/050111 dated Jun. 4, 2008.
Amendments under Article 34(2)(b) PCT and Comments from PCT/IB08/050111 dated Oct. 2, 2008.
International Preliminary Report on Patentability for International Patent Application No. PCT/IB08/050111 dated Apr. 22, 2009.
International Search Report and Written Opinion from PCT/US08/52878 dated Jul. 3, 2008.
International Search Report and Written Opinion from PCT/US08/53242 dated Sep. 3, 2008.
International Search Report and Written Opinion from PCT/US10/51888 dated Dec. 6, 2010.
International Search Report and Written Opinion for PCT/US13/026441 dated Apr. 23, 2013.
Office Action dated Feb. 2, 2006 from Control No. 90/007,491.
Interview Summary from Control No. 90/007,491 dated Mar. 23, 2006.
Statement as to the substance of an Interview from Control No. 90/007,491 dated Apr. 3, 2006.
Response from Control No. 90/007,491 dated Apr. 3, 2006.
Office Action dated Jul. 5, 2006 from Control No. 90/007,491.
Notice of Allowance from U.S. Appl. No. 15/645,749 dated May 28, 2019.
Office Action from U.S. Appl. No. 15/935,538 dated Mar. 26, 2019.
Response to Office Action from U.S. Appl. No. 15/935,538 dated Jun. 26, 2019.
Office Action from U.S. Appl. No. 15/822,967 dated Apr. 8, 2019.
Office Action from U.S. Appl. No. 13/768,878 dated Dec. 3, 2014.
Response to Office Action from U.S. Appl. No. 13/768,878 dated Jan. 21, 2015.
Notice of Allowance from U.S. Appl. No. 14/162,955 dated May 26, 2015.
Office Action from U.S. Appl. No. 14/446,735 dated Jan. 14, 2016.
Response to Office Action from U.S. Appl. No. 14/446,735 dated Apr. 12, 2016.
Notice of Allowance from U.S. Appl. No. 14/446,735 dated Jul. 15, 2016.
Notice of Allowance from U.S. Appl. No. 14/446,735 dated Nov. 16, 2016.
Restriction Requirement from U.S. Appl. No. 14/486,766 dated Jun. 8, 2015.
Response to Restriction Requirement from U.S. Appl. No. 14/486,766 dated Aug. 10, 2015.
Office Action from U.S. Appl. No. 14/486,766 dated Sep. 16, 2015.
Response to Office Action from U.S. Appl. No. 14/486,766 dated Dec. 8, 2015.
Notice of Allowance from U.S. Appl. No. 14/486,766 dated Feb. 9, 2016.
Office Action from U.S. Appl. No. 14/566,899 dated Sep. 17, 2015.
Response to Office Action from U.S. Appl. No. 14/566,899 dated Dec. 10, 2015.
Notice of Allowance from U.S. Appl. No. 14/566,899 dated Jan. 21, 2016.
Office Action from U.S. Appl. No. 14/585,393 dated Sep. 3, 2015.
Response to Office Action from U.S. Appl. No. 14/585,393 dated Jan. 21, 2016.
Notice of Allowance from U.S. Appl. No. 14/585,393 dated Feb. 22, 2016.
Office Action from U.S. Appl. No. 14/690,678 dated Nov. 16, 2015.
Response to Office Action from U.S. Appl. No. 14/690,678 dated Mar. 16, 2016.
Office Action from U.S. Appl. No. 14/690,678 dated Jul. 15, 2016.
Pre-Brief Conference Request and Notice of Appeal from U.S. Appl. No. 14/690,678 dated Dec. 19, 2016.
Pre-Brief Appeal Conference Decision from U.S. Appl. No. 14/690,678 dated Feb. 3, 2017.
Office Action from U.S. Appl. No. 14/690,678 dated May 10, 2017.
Amendment from U.S. Appl. No. 14/690,678 dated Jul. 31, 2017.
Notice of Allowance from U.S. Appl. No. 14/690,678 dated Oct. 26, 2017.
Office Action from U.S. Appl. No. 14/875,110 dated May 20, 2016.
Response to Office Action from U.S. Appl. No. 14/875,110 dated Sep. 20, 2016.
Final Office Action from U.S. Appl. No. 14/875,110 dated Feb. 15, 2017.

(56) References Cited

OTHER PUBLICATIONS

Response to Office Action from U.S. Appl. No. 14/875,110 dated May 15, 2017.
Office Action from U.S. Appl. No. 14/875,110 dated May 24, 2017.
Amendment from U.S. Appl. No. 14/875,110 dated Sep. 25, 2017.
Final Office Action from U.S. Appl. No. 14/875,110 dated Dec. 11, 2017.
Response to Office Action from U.S. Appl. No. 14/875,110 dated Jan. 23, 2018.
Notice of Allowance from U.S. Appl. No. 14/875,110 dated Feb. 16, 2018.
Office Action from U.S. Appl. No. 15/060,121 dated Oct. 31, 2016.
Response to Office Action from U.S. Appl. No. 15/060,121 dated Jan. 31, 2017.
Notice of Allowance from U.S. Appl. No. 15/060,121 dated May 17, 2017.
Office Action from U.S. Appl. No. 15/146,260 dated Apr. 10, 2017.
Amendment from U.S. Appl. No. 15/146,260 dated Jun. 22, 2017.
Notice of Allowance from U.S. Appl. No. 15/146,260 dated Jul. 27, 2017.
Ex Parte Quayle Action from U.S. Appl. No. 15/151,929 dated Aug. 8, 2017.
Response to Ex Parte Quayle Action from U.S. Appl. No. 15/151,929 dated Oct. 9, 2017.
Office Action from U.S. Appl. No. 15/159,264 dated Nov. 17, 2016.
Notice of Allowance from U.S. Appl. No. 15/151,929 dated Nov. 16, 2017.
Response to Office Action from U.S. Appl. No. 15/159,264 dated Feb. 17, 2017.
Final Office Action from U.S. Appl. No. 15/159,264 dated Jun. 13, 2017.
Response After Final from U.S. Appl. No. 15/159,264 dated Sep. 12, 2017.
Advisory Action from U.S. Appl. No. 15/159,264 dated Sep. 28, 2017.
Office Action from U.S. Appl. No. 15/159,264 dated Dec. 26, 2017.
Amendment from U.S. Appl. No. 15/159,264 dated Apr. 26, 2018.
Final Office Action from U.S. Appl. No. 15/159,264 dated Aug. 10, 2018.
Office Action from U.S. Appl. No. 15/447,988 dated Aug. 7, 2018.
Amendment from U.S. Appl. No. 15/447,988 dated Nov. 7, 2018.
Notice of Allowance from U.S. Appl. No. 15/447,988 dated Dec. 14, 2018.
Ex Parte Quayle Action from U.S. Appl. No. 15/645,749 dated Aug. 7, 2018.
Response to Ex Parte Quayle Action from U.S. Appl. No. 15/645,749 dated Oct. 24, 2018.
Notice of Allowance from U.S. Appl. No. 15/645,749 dated Feb. 26, 2019.
Office Action from U.S. Appl. No. 08/694,484 dated Feb. 10, 1998.
Notice of Allowance from U.S. Appl. No. 12/330,554 dated Feb. 14, 2012.
Office Action from U.S. Appl. No. 12/522,837 dated Feb. 15, 2011.
Amendment from U.S. Appl. No. 12/522,837 dated Jun. 15, 2011.
Notice of Allowance from U.S. Appl. No. 12/522,837 dated Jul. 26, 2011.
Notice of Allowance from U.S. Appl. No. 12/522,837 dated Jun. 28, 2012.
Office Action from U.S. Appl. No. 12/523,630 dated Dec. 21, 2011.
Response from U.S. Appl. No. 12/523,630 dated Mar. 15, 2012.
Notice of Allowance from U.S. Appl. No. 12/523,630 dated Jun. 11, 2012.
Restriction /Election Requirement for U.S. Appl. No. 12/524,476 dated Dec. 31, 2012.
Office Action from U.S. Appl. No. 12/524,476 dated May 22, 2013.
Amendment in U.S. Appl. No. 12/524,476 dated Nov. 20, 2013.
Final Office Action in U.S. Appl. No. 12/524,476 dated Feb. 27, 2014.
Notice of Allowance from U.S. Appl. No. 12/524,476 dated Aug. 15, 2014.
Office Action from U.S. Appl. No. 12/568,728 dated Jun. 10, 2010.
Response from U.S. Appl. No. 12/568,728 dated Nov. 5, 2010.
Office Action from U.S. Appl. No. 12/568,728 dated Jan. 24, 2011.
Notice of Allowance from U.S. Appl. No. 12/568,728 dated Oct. 26, 2011.
Examiner-Initiated Interview Summary from U.S. Appl. No. 12/568,728 dated Dec. 8, 2011.
RCE with Remarks (Amendments to Specification) from U.S. Appl. No. 12/568,728 dated Jan. 9, 2012.
Notice of Allowance from U.S. Appl. No. 12/568,728 dated Jan. 24, 2012.
Office Action from U.S. Appl. No. 13/413,839 dated Sep. 26, 2013.
Response to Office Action from U.S. Appl. No. 13/413,839 dated Feb. 26, 2014.
Notice of Allowance from U.S. Appl. No. 13/413,839 dated May 1, 2014.
Restriction Requirement in U.S. Appl. No. 13/465,404 dated Jan. 3, 2013.
Response to Restriction Requirement in U.S. Appl. No. 13/465,404 dated Feb. 4, 2013.
Office Action in U.S. Appl. No. 13/465,404 dated Apr. 11, 2013.
Response to Office Action in U.S. Appl. No. 13/465,404 dated Jul. 11, 2013.
Notice of Allowance in U.S. Appl. No. 13/465,404 dated Sep. 27, 2013.
Office Action from U.S. Appl. No. 13/465,268 dated Jul. 19, 2012.
Response to Office Action from U.S. Appl. No. 13/465,268 dated Jan. 22, 2013.
Final Office Action in U.S. Appl. No. 13/465,268 dated Apr. 15, 2013.
Amendment with RCE, terminal disclaimer for U.S. Appl. No. 13/465,268 dated Oct. 15, 2013.
Non-Final Office Action in U.S. Appl. No. 13/465,268 dated Apr. 15, 2014.
Notice of Allowance for U.S. Appl. No. 13/465,268 dated Oct. 24, 2014.
First Office Action in U.S. Appl. No. 13/566,473 dated Dec. 6, 2012.
Response in U.S. Appl. No. 13/566,473 dated Apr. 8, 2013.
Office Action in U.S. Appl. No. 13/568,623 dated Feb. 1, 2013.
Response to Office Action in U.S. Appl. No. 13/568,623 dated Jun. 19, 2013.
Notice of Allowance in U.S. Appl. No. 13/568,623 dated Oct. 9, 2013.
Notice of Allowance in U.S. Appl. No. 13/568,623 dated Apr. 2, 2014.
Restriction Requirement in U.S. Appl. No. 12/900,548 dated Jun. 28, 2013.
Response to Restriction Requirement in U.S. Appl. No. 12/900,548 dated Jul. 29, 2013.
Office Action in U.S. Appl. No. 12/900,548 dated Sep. 9, 2013.
Response to Office Action in U.S. Appl. No. 12/900,548 dated Jan. 28, 2014.
Office Action in U.S. Appl. No. 12/900,548 dated Jun. 2, 2014.
RCE and Amendment Filed in U.S. Appl. No. 12/900,548 dated Oct. 1, 2014.
Notice of Allowance in U.S. Appl. No. 12/900,548 dated Dec. 18, 2014.
Restriction Requirement from U.S. Appl. No. 13/768,878 dated Jun. 4, 2014.
Response to Restriction Requirement in U.S. Appl. No. 13/768,878 dated Sep. 4, 2014.
Notice of Allowance for U.S. Appl. No. 13/768,878 dated Dec. 11, 2015.
Response to Office Action from Control No. 90/007,491 dated Sep. 11, 2006.
Office Action dated Sep. 21, 2006 from Control No. 90/007,491.
Response from Control No. 90/007,491 dated Nov. 9, 2006.
Notice of Appeal from Control No. 90/007,491 dated Nov. 9, 2006.
Advisory Action from Control No. 90/007,491 dated Nov. 22, 2006.
Appeal Brief from Control No. 90/007,491 dated Jan. 16, 2007.
Advisory Action from Control No. 90/007,491 dated Apr. 20, 2007.
Amended Appeal Brief from Control No. 90/007,491 dated Jun. 29, 2007.

(56) References Cited

OTHER PUBLICATIONS

Examinees Answer from Control No. 90/007,491 dated Sep. 24, 2007.
Reply Brief from Control No. 90/007,491 dated Nov. 21, 2007.
Supplemental Examinees Answer from Control No. 90/007,491 dated Dec. 18, 2007.
Request for Oral Hearing from Control No. 90/007,491 dated Feb. 19, 2008.
Reply Brief from Control No. 90/007,491 dated Feb. 19, 2008.
Office Communication from Control No. 90/007,491 dated Mar. 14, 2008.
Office communication from Control No. 90/007,491 dated Jul. 3, 2008.
Notice of Hearing from Control No. 90/007,491 dated Aug. 22, 2008.
Hearing Attendance Confirmation from Control No. 90/007,491 dated Sep. 17, 2008.
Record of Oral Hearing from Control No. 90/007,491 dated Nov. 13, 2008.
Decision on Appeal from Control No. 90/007,491 dated Nov. 19, 2008.
Amendment for U.S. Appl. No. 09/698,481 dated Mar. 27, 2002.
Complaint for Patent Infringement Demand for Jury Trial, Case No. 1:06CV0517.
Request for Reexamination of U.S. Pat. No. 6,196,343, filed Apr. 28, 2006, 17 pgs.
Affidavit, executed Apr. 3, 2006 by Mark Sullivan, Invacare Corporation Vice President of Rehab submitted in reexamination Control No. 90/007,491, 5 pgs.
Affidavit, executed Apr. 3, 2006 by Gerold Goertzen Invacare Corporation Director of Research & Development submitted in reexamination Control No. 90/007,491, 7 pgs.
Office Action from U.S. Appl. No. 08/228,584 dated Apr. 14, 1995.
Response from U.S. Appl. No. 08/228,584 dated Jul. 6, 1995.
Office Action from U.S. Appl. No. 08/228,584 dated Sep. 28, 1995.
Interview Summary from U.S. Appl. No. 08/228,584 dated Nov. 30, 1995.
Response from U.S. Appl. No. 08/228,584 dated Dec. 28, 1995.
Office Action from U.S. Appl. No. 08/228,584 dated Mar. 29, 1996.
Response from U.S. Appl. No. 08/228,584 dated Jun. 3, 1996.
Notice of Allowance from U.S. Appl. No. 08/228,584 dated Jun. 24, 1996.
Office Action from U.S. Appl. No. 08/694,484 dated Dec. 2, 1996.
Response from U.S. Appl. No. 08/694,484 dated Apr. 2, 1997.
Office Action from U.S. Appl. No. 08/694,484 dated Jul. 7, 1997.
Office Action from U.S. Appl. No. 08/694,484 dated Dec. 3, 1997.
Response from U.S. Appl. No. 08/694,484 dated May 4, 1998.
Notice of Allowance from U.S. Appl. No. 08/694,484 dated Jul. 31, 1998.
Office Action from U.S. Appl. No. 09/191,332 dated Jan. 19, 2000.
Response from U.S. Appl. No. 09/191,332 dated Apr. 18, 2000.
Notice of Allowance from U.S. Appl. No. 09/191,332 dated Jul. 3, 2000.
Notice of Allowance from U.S. Appl. No. 09/426,369 dated Oct. 20, 2000.
Office Action from U.S. Appl. No. 09/607,468 dated Sep. 26, 2001.
Response from U.S. Appl. No. 09/607,468 dated Dec. 21, 2001.
Office Action from U.S. Appl. No. 09/607,468 dated Apr. 18, 2002.
Response from U.S. Appl. No. 09/607,468 dated Jun. 21, 2002.
Notice of Allowance from U.S. Appl. No. 09/607,468 dated Jun. 28, 2002.
U.S. Patent Office Action from U.S. Appl. No. 09/698,481 dated Nov. 27, 2001.
Response from U.S. Appl. No. 09/698,481 dated Mar. 27, 2002.
U.S. Patent Office Action from U.S. Appl. No. 09/698,481 dated Jun. 27, 2002.
Response to Office Action from U.S. Appl. No. 16/390,618 dated Nov. 22, 2019.
Office Action from U.S. Appl. No. 16/390,618 dated Mar. 4, 2020.
Response to Office Action from U.S. Appl. No. 16/390,618 dated Jun. 4, 2020.
Office Action from U.S. Appl. No. 16/390,618 dated Jun. 24, 2020.
Response to Office Action from U.S. Appl. No. 16/390,618 dated Sep. 24, 2020.
Notice of Allowance from U.S. Appl. No. 16/390,618 dated Oct. 9, 2020.
Office Action from U.S. Appl. No. 16/740,785 dated Sep. 14, 2020.
Amendment from U.S. Appl. No. 15/822,967 dated Jul. 31, 2019.
Notice of Allowance from U.S. Appl. No. 15/935,538 dated Aug. 9, 2019.
Notice of Allowance from U.S. Appl. No. 15/822,967 dated Aug. 28, 2019.
Office Action from U.S. Appl. No. 16/390,618 dated Aug. 22, 2019.
"Bounder Plus Power Wheelchair: Convention "Tubular" Style Frame"; http://www.wheelchairs.com/plus.htm, Accessed on the World Wide Web on Dec. 17, 2003, p. 1-4.
Response from U.S. Appl. No. 09/698,481 dated Oct. 29, 2002.
U.S. Patent Office Advisory Action from U.S. Appl. No. 09/698,481 dated Nov. 13, 2002.
Supplemental Amendment after Final from U.S. Appl. No. 09/698,481 dated Nov. 27, 2002.
Notice of Allowance from U.S. Appl. No. 09/698,481 dated Dec. 12, 2002.
Office Action from U.S. Appl. No. 09/712,547 dated May 23, 2001.
Response from U.S. Appl. No. 09/712,547 dated Aug. 23, 2001.
Office Action from U.S. Appl. No. 09/712,547 dated Oct. 30, 2001.
Response from U.S. Appl. No. 09/712,547 dated Jan. 28, 2002.
Notice of Allowance from U.S. Appl. No. 09/712,547 dated Mar. 11, 2002.
Office Action from U.S. Appl. No. 09/974,348 dated Feb. 27, 2003.
Response from U.S. Appl. No. 09/974,348 dated Jul. 28, 2003.
Office Action from U.S. Appl. No. 09/974,348 dated Oct. 22, 2003.
Interview Record from U.S. Appl. No. 09/974,348 dated Oct. 28, 2003.
Response from U.S. Appl. No. 09/974,348 dated Jan. 26, 2004.
Advisory Action from U.S. Appl. No. 09/974,348 dated Feb. 27, 2004.
Response from U.S. Appl. No. 09/974,348 dated Apr. 16, 2004.
Notice of Allowance from U.S. Appl. No. 09/974,348 dated May 11, 2004.
Notice of Allowance from U.S. Appl. No. 09/974,348 dated May 20, 2005.
Office Action from related U.S. Appl. No. 10/044,826, dated Apr. 29, 2003.
Response from U.S. Appl. No. 10/044,826 dated Oct. 29, 2003.
Notice of Abandonment from U.S. Appl. No. 10/044,826 dated Nov. 18, 2003.
Response from U.S. Appl. No. 10/044,826 dated Jan. 20, 2004.
Response from U.S. Appl. No. 10/044,826 dated Aug. 16, 2004.
Notice of Allowability from U.S. Appl. No. 10/044,826 dated Jun. 14, 2005.
Notice of Allowance from U.S. Appl. No. 10/044,826 dated Apr. 3, 2006.
U.S. Patent Office Action from U.S. Appl. No. 10/390,133 dated Aug. 8, 2003.
Response from U.S. Appl. No. 10/390,133 dated Feb. 11, 2004.
U.S. Patent Office Action from U.S. Appl. No. 10/390,133 dated Jun. 16, 2004.
Response from U.S. Appl. No. 10/390,133 dated Dec. 20, 2004.
Supplemental Notice of Allowance from U.S. Appl. No. 10/390,133 dated Mar. 30, 2005.
Notice of Allowance from U.S. Appl. No. 10/390,133 dated Jan. 11, 2005.
U.S. Patent Office Action from U.S. Appl. No. 10/390,386 dated Aug. 8, 2003.
Response from U.S. Appl. No. 10/390,386 dated Nov. 11, 2003.
U.S. Patent Office Action from U.S. Appl. No. 10/390,386 dated Jan. 28, 2004.
Response from U.S. Appl. No. 10/390,386 dated May 28, 2004.
U.S. Patent Office Action from U.S. Appl. No. 10/390,386 dated Oct. 12, 2004.
Response from U.S. Appl. No. 10/390,386 dated Mar. 16, 2005.

(56) References Cited

OTHER PUBLICATIONS

Notice of Allowance from U.S. Appl. No. 10/390,386 dated Apr. 7, 2005.
Notice of Allowance from U.S. Appl. No. 10/643,010 dated Sep. 30, 2004.
Office Action from U.S. Appl. No. 10/695,045 dated Feb. 22, 2005.
Response from U.S. Appl. No. 10/695,045 dated Jul. 25, 2005.
Office Action from U.S. Appl. No. 10/695,045 dated Oct. 20, 2005.
Response from U.S. Appl. No. 10/695,045 dated Jan. 17, 2006.
Notice of Allowance from U.S. Appl. No. 10/695,045 dated Apr. 11, 2006.
Office Action from U.S. Appl. No. 10/762,977 dated Jan. 18, 2005.
Response from U.S. Appl. No. 10/762,977 dated May 18, 2005.
Office Action from U.S. Appl. No. 10/762,977 dated Aug. 11, 2005.
Response from U.S. Appl. No. 10/762,977 dated Oct. 3, 2005.
Office Action from U.S. Appl. No. 10/762,977 dated Oct. 25, 2005.

\* cited by examiner

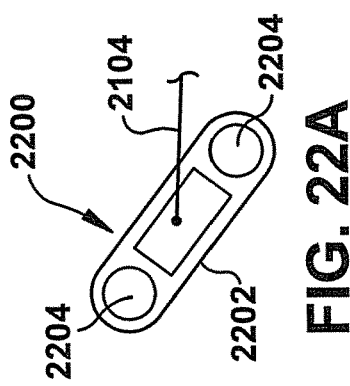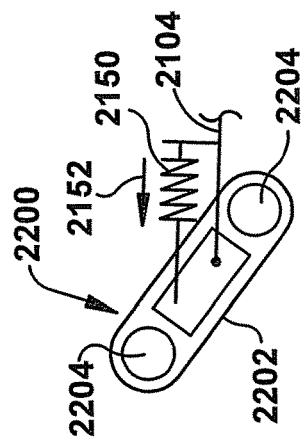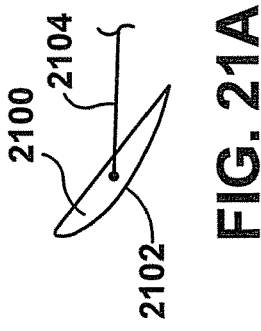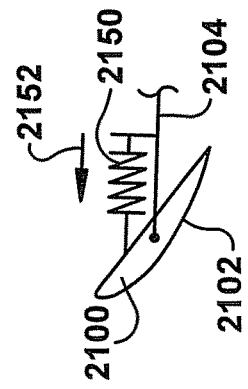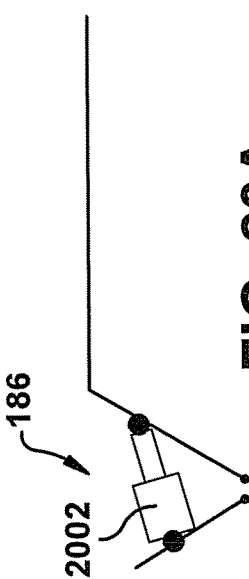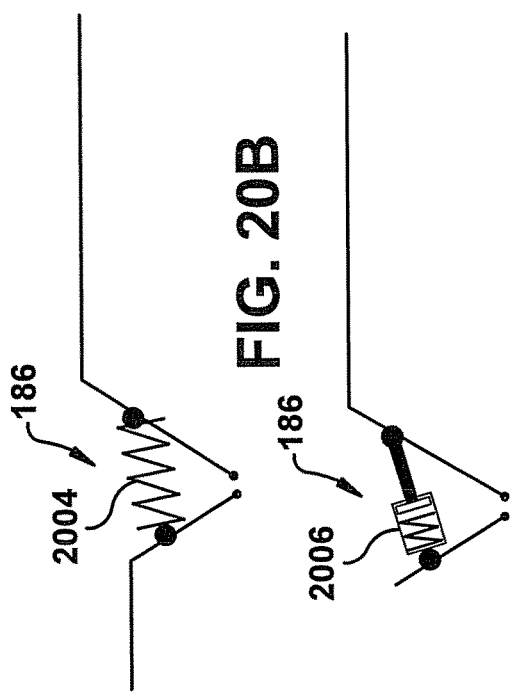

WHEELCHAIR SUSPENSION

RELATED APPLICATIONS

The present application is a continuation of U.S. Ser. No. 14/690,678, filed Apr. 20, 2015, titled "WHEELCHAIR SUSPENSION," which is a divisional of U.S. Ser. No. 12/900,548, filed Oct. 8, 2010, titled "WHEELCHAIR SUSPENSION", which claims the benefit of U.S. provisional application Ser. No. 61/250,222, filed on Oct. 9, 2009, which are incorporated herein by reference in their entirety.

BACKGROUND

Wheelchairs and scooters are an important means of transportation for a significant portion of society. Whether manual or powered, these vehicles provide an important degree of independence for those they assist. However, this degree of independence can be limited if the wheelchair is required to traverse obstacles such as, for example, curbs that are commonly present at sidewalks, driveways, and other paved surface interfaces. This degree of independence can also be limited if the vehicle is required to ascend inclines or descend declines.

Most wheelchairs have front and rear anti-tip wheels to stabilize the chair from excessive tipping forward or backward and to ensure that the drive wheels are always in contact with the ground. The anti-tip wheels are typically much smaller than the drive wheels and located both forward and rearward of the drive wheels.

SUMMARY

The present application discloses several embodiments of wheeled vehicles, such as wheelchairs, that are adapted to traverse obstacles. The wheeled vehicles include a frame, drive wheels, front anti-tip wheels positioned in front of the drive wheels, and rear anti-tip wheels positioned behind the drive wheels. One exemplary vehicle includes front anti-tip wheels supported by rigid arms that are fixed to the frame and drive assemblies that are independently suspended from the frame. Another exemplary vehicle includes a linkage that links the front and rear anti-tip wheels, such that movement of one of the front anti-tip wheel or the rear anti-tip wheel relative to the frame causes movement of the other wheel relative to the frame.

BRIEF DESCRIPTION OF THE DRAWINGS

In the accompanying drawings which are incorporated in and constitute a part of the specification, embodiments of the invention are illustrated, which together with a general description of the invention given above and the detailed description given below, serve to exemplify the principles of this invention.

FIG. 20A is a schematic illustration of a first embodiment of a variable length motion transfer arrangement coupled to components of a wheelchair suspension;

FIG. 20B is a schematic illustration of a second embodiment of a variable length motion transfer arrangement coupled to components of a wheelchair suspension;

FIG. 20C is a schematic illustration of a third embodiment of a variable length motion transfer arrangement coupled to components of a wheelchair suspension;

FIG. 21A is a schematic illustration of an alternate embodiment of an of an anti-tip structure;

FIG. 21B is a schematic illustration of an alternate embodiment of an of an anti-tip structure;

FIG. 22A is a schematic illustration of an alternate embodiment of an of an anti-tip structure;

FIG. 22B is a schematic illustration of an alternate embodiment of an of an anti-tip structure;

DETAILED DESCRIPTION

The present patent application specification and drawings provide multiple embodiments of a vehicle, such as a wheelchair, and suspension that enhances the ability of the vehicle to traverse obstacles and/or improve the ride quality of the wheelchair. The illustrated embodiments of the vehicles are wheelchairs, but the concepts of the illustrated embodiments are equally applicable to other types of vehicles. Generally, the wheelchairs each include a frame, a seat supported by the frame, a pair of drive assemblies, a pair of front anti-tip wheels, and at least one rear anti-tip wheel. In one embodiment, the front anti-tip wheels are connected to the frame, such that positions of axles of the front anti-tip wheels are fixed relative to the frame. In this embodiment, the drive assemblies are moveable with respect to the frame and optionally with respect to one another. In another embodiment, a linkage couples a front anti-tip wheel to a rear anti-tip wheel such that movement of the front anti-tip wheel causes movement of the corresponding rear anti-tip wheel and/or vice versa. For example, the linkage may couple the front anti-tip wheel to the rear anti-tip wheel such that upward movement of the front anti-tip wheel relative to the frame causes upward movement of the rear anti-tip wheel relative to the frame. Similarly, the linkage may couple the front anti-tip wheel to the rear anti-tip wheel such that downward movement of the front anti-tip wheel relative to the frame causes downward movement of the rear anti-tip wheel relative to the frame.

In this application, the term "frame" refers to any component or combination of components that are configured for coupling, mounting, attaching, or affixing of a drive assembly and at least one anti-tip wheel. In this application, the terms "couple," "mount," "attach," "affix," "fix," etc. are to be interpreted to include direct and indirect, through intermediate "coupling," "mounting," "attaching," "affixing," "fixing," etc. For example, a component that is "fixed" to the frame may be directly connected to the frame or the component may be connected to the frame by one or more intermediate components that prevent relative movement of the component with respect to the frame.

Figure 1:
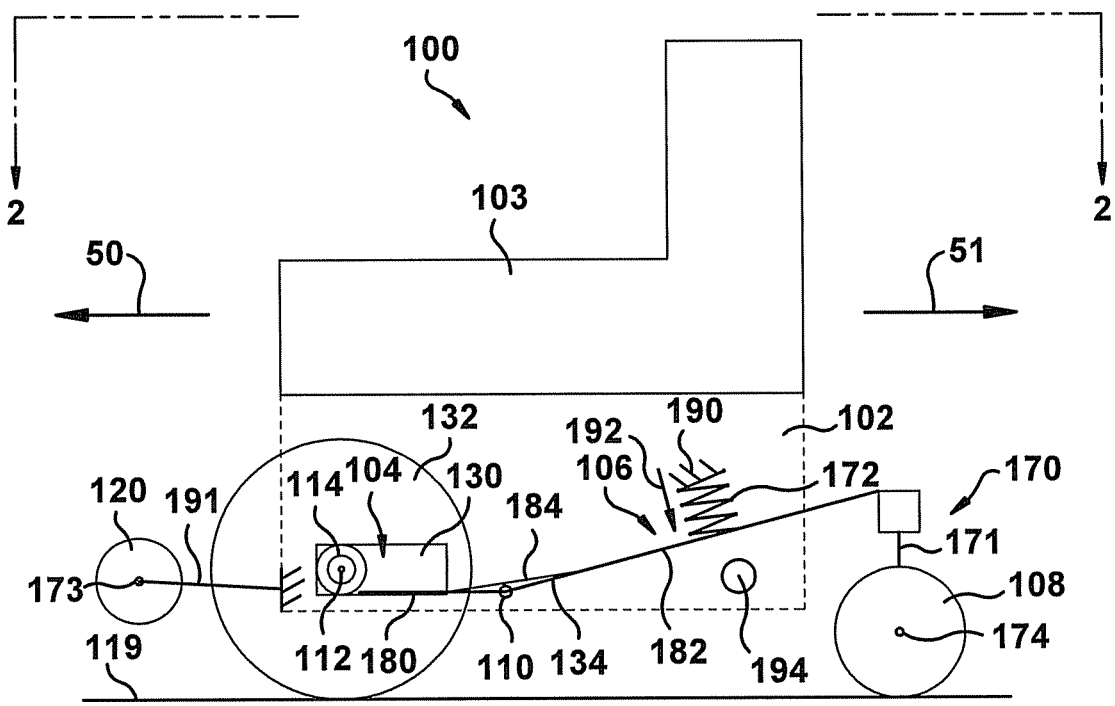
FIG. 1 is a side view of an exemplary embodiment of a wheelchair.
Figure 1A:
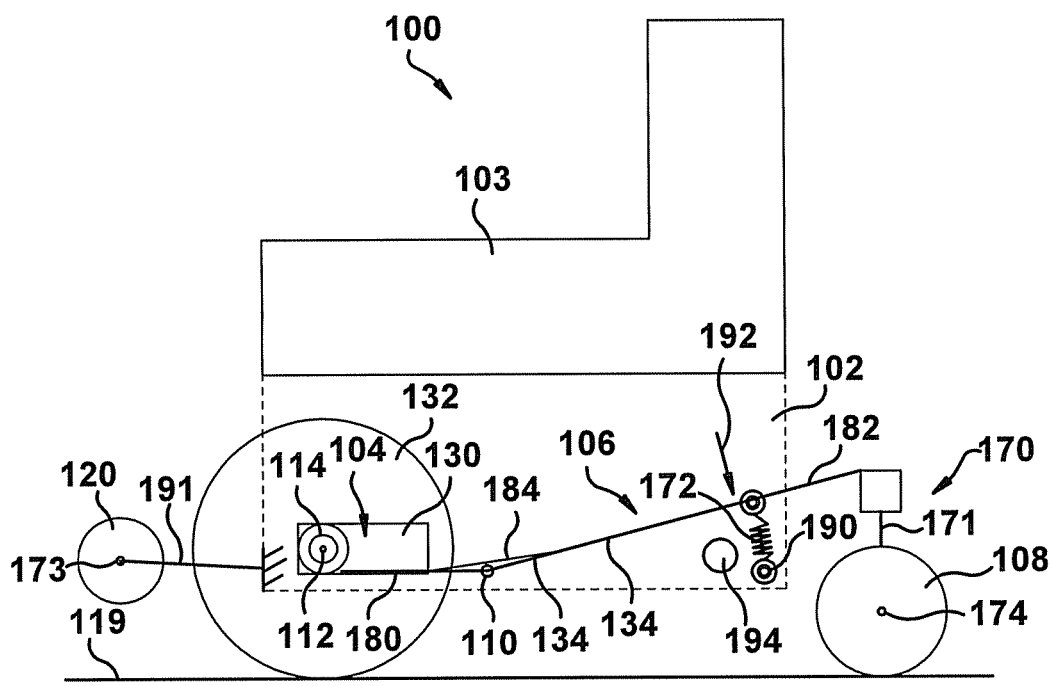
FIG. 1A is a side view of a second configuration of the wheelchair of FIG. 1.
Figure 2:
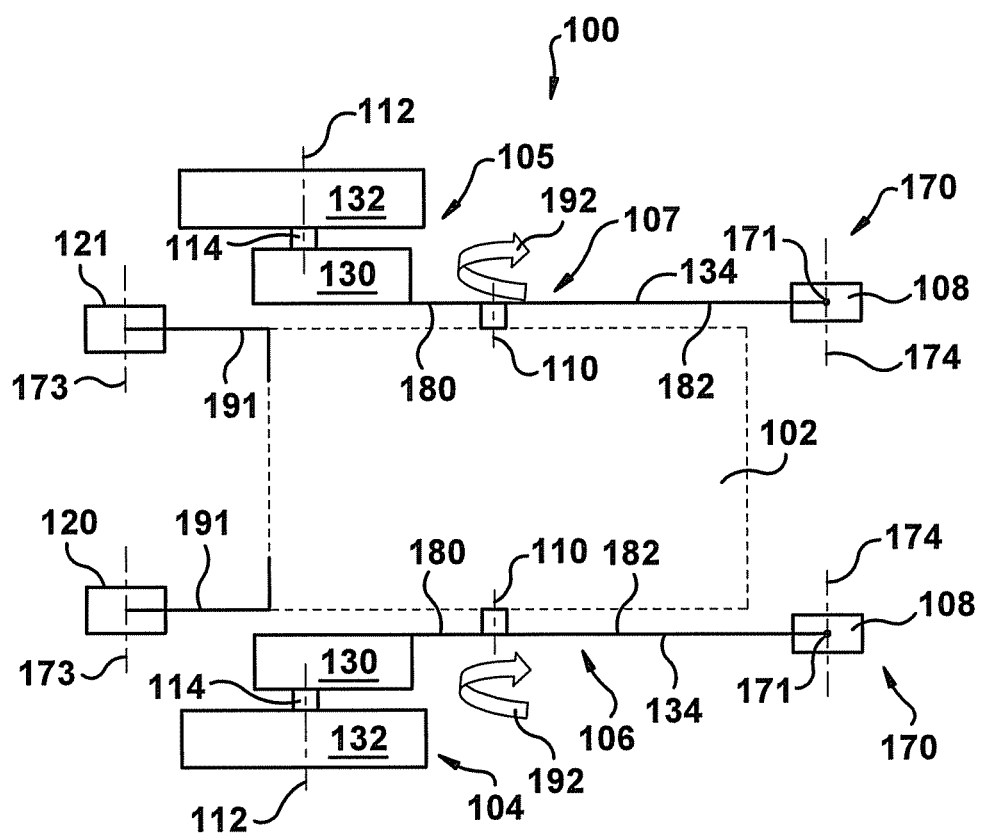
FIG. 2 is a top view of the wheelchair shown in FIG. 1.

FIGS. 1 and 2 illustrate a first embodiment of a wheelchair 100. The wheelchair 100 includes a frame 102, a seat 103 supported by the frame, first and second drive assemblies 104, 105 (see FIG. 2), first and second suspension assemblies 106, 107 (see FIG. 2), first and second front anti-tip wheels 120, 121 (see FIG. 2) and at least one rear anti-tip wheel 108. The seat 103 is shown schematically in FIGS. 1 and 2 and is omitted in the illustrations of many of the embodiments to indicate that any type of seat can be used. Also, seat 103 may face in either direction (i.e. toward the "front" anti-tip wheels 120 as shown or toward the rear anti-tip wheels 108) in any of the embodiments disclosed in this application. As such, the illustrated embodiments may be configured as front wheel drive wheelchairs or rear wheel drive wheelchairs. In addition, the wheelchair 100 may be configured as a mid-wheel drive wheelchair. Any of the drive and suspension arrangements disclosed in this application may be used on front wheel drive wheelchairs, rear wheel drive wheelchairs, or mid wheel drive wheelchairs. The direction of forward travel may be in the direction indicated by arrow 50 or in direction indicated by arrow 51.

In the illustrated embodiments, the wheelchair may include two separate drive assemblies. However, in other embodiments a single drive motor may drive both drive wheels. In the illustrated embodiments, each drive assembly 104, 105 may be coupled to the frame by a corresponding suspension assembly 106, 107, such that each drive assembly is moveable relative to the frame 102, and such that the drive assemblies are moveable relative to one another. In another embodiment, the drive assemblies are moveable with respect to the frame, but are fixed or linked to one another. The suspension assemblies 106, 107 can take a wide variety of different forms, several non-limiting examples of which are disclosed in detail below. The suspension assembly 106, 107 can be any arrangement that allows the drive assemblies 106, 107 to move upward and/or downward relative to the frame. In this application, the terms "up", "upward", "down", "downward", "above" and "below" and any other directional terms refer to the relative positions of the components when all of the wheels of the wheelchair are on a flat, level surface, such as support surface 119 illustrated in FIG. 1.

In the embodiment illustrated by FIGS. 1 and 2, each drive assembly 104, 105 includes a drive motor 130 and a drive wheel 132. The drive motor 130 may comprise a motor/gear box combination, a brushless, gearless motor, or any other known arrangement for driving the drive wheel 132. The drive motor 130 drives the drive wheel 132 about the axis of rotation 112.

The at least one rear anti-tip wheel 108 may take a wide variety of different forms. For example, there may be one, two, or any number of rear anti-tip wheels. Each rear anti-tip wheel 108 may be a wheel of a caster assembly 170 which is rotatable about a substantially vertical axis 171 with the wheel 108 being rotatable about a substantially horizontal axis 174. Alternatively, the wheel 108 may be mounted for rotation only about a substantially horizontal axis 174 (i.e. there is no rotational connection at 171). In this alternative embodiment, the wheel 108 would typically, but not necessarily, be off the ground.

In the illustrated embodiment, two rear anti-tip wheels 108 are disposed rearward of the drive wheels 132. The rear anti-tip wheels may be disposed on the ground or spaced apart from a horizontal support surface when the wheelchair is at rest in a normal operating position on the horizontal support surface. The rear anti-tip wheels may include integral suspension elements, such as resilient spokes. In the example illustrated by FIGS. 1 and 2, two caster assemblies 170 include anti-tip wheels 108 that are disposed on the horizontal support surface 119 when the wheelchair is in a normal operating position.

In the example illustrated by FIGS. 1 and 2, the suspension assemblies 106, 107 are mirror images of one another. As such, only suspension assembly 106 is described in detail. In the illustrated embodiments, the suspension assemblies 106, 107 are independently moveable relative to one another. However, the suspension assemblies 106, 107 can be linked together, such that they move in unison, such that one assembly causes movement of the other assembly, or movement of one assembly is limited based on the position of the other assembly. The illustrated suspension assembly 106 includes a pivot arm 134 and a biasing member 172. The pivot arm 134 is pivotally coupled to the frame 102 at a pivot axis 110. The illustrated drive assembly 104 is fixed to the pivot arm 134. However, the drive assembly 104 may be otherwise coupled to the pivot arm, such that movement of the pivot arm 134 causes movement of the drive assembly 104 relative to the frame 102. The pivot arm 134 may take a wide variety of different forms. For example, the pivot arm 134 may be any member that is pivotable with respect to the frame 102 to move the drive assembly 104 upward and downward with respect to the frame. The illustrated pivot arm 134 includes a forward link 180 and a caster assembly 170, which includes a rearward link 182. In the embodiment illustrated by FIGS. 1 and 2, the drive assembly 102 is fixed to the forward link 180 and a rearward link 182 that supports the rear anti-tip wheel. The rear anti-tip wheel 108 may be coupled to the rearward link 182 in any manner where movement of the pivot arm 134 causes movement of the rear anti-tip wheel 108. The forward link 180 and the rearward link 182 of the pivot arm 134 may be fixed relative to one another as indicated schematically by brace member 184. It should be understood that no actual brace member 184 is required. Rather, the schematic brace member merely indicates any fixed connection between the forward link 180 and the rearward link 182 or that the links are integrally formed. Alternatively, the forward link 180 and the rearward link 182 may be independent members that are pivotable about a common pivot axis or pivotable about two separate pivot axes (See FIGS. 4A and 4B). When the forward link 180 and the rearward link 182 are not fixed together, they may optionally be coupled together by an extendable link 186 (See FIGS. 20A, 20B, and 20C), which would replace the fixed brace member.

The axis 110 can be positioned at a wide variety of different locations with respect to the frame 102. For example, the pivot axis 110 can be positioned at any position on the frame or below the frame using with one or more brackets, etc. In the embodiment illustrated by FIGS. 1 and 2, the drive assembly pivot axis 110 of the drive assembly 104 is below an axis of rotation 112 of a drive axle 114 of the drive assembly 104.

The pivot arm 134 may be a substantially rigid member that is connected to the motor drive 130 and the rear anti-tip wheel 108. In one embodiment, the pivot arm 134 is flexible or one or more portions of the pivot arm are flexible to provide inherent shock absorbing properties in the pivot arm. The pivot arm 134 may be made from a wide variety of materials, including, but not limited to, metals and plastics.

The biasing member 172 can take a wide variety of different forms. Any spring device, devices or assembly can be used as the biasing member. The biasing member may be a single spring, a bi-directional spring, or multiple spring elements. The biasing member may include a shock absorbing component, for example, the biasing member may be a shock absorber 2006 with a spring return (See FIG. 20C).

In the example illustrated by FIGS. 1 and 2, a spring mount 190 is fixed to the frame 102. The biasing member 172 is disposed between the spring mount 190 and the pivot arm 134. The biasing member 172 illustrated by FIG. 1 is a compression spring that biases the rearward link 182 downward relative to the frame 102 as indicated by arrow 192. An optional stop 194 may be fixed to the frame to limit downward movement of the rearward link 182 with respect to the frame. In one embodiment, the biasing member is not fixed to the mount 190 or the pivot arm 134. In another embodiment, the biasing member is connected to one or both of the mount 190 and the pivot arm 134.

Figure 1B:
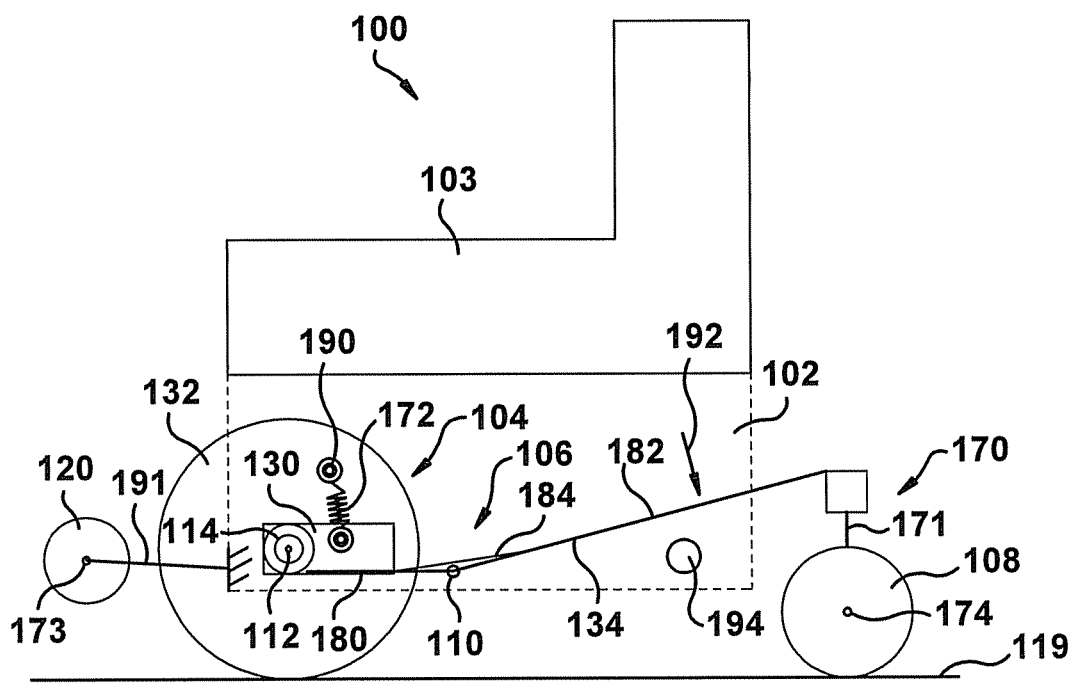
FIG. 1B is a side view of a third configuration of the wheelchair of FIG. 1.
Figure 1C:
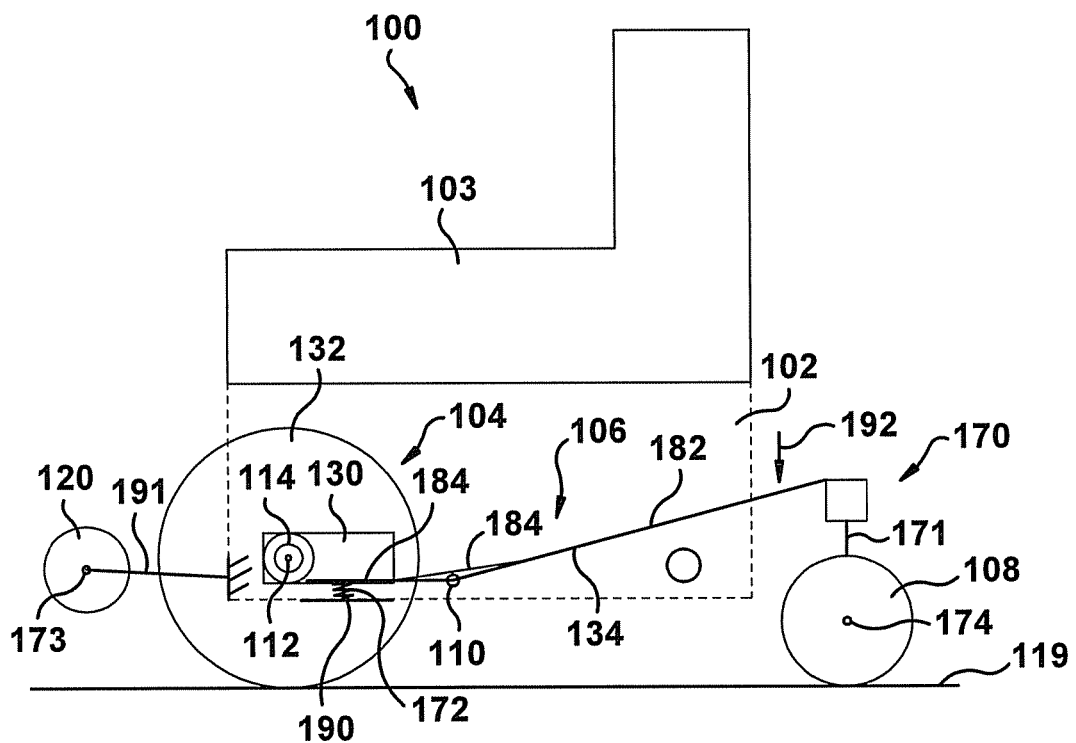
FIG. 1C is a side view of a fourth configuration of the wheelchair of FIG. 1.

In the embodiment illustrated by FIGS. 1 and 2, the downward biasing of the rearward link 182 causes upward biasing of the forward link 180. FIGS. 1, 1A, 1B and 1C illustrate that the biasing member 172 can be an extension spring or a compression spring positioned at a variety of different locations to provide the upward drive assembly/downward rearward link 182 biasing. For example, in FIG. 1A the biasing member 172 is an extension spring positioned below the rearward link 182. In FIG. 1B, the biasing member 172 is an extension spring positioned above the forward link 180. In FIG. 1C, the biasing member 172 is a compression spring positioned below the forward link 180. In another embodiment, the biasing member 172 is configured to bias the forward link 180 downward and rearward link 182 upward. This can be accomplished in a variety of different ways. For example, in the examples illustrated by FIGS. 1 and 1C, the biasing member 172 can be changed from a compression spring to an extension spring and, in the examples illustrated by FIGS. 1A and 1B, the biasing member 172 can be changed from an extension spring to a compression spring. In another embodiment, the biasing member 172 is configured to bias the pivot arm 134 to a home position, such as the position relative to the frame illustrated by FIG. 1. Biasing to a home position can be accomplished in a variety of different ways. For example, a bidirectional spring can be coupled to the pivot arm and/or any one or more of the spring arrangements that bias the rear link 182 downward can be used with any one or more of the spring arrangements that bias the forward link 180 downward. In an exemplary embodiment, the biasing member is configured such that the drive wheel 132 and the rear anti-tip wheel 108 engage the horizontal support surface 119 when the wheelchair is at rest on the horizontal support surface.

The first and second front anti-tip wheels 120, 121 may take a wide variety of different forms. For example, the wheels 120, 121 may be wheels of caster assemblies (see for example, rear caster assemblies 170) or the wheels may be mounted for rotation only about a substantially horizontal axis 173, as in the embodiment illustrated by FIG. 1. In the illustrated embodiment, the first and second front anti-tip wheels 120, 121 are located forward of the drive wheels 132. The front anti-tip wheels 120, 121 may be disposed on the horizontal support surface 119 or spaced apart from the horizontal support surface 119 when the wheelchair is at rest or in a normal operating position, as in the embodiment illustrated by FIG. 1. In one exemplary embodiment, the front anti-tip wheels 120, 121 may include integral suspension elements, such as resilient spokes.

The first and second front anti-tip wheels 120, 121 are supported by first and second arms 191 that are coupled to the frame 102. However, any number of arms and front anti-tip wheels may be included. In the example illustrated by FIGS. 1 and 2, the arms 191 are fixedly connected to the frame. However, in other embodiments, the arms 191 may be suspended from the frame such that the arms are moveable with respect to the frame. For example, the arms 191 may be pivotally connected to the frame (See for example arm 1790 in FIG. 16C) and/or coupled to the frame for translational movement relative to the frame (See for example coupling 806 in FIG. 8A). The first and second arms 191 may take a wide variety of different forms. The arms 191 may be rigid or substantially rigid. In one embodiment, the arms 191 are flexible to provide inherent shock absorbing properties in the arm. The arms 191 may be made from a wide variety of materials, including, but not limited to, metals and plastics. In the example illustrated by FIGS. 1 and 2, the arms 191 are rigid. An axle that defines the axis of rotation 173 of each of the front anti-tip wheels 120, 121 is connected to each of the arms. As such, the front anti-tip wheels 120, 121 are connected to the arms 191 such that positions of axes of rotation 173 of the front anti-tip wheels with respect to the frame 102 are fixed. In the example illustrated by FIGS. 1 and 2, the front anti-tip idler wheels 120, 121 are spaced apart from the horizontal support surface 119 when the wheelchair is at rest or in the normal operating position on the horizontal support surface 119.

Figure 3A:
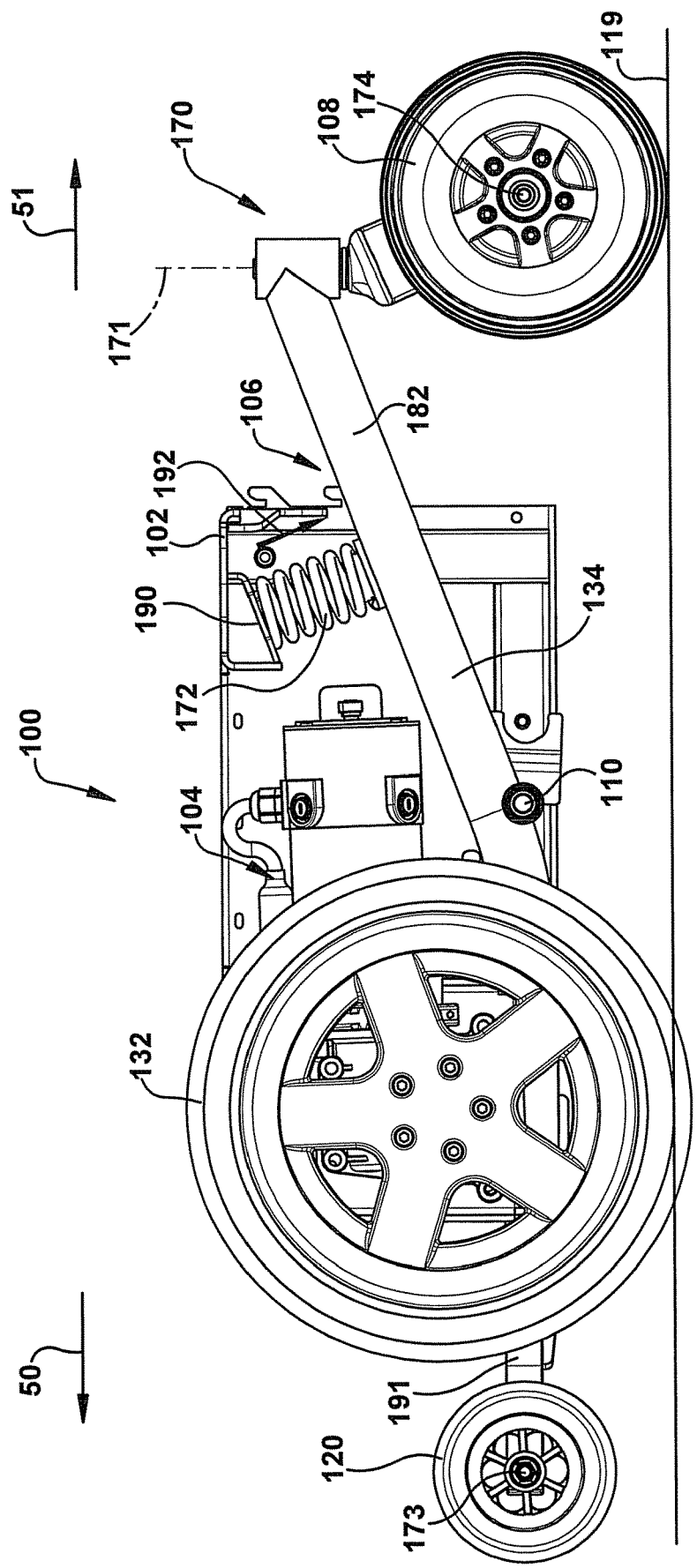
FIG. 3A is a side view of an exemplary embodiment of a wheelchair.
Figure 3B:
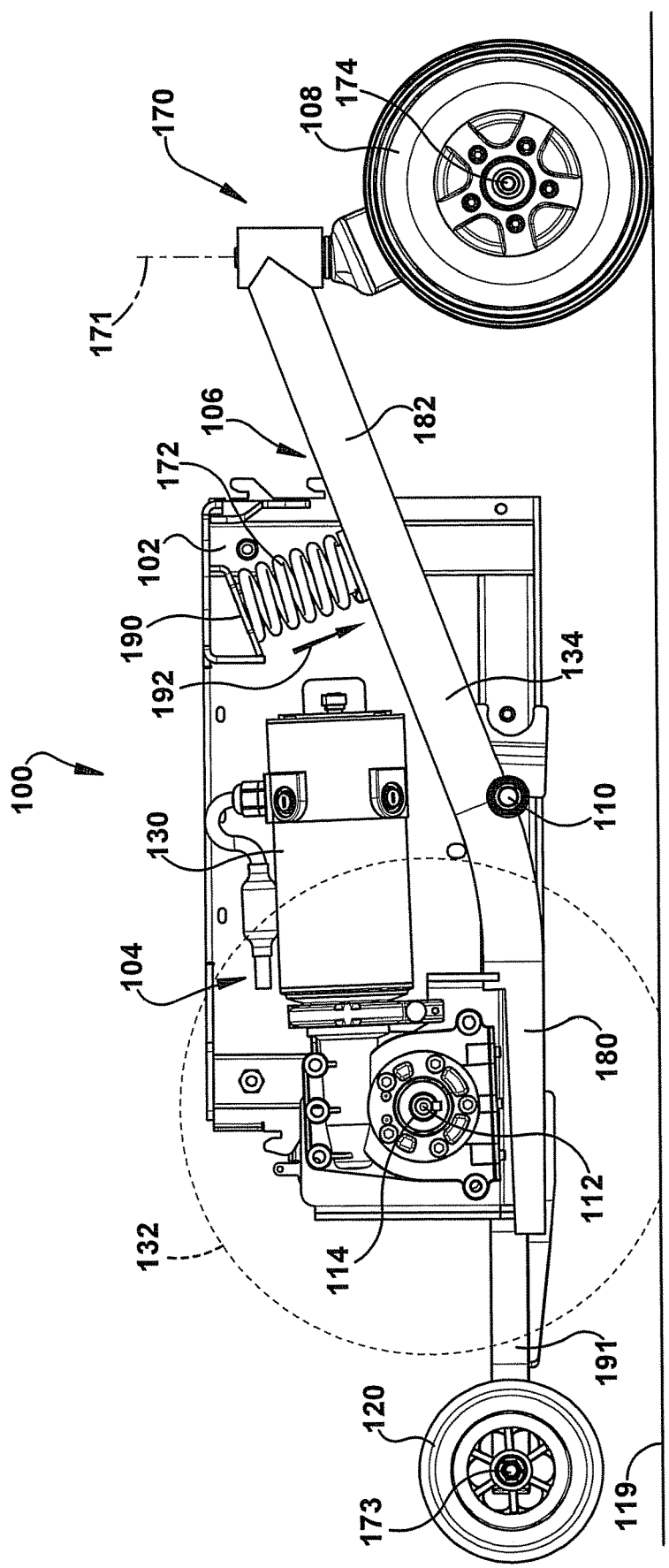
FIG. 3B is a side view of the wheelchair of FIG. 3A, with a drive wheel shown in schematically to more clearly illustrate a suspension assembly of the chassis.
Figure 3C:
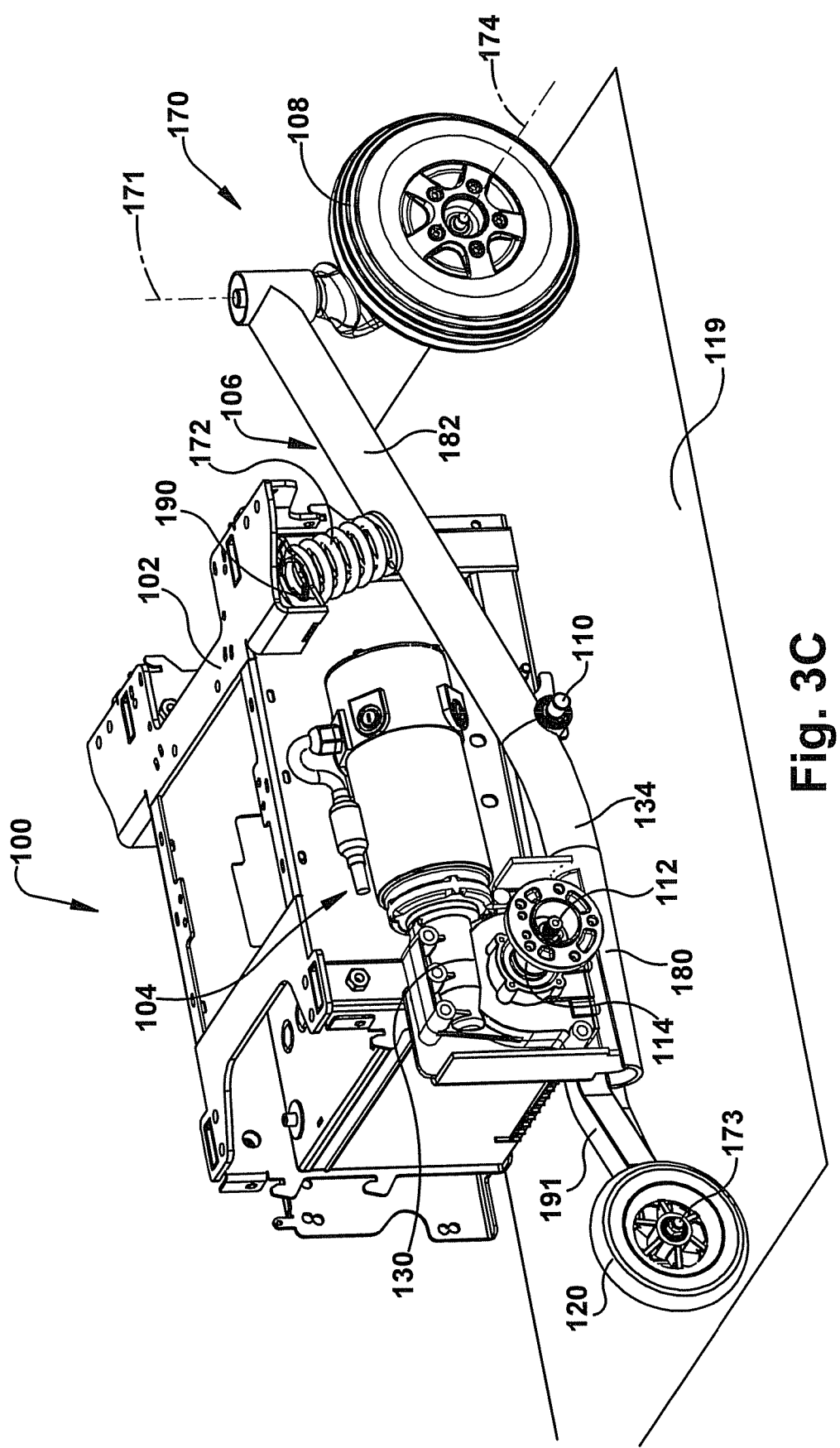
FIG. 3C is a perspective view of the wheelchair of FIG. 3B with a suspension assembly shown on one side of the chassis and the suspension assembly removed from the other side of the chassis

FIGS. 3A-3H illustrate a more specific embodiment of the wheelchair 100 illustrated by FIGS. 1 and 2. It should be understood that the present application is not limited to the more specific embodiment illustrated by FIGS. 3A-3H. FIG. 3A illustrates the wheelchair 100 at rest in the normal operating position on the horizontal support surface 119. FIG. 3B illustrates the wheelchair of FIG. 3A with the drive wheel 132 schematically illustrated to more clearly illustrate the suspension 106. FIGS. 1D and 3D-3G illustrate operation of the wheelchair 100. More specifically, these views are elevational views that illustrate embodiments of the wheelchair 100 traversing over an obstacle 300 by ascending the obstacle.

Figure 1D:
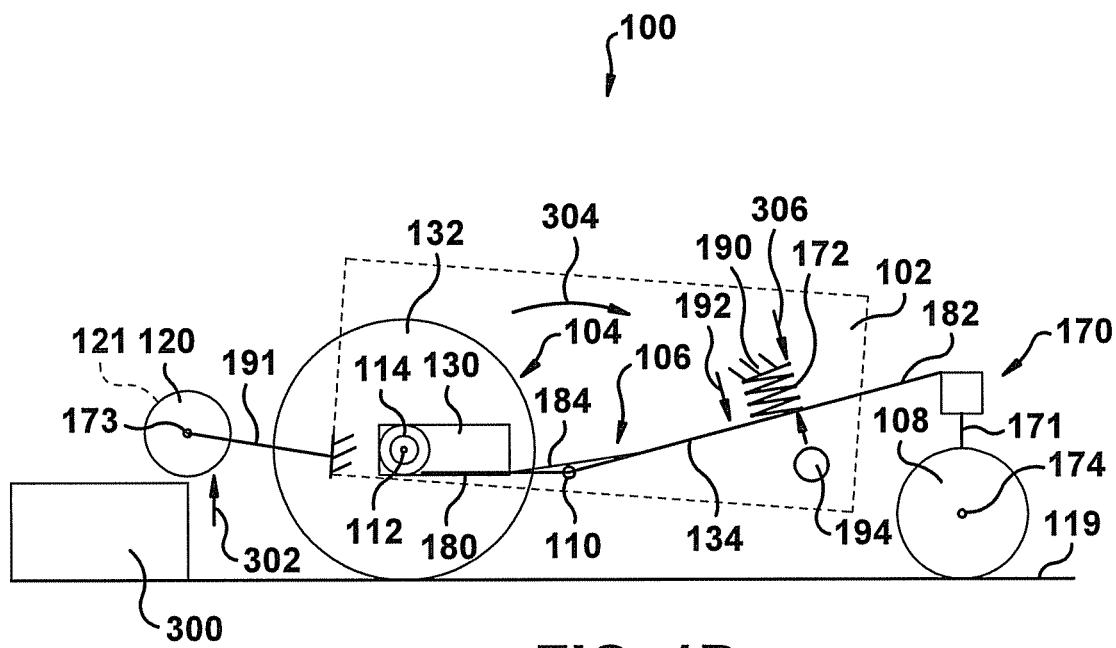
FIG. 1D is a side view of the wheelchair of FIG. 1 traversing an obstacle.
Figure 3D:
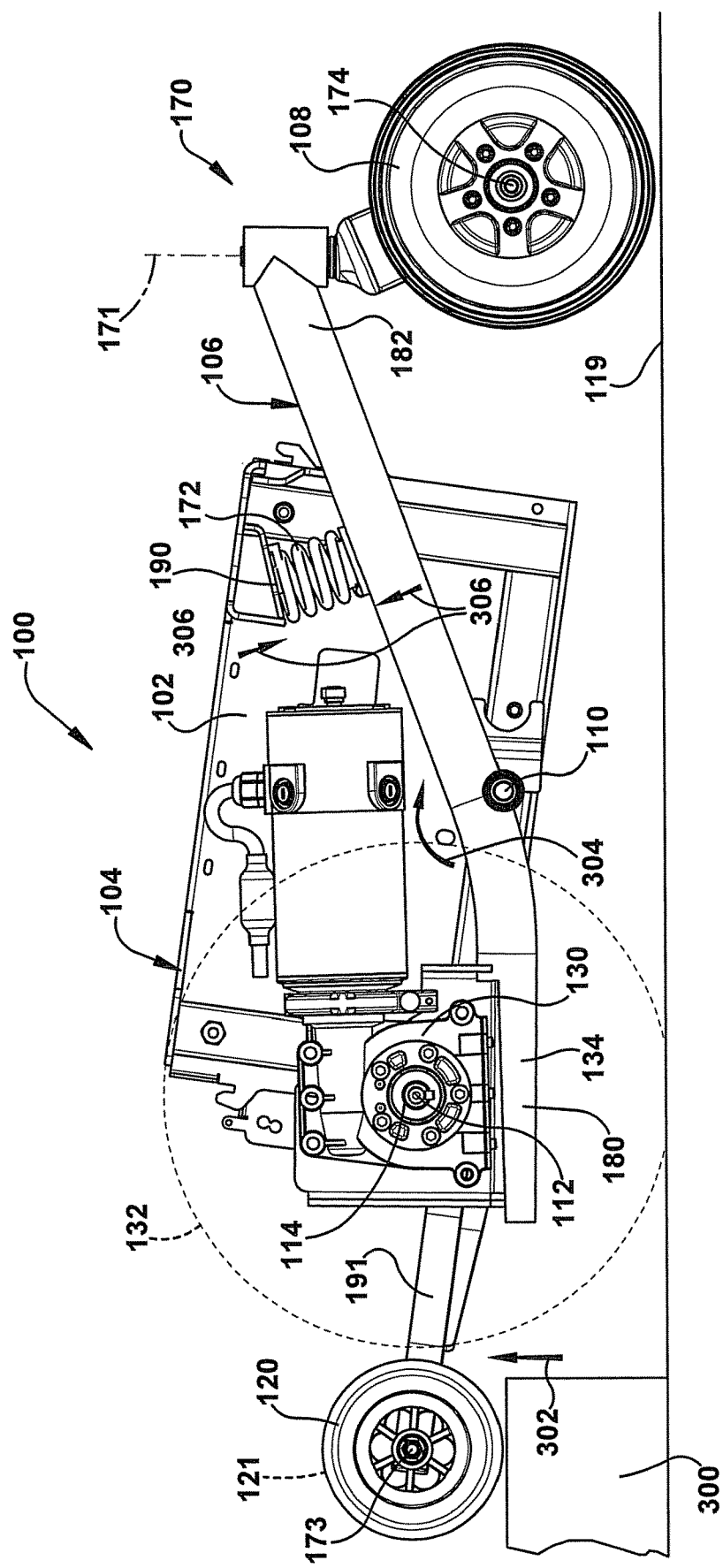
FIG. 3D shows a front anti-tip wheel of the chassis of FIG. 3B traversing an obstacle.

Referring to FIGS. 1D and 3D, the drive wheels 132 bring the front anti-tip wheels 120, 121 into engagement with the obstacle 300. The drive wheels 132 force the anti-tip wheels 120, 121 up and onto the obstacle. The drive wheels 132 remain on the ground and the upward movement (indicated by arrow 302) of the front anti-tip wheels 120, 121 causes the frame 102 to rotate (indicated by arrow 304) about the pivot axis 110 of the suspensions 106, 107. The rotation 304 of the frame 102 relative to the pivot axis causes compression (indicated by arrows 306) of the biasing member 172. As a result, additional downward force is applied to the rear anti-tip wheel 108.

Figure 3E:
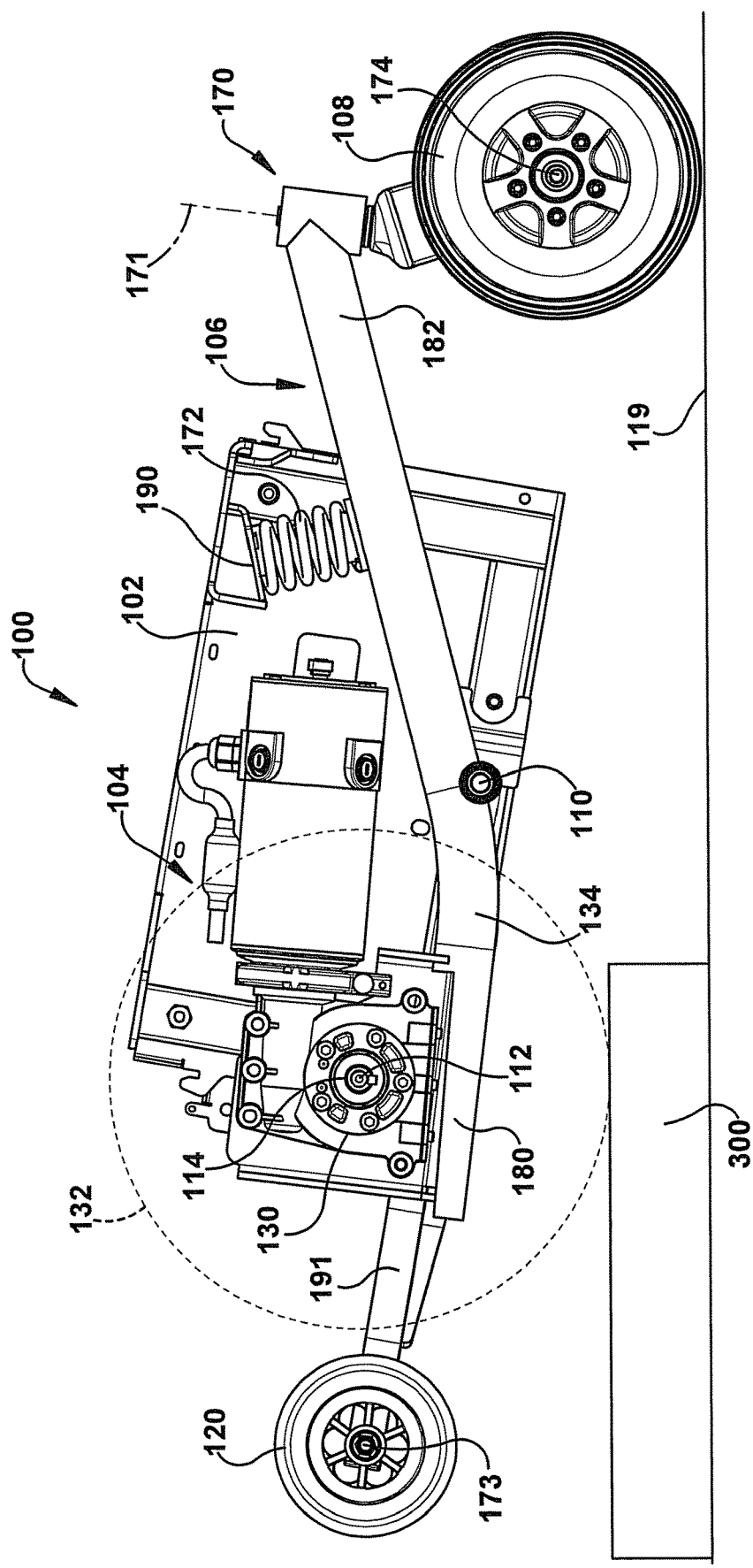
FIG. 3E shows a drive wheel of the chassis of FIG. 3B traversing an obstacle.

Referring to FIG. 3E, the drive wheels 132 continue to drive the wheelchair 100 forward. The drive wheels 132 engage and climb over the obstacle 300. As the drive wheels 132 move up and over the obstacle, the biasing member 172 forces the rear anti-tip wheel 108 down.

Figure 3F:
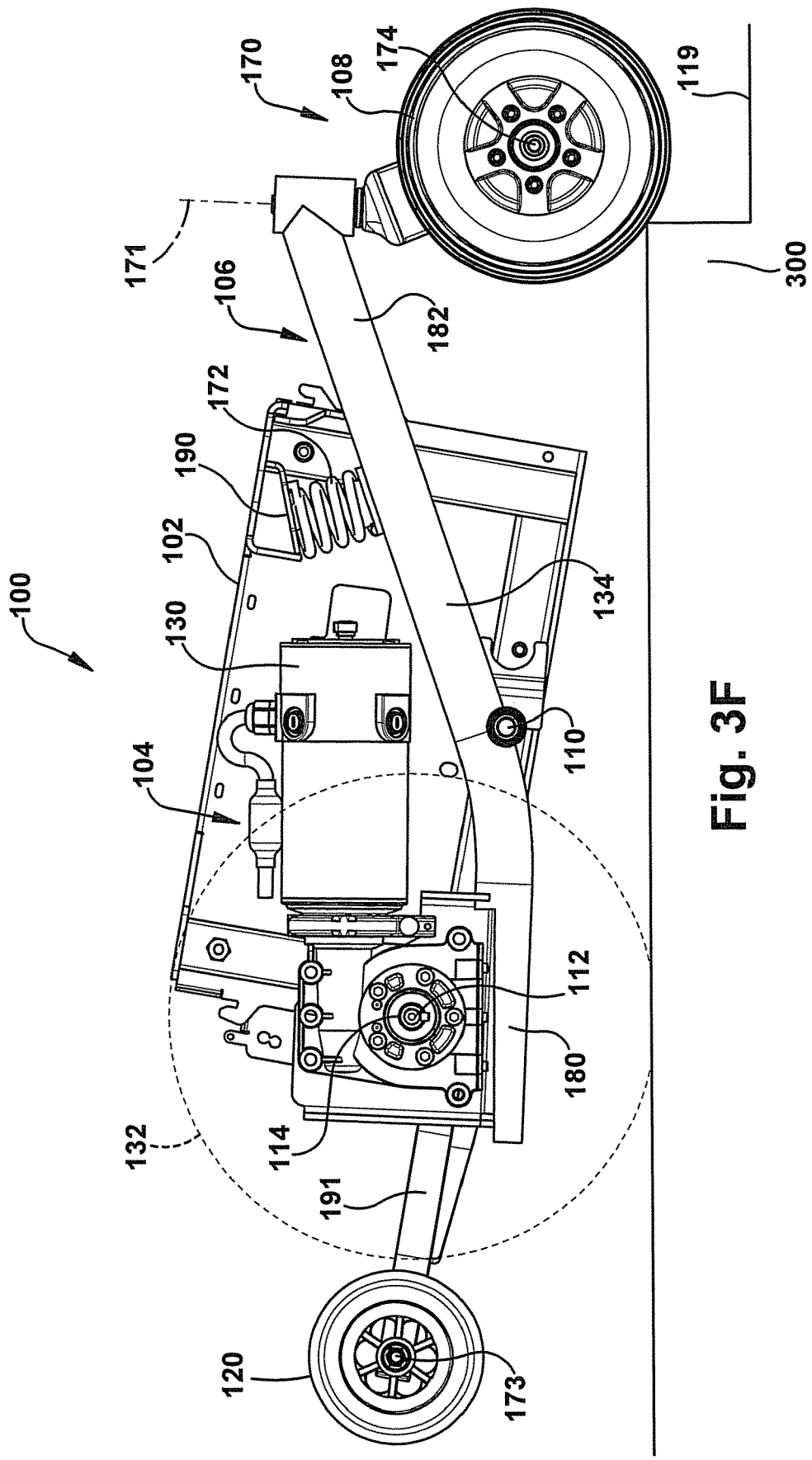
FIG. 3F shows a rear anti-tip wheel of the chassis of FIG. 3B traversing an obstacle.

Referring to FIG. 3F, the drive wheels 132 move the wheelchair 100 further forward on the obstacle 300. The rear anti-tip wheels 108 engage the obstacle 300. The biasing member 172 cushions the impact between the rear anti-tip wheels 108 and the obstacle. The drive wheels 132 continue to drive the wheelchair 100 forward and pull the rear anti-tip wheels 108 up onto the obstacle 300.

Figure 3G:
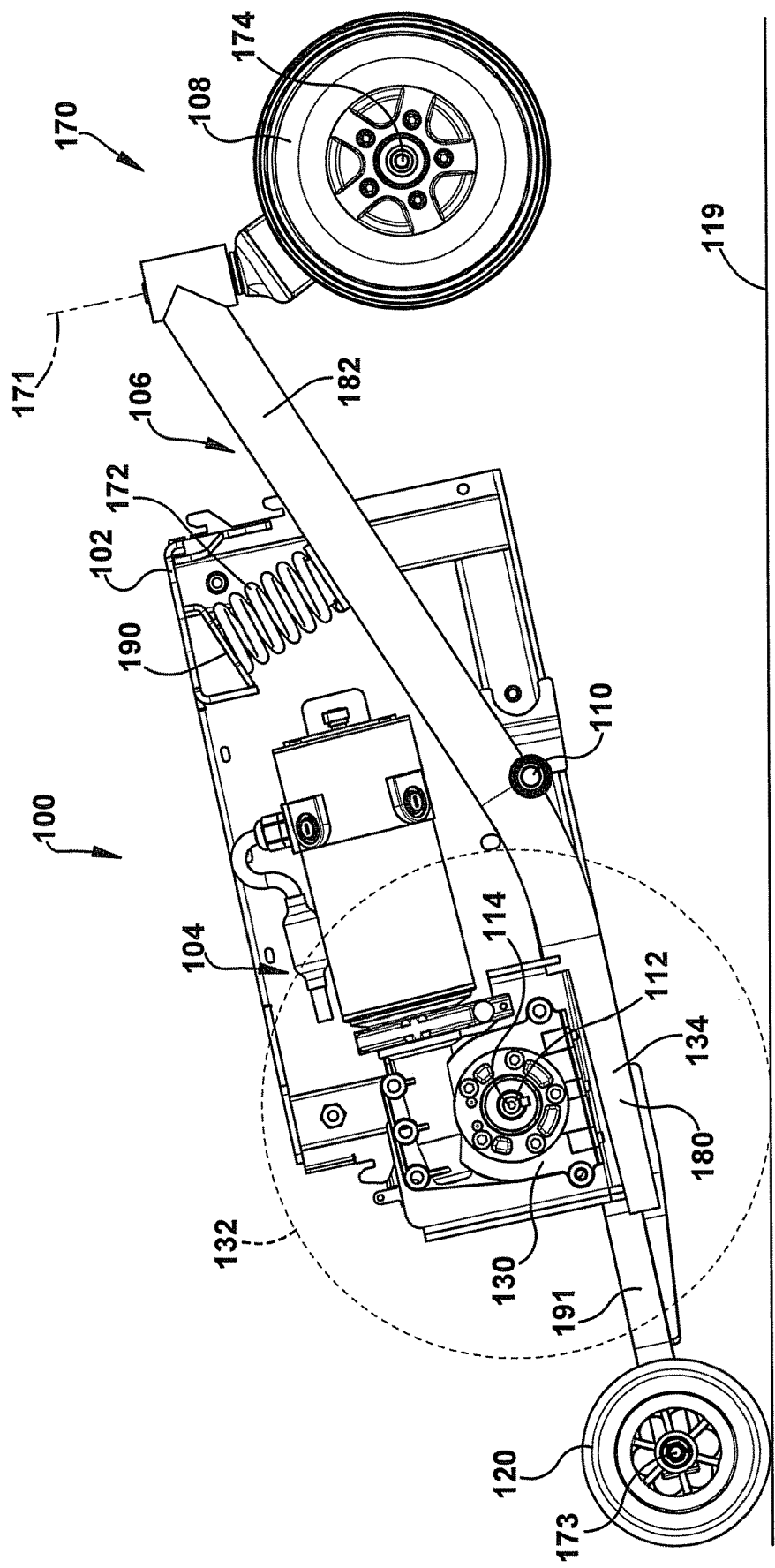
FIG. 3G shows the front anti-tip wheel of the chassis of FIG. 3B in engagement with a support surface to inhibit further tipping.
Figure 3H:
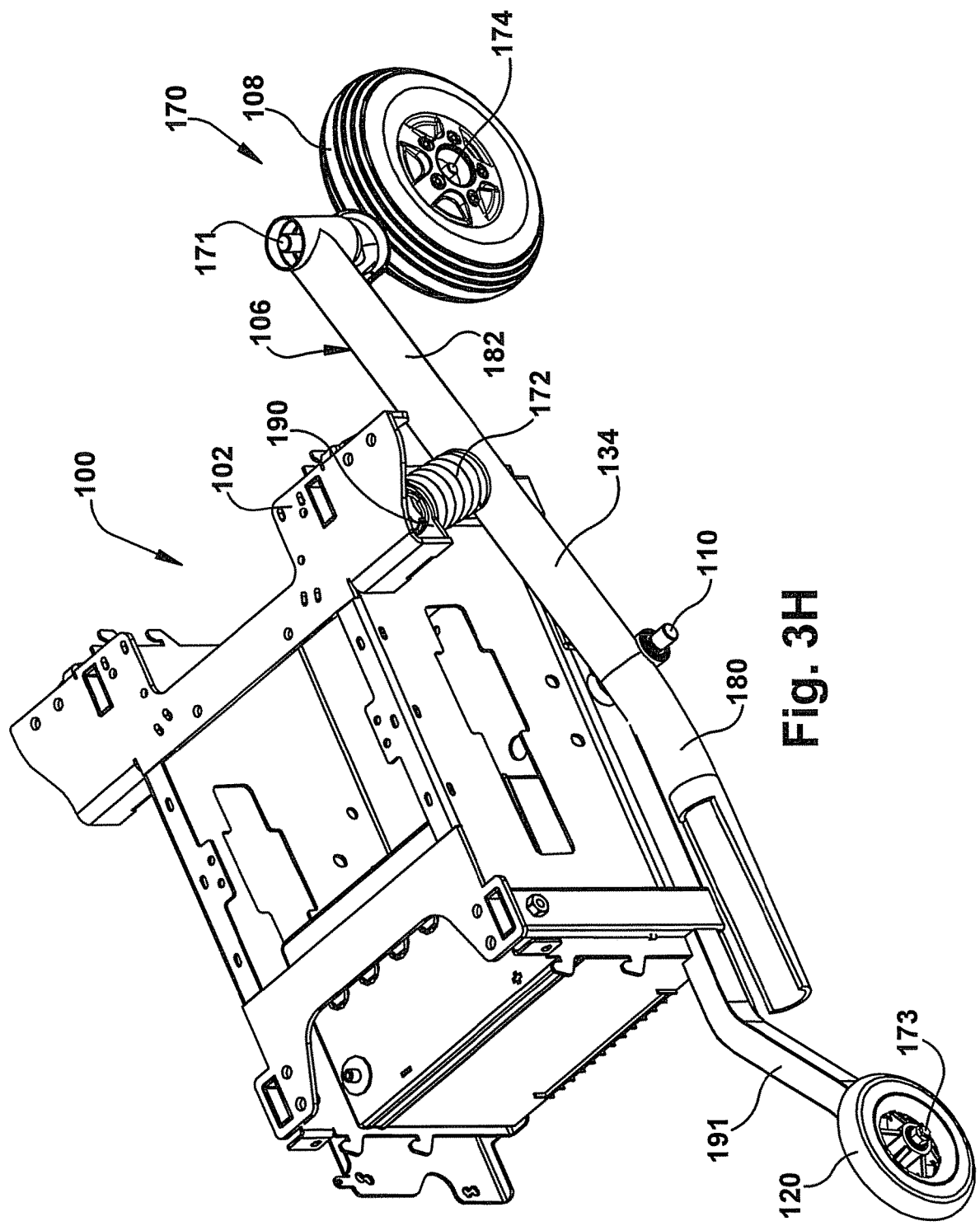
FIG. 3H is a perspective view of the wheelchair of FIG. 3C, with the drive assembly and drive wheel removed.

Referring to FIG. 3G, a variety of situations can cause forward tipping of a wheelchair. For example, traveling down a hill, decelerating rapidly, and driving off of an obstacle, such as a curb can cause forward tipping. In the example illustrated by FIG. 3F, the front anti-tip wheels 120, 121 engage the support surface 119 to prevent excessive forward tipping.

Figure 4A:
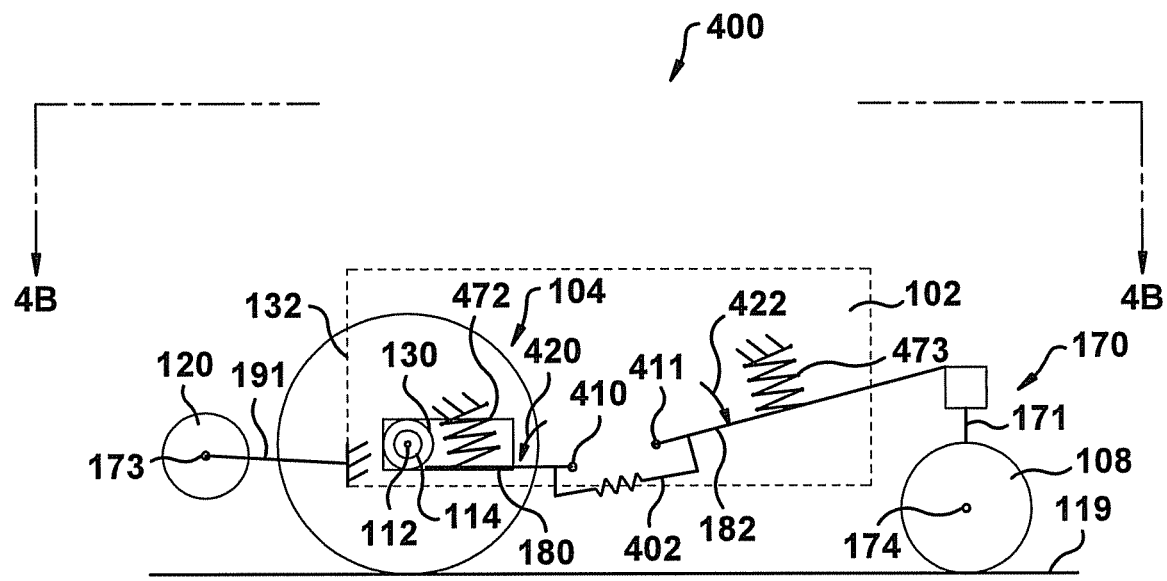
FIG. 4A is a side view of another embodiment of a wheelchair.
Figure 4B:
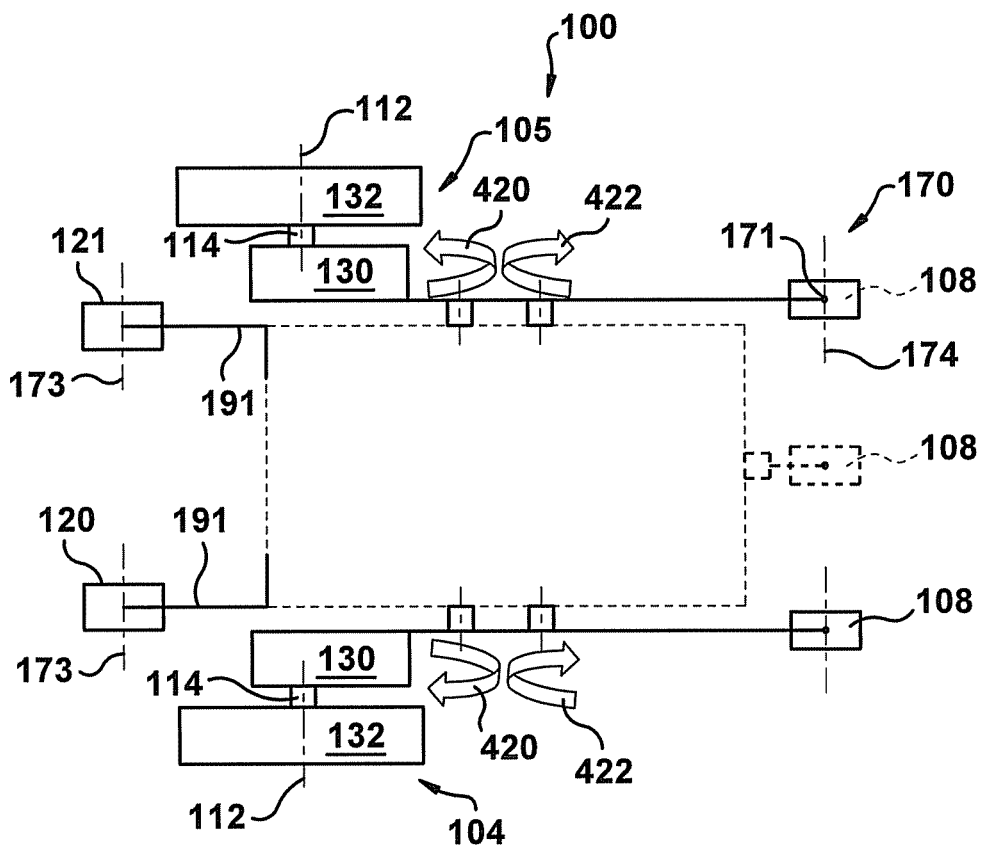
FIG. 4B is a top view of the embodiment of the wheelchair shown in FIG. 4A.

FIGS. 4A and 4B illustrate another embodiment of a wheelchair 400. The wheelchair 400 has separate forward and rearward links 180, 182. Referring to FIG. 4B, as in all of the embodiments described herein, the wheelchair 400 may include any number of rear anti-tip wheels. For example, FIG. 4B illustrates that the wheelchair 400 may include a single center anti-tip wheel (shown in phantom), first and second rear anti-tip wheels (shown in solid lines), or three rear anti-tip wheels (all of the illustrated anti-tip wheels). The forward link 180 is pivotally connected to the frame 102 at a pivot axis 410 and the rearward link 182 is pivotally connected to the frame at a pivot axis 411. The pivot axes 410, 411 may be positioned at any location with respect to the frame 102, including locations near or below the frame. The pivot axis 410 may be forward or rearward of the axis of rotation 112 of the drive wheel. The pivot axis 410 may be coincident with the pivot axis 411. The separate links 180, 182 allow for independent movement of the drive assembly 104 relative to the rear anti-tip wheel 108. Separate biasing members 472, 473 bias the links 180, 182 downward relative to the frame as indicated by arrows 420, 422 respectively. An optional motion transfer link 402 may be coupled to the forward and rearward links 180, 182 to control relative motion therebetween. The motion transfer link 402 can take a wide variety of different forms. For example, the link may be rigid, flexible, or extendible in length. Any link or arrangement that transfers at least some portion of motion in at least one direction of the forward link 180 to the rearward link 182 and/or vice versa can be used as a motion transfer link 402. Examples include, but are not limited to springs, struts, shock absorbers, rigid links, flexible links, belts, wires, cam arrangements, gear trains, any combination of these, etc.

Figure 5:
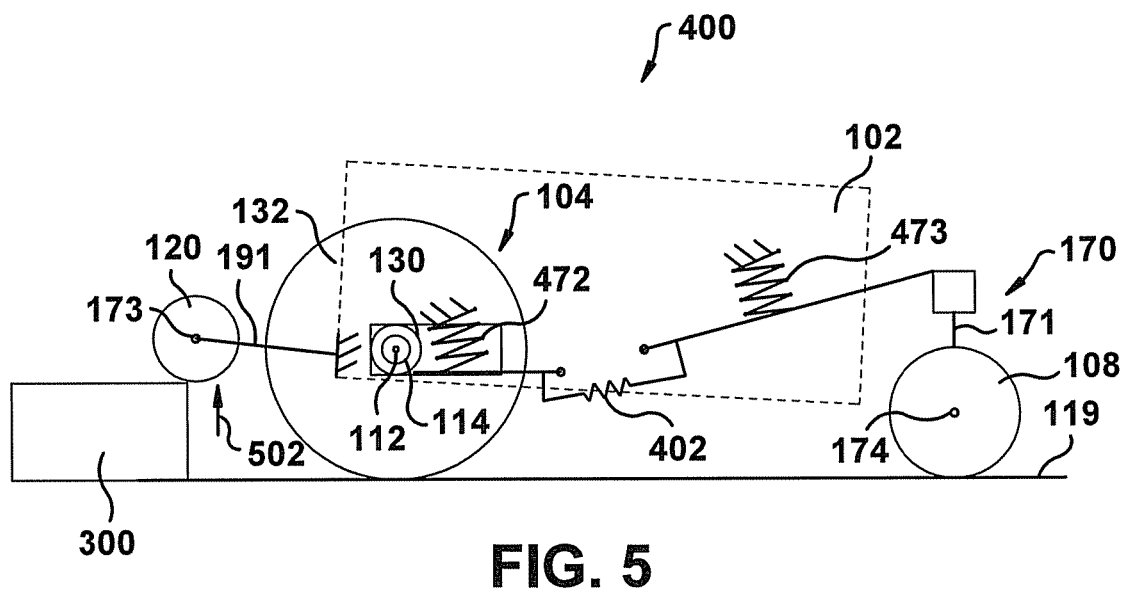
FIG. 5 is a side view of the wheelchair of FIG. 4A traversing an obstacle.

FIG. 5 illustrates the wheelchair 400 traversing over an obstacle 300. The drive wheels 132 bring the front anti-tip wheels 120 into engagement with the obstacle 300. The drive wheels 132 force the anti-tip wheels 120 up and onto the obstacle. The rear anti-tip wheels are biased against the ground by the biasing member 473 and the drive wheels 132 are biased against the ground by the biasing member 472. Upward movement (indicated by arrow 502) of the front anti-tip wheels 120 causes the frame 102 to cant. The canting of the frame 102 may cause some relaxation of the biasing member 472 and/or some compression of the biasing member 473. The drive wheels 132 continue to drive the wheelchair 400 forward, and the drive wheels climb over the obstacle 300. The drive wheels 132 move the wheelchair 400 further forward to pull the rear anti-tip wheels over the obstacle 300.

Figure 6A:
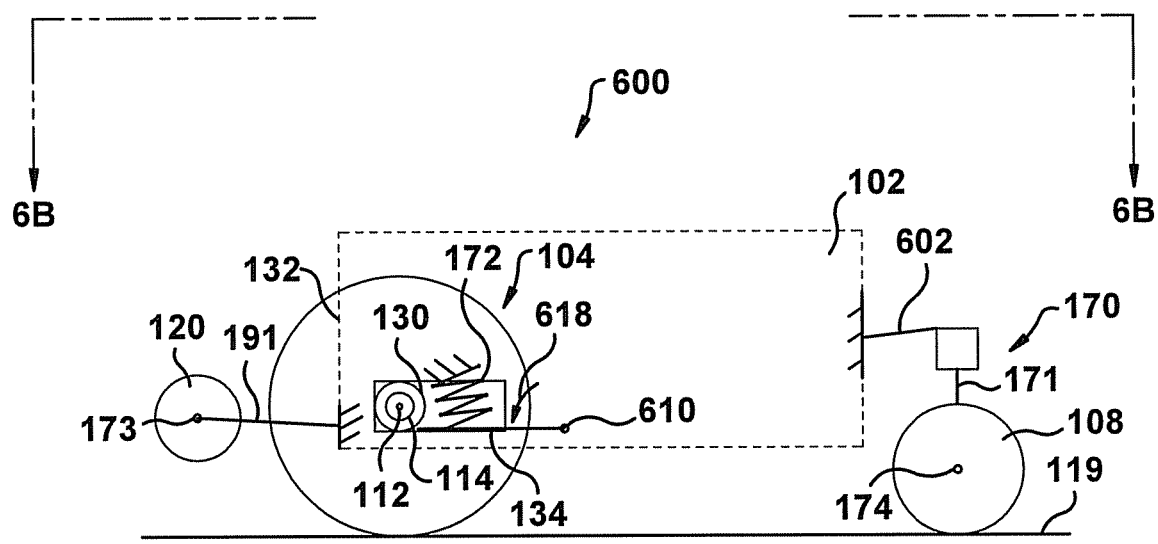
FIG. 6A is a side view of another embodiment of a wheelchair.
Figure 6B:
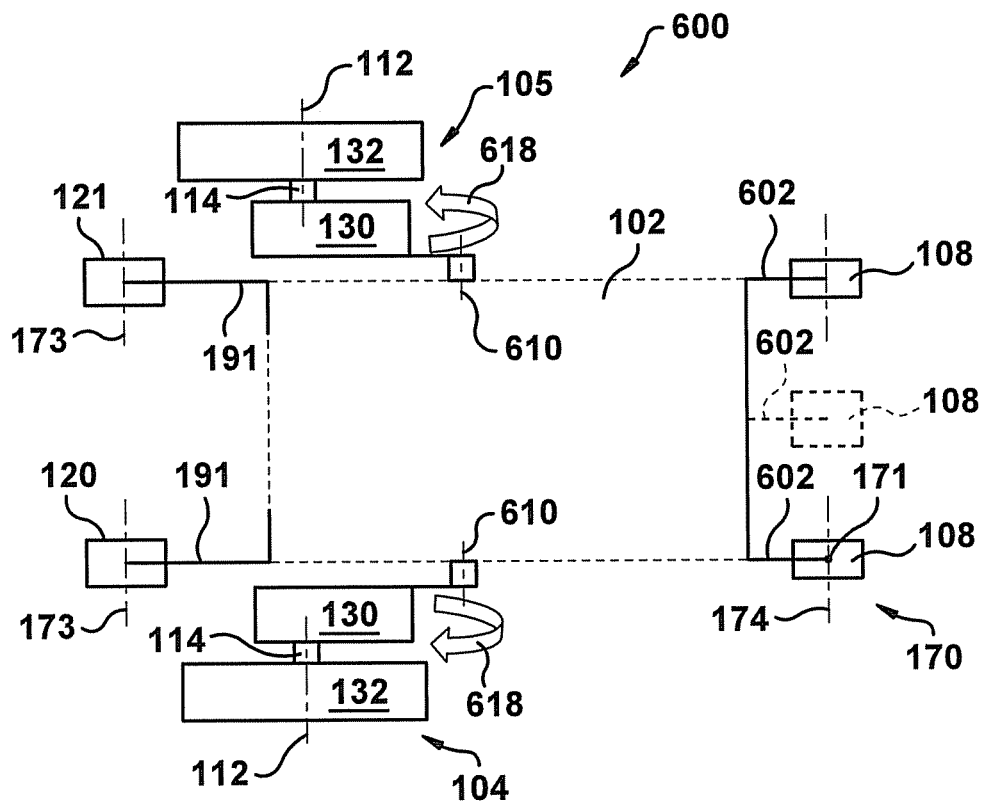
FIG. 6B is a top view of the embodiment of the wheelchair shown in FIG. 6A.

FIGS. 6A and 6B illustrate another embodiment of a wheelchair 600. The wheelchair 600 has a pivot arm 134 and one or more rear anti-tip wheels 108 are connected to the frame 102 by a fixed arm 602. The drive assembly 104 is connected to the pivot arm 134. The pivot arm 134 is pivotally connected to the frame 102 at a pivot axis 610. The pivot axis 610 may be positioned at any location with respect to the frame 102, including locations near or below the frame. The pivot axis 610 may be forward or rearward of the axis of rotation 112 of the drive wheel. The biasing member 172 biases the pivot arm 134 downward relative to the frame as indicated by arrow 618.

Figure 7:
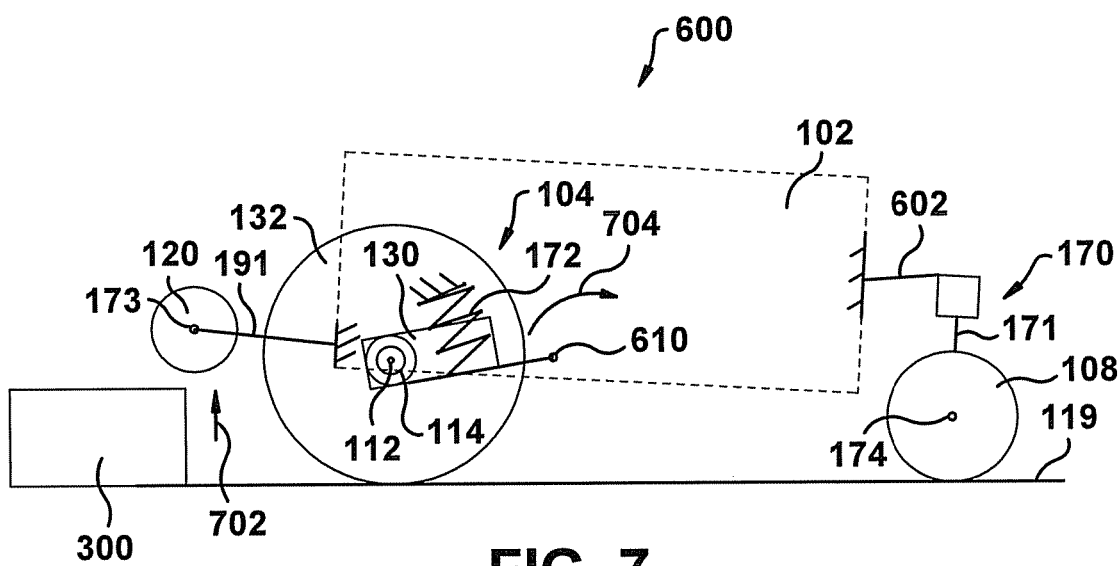
FIG. 7 is a side view of the wheelchair of FIG. 6A traversing an obstacle.

FIG. 7 illustrates the wheelchair 600 traversing over an obstacle 300. The drive wheels 132 bring the front anti-tip wheels 120 into engagement with the obstacle 300. The drive wheels 132 force the anti-tip wheels 120 up and onto the obstacle. The drive wheels 132 are biased against the ground by the biasing member 172. Upward movement (indicated by arrow 702) of the front anti-tip wheels 120 causes the frame 102 to pivot about the pivot axis 610 (indicated by arrow 704). The pivoting of the frame 102 may cause some relaxation of the biasing member 172 depending on the arrangement of the biasing member. The drive wheels 132 continue to drive the wheelchair 600 forward, and the drive wheels climb over the obstacle 300. The drive wheels 132 move the wheelchair 600 further forward to pull the rear anti-tip wheels 108 over the obstacle 300.

Figure 8A:
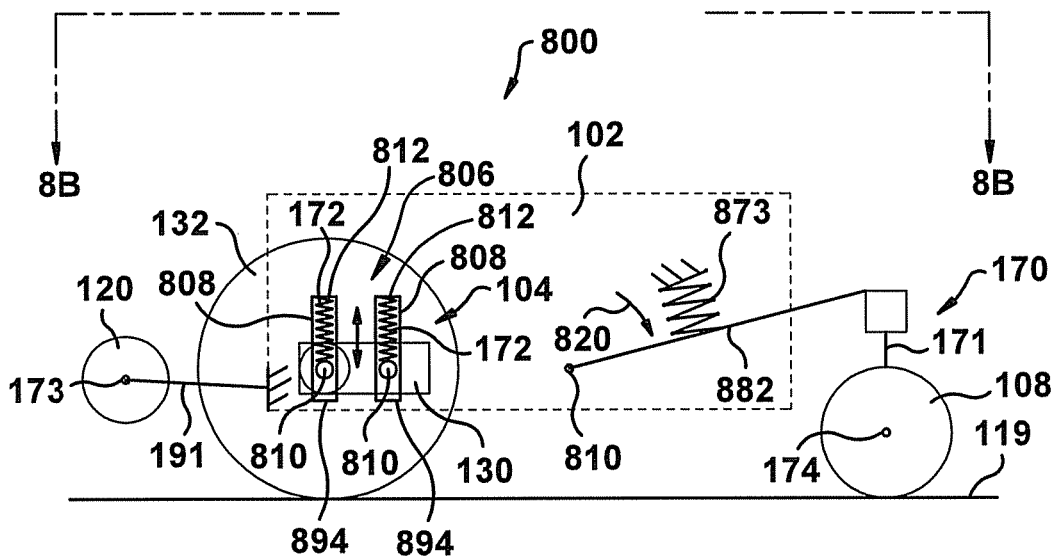
FIG. 8A is a side view of another embodiment of a wheelchair.
Figure 8B:
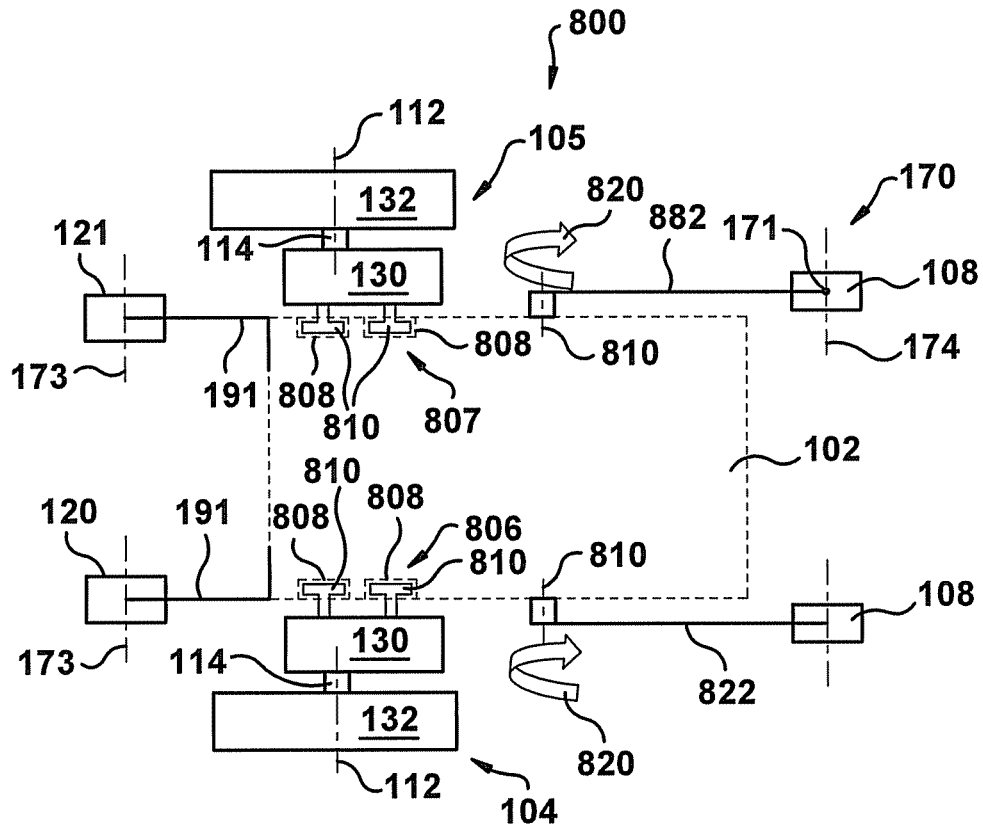
FIG. 8B is a top view of the embodiment of the wheelchair shown in FIG. 8A.

FIGS. 8A and 8B illustrate another embodiment of a wheelchair 800. In the exemplary embodiment illustrated by FIGS. 8A and 8B, the wheelchair includes track suspension assemblies 806, 807 (see FIG. 8B). The suspension assemblies 806, 807 are mirror images of one another. As such, only suspension assembly 806 is described in detail. The suspension assembly 806 may be any arrangement that defines a path of travel of the drive assembly 104 with respect to the frame 102. For example, the suspension assembly 806 may include at least one track 808, at least one follower 810, and at least one biasing member 172, such as a spring or other similar device. The illustrated suspension assembly 806 includes two tracks 808 and two followers 810, but any number of tracks and followers can be used. The illustrated followers 810 are attached to the drive assembly 104 and the tracks 808 are attached to the frame 102. Alternatively, the followers 810 could be attached to the frame 102 with the tracks 808 attached to the drive assembly 104. Further, the drive assembly 104 and/or frame 102 may be otherwise coupled to the tracks 808 and followers 810. In the illustrated embodiment, the followers 810 are slideably disposed in the tracks 808 such that the tracks 808 define the path of relative movement of the drive assembly 104 relative to the frame 102.

The illustrated tracks 808 are linear and define a path of travel that extends in a generally vertical direction. However, the tracks can be configured to define a path of travel having any shape, extending in any direction, including arcuate shapes. The path of travel can have one or more straight and/or curved portions. Further, an arrangement may be included to rotate the drive assembly 104 relative to the frame 102 as the drive assembly 104 moves along the path of travel.

The biasing member 172 can take a wide variety of different forms, as described above. In the example illustrated by FIGS. 8A and 8B, the biasing member 172 is disposed in the track 808 between an end 812 of the track and the follower 810. This arrangement biases the drive assembly 104 downward relative to the frame 102. However, the biasing member 172 can be arranged in any manner to provide a biasing force between the drive assembly 104 and the frame 102. The biasing member 172 may be connected directly to the frame 102 and the drive assembly 104 or through one or more intermediate members. An optional stop 894, such as the end surface of the track, may be fixed to the frame to limit downward movement of the drive assembly 104 with respect to the frame. In an exemplary embodiment, the biasing member 172 causes the drive wheel 132 to engage the horizontal support surface 119 when the wheelchair is at rest on the horizontal support surface.

In the example illustrated by FIGS. 8A and 8B, the wheelchair 800 has a rearward link 882 that supports the rear anti-tip wheel 108. The rearward link 882 is optionally pivotally connected to the frame at a pivot axis 810. The pivot axis 810 may be positioned at any location with respect to the frame 102, including locations near or below the frame. The separate link 882 allow for independent movement of the drive assembly 104 relative to the rear anti-tip wheel 108. A separate biasing member 873 biases the link 882 downward relative to the frame 102 as indicated by arrow 820.

Figure 9:
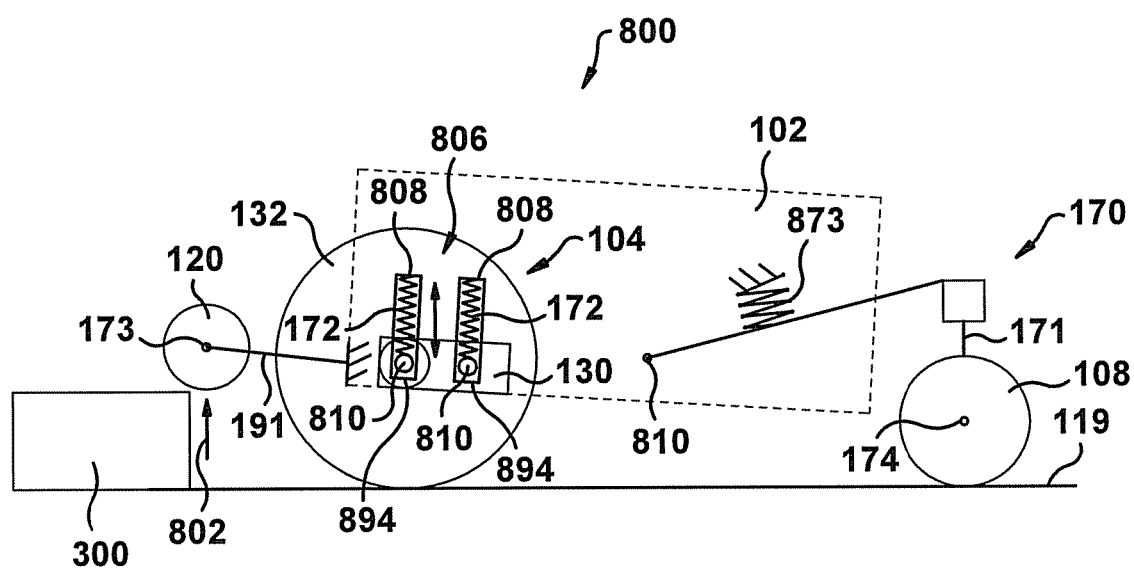
FIG. 9 is a side view of the wheelchair of FIG. 8A traversing an obstacle.

FIG. 9 illustrates the wheelchair 800 traversing over an obstacle 300. The drive wheels 132 bring the front anti-tip wheels 120 into engagement with the obstacle 300. The drive wheels 132 force the anti-tip wheels 120 up and onto the obstacle. The rear anti-tip wheels 108 are biased against the ground by the biasing member 873 and the drive wheels 132 are biased against the ground by the biasing member 172. Upward movement (indicated by arrow 802) of the front anti-tip wheels 120 causes the frame 102 to cant. The canting of the frame 102 may cause some relaxation of the biasing member 172 and some compression of the biasing member 873. The drive wheels 132 continue to drive the wheelchair 800 forward, and the drive wheels climb over the obstacle 300. The drive wheels 132 move the wheelchair 800 further forward to pull the rear anti-tip wheels over the obstacle 300.

Figure 10A:
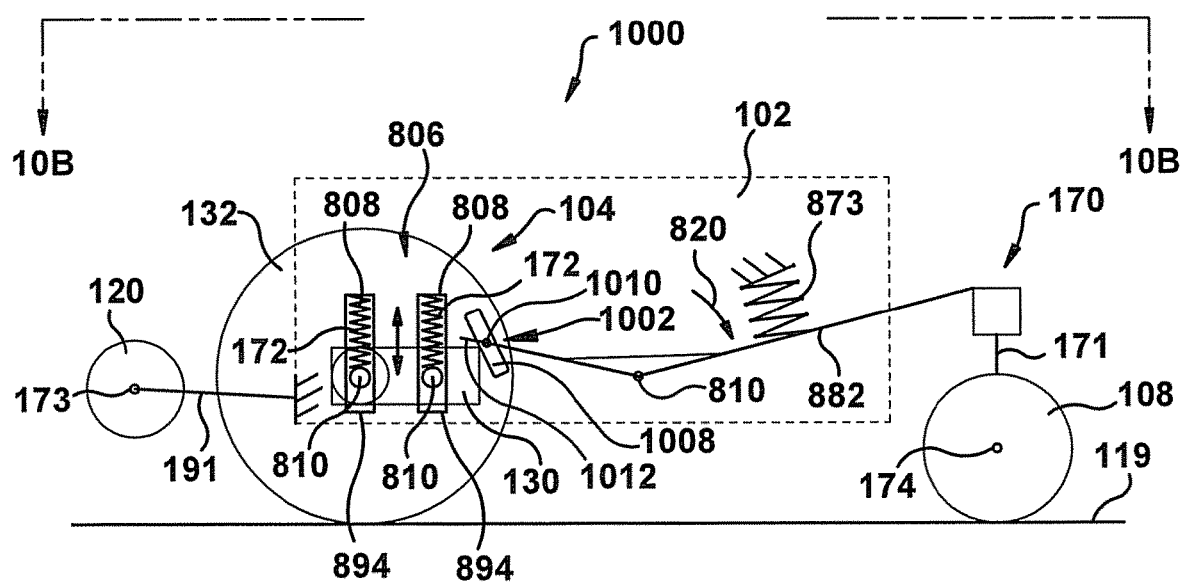
FIG. 10A is a side view of another embodiment of a wheelchair.
Figure 10B:
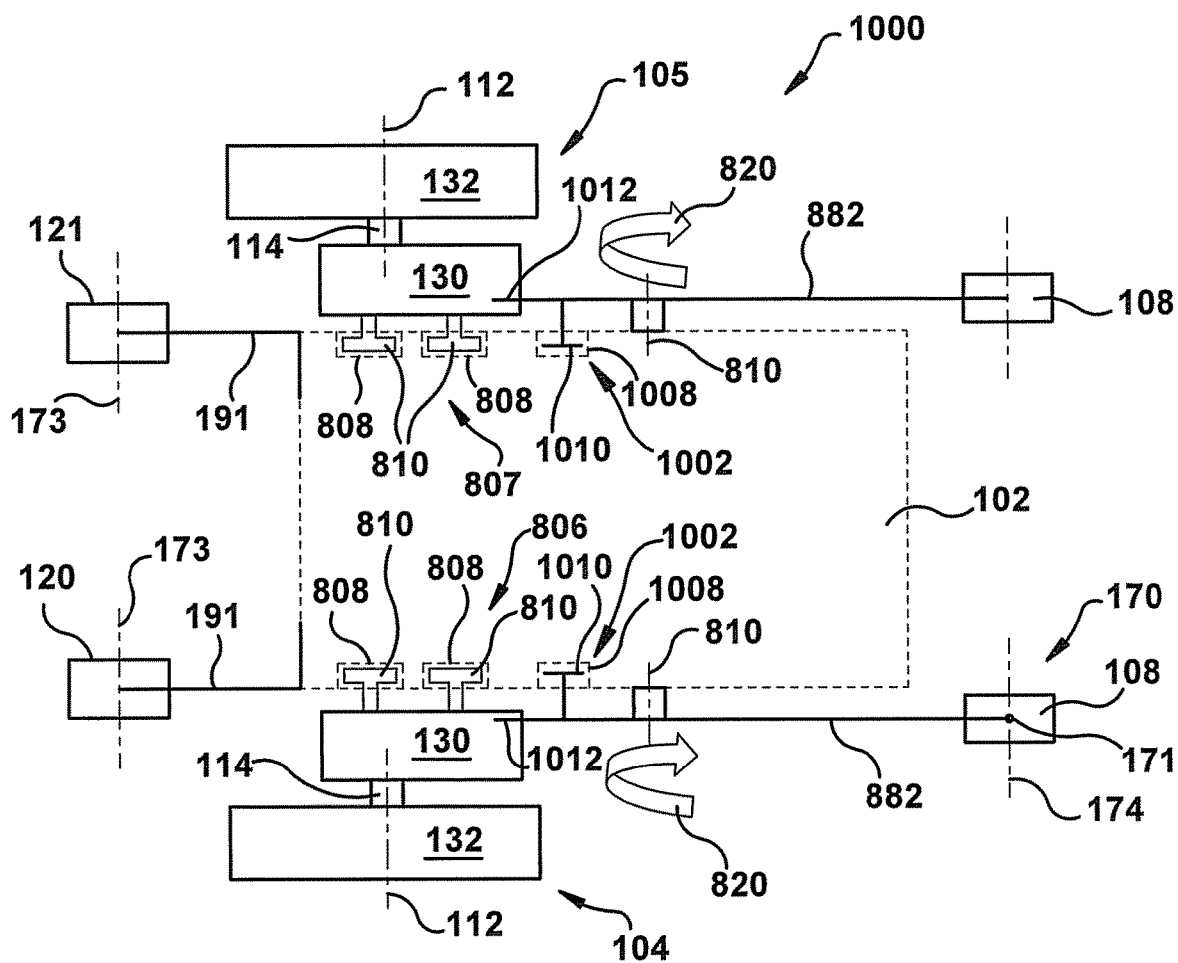
FIG. 10B is a top view of the embodiment of the wheelchair shown in FIG. 10A.

FIGS. 10A and 10B illustrate another embodiment of a wheelchair 1000. The wheelchair 1000 is similar to the wheelchair 800, with the exception that the movement of the rear anti-tip wheels 108 relative to the frame 102 is at least partially linked to movement of the drive assembly 104 relative to the frame. This coupling can be accomplished in a wide variety of different ways. In the example illustrated by FIG. 10A, the relative movement of the drive assembly 104 relative to the rear anti-tip wheels 108 is restricted by another track and follower arrangement 1002. However, any arrangement can be used. Any link or arrangement that transfers at least some portion of motion in at least one direction of the drive assembly 104 to the rear anti-tip wheel 108 can be used.

The illustrated track and follower arrangement 1002 includes at least one track 1008, at least one follower 1010, and at least one coupling member 1012. The illustrated follower 1010 is attached or coupled to the pivot link 882 and the track 1008 is attached to the frame 102. Alternatively, the follower 1010 could be attached to the frame 102 with the track 1008 attached to the pivot link 882. In the illustrated embodiment, the follower 1010 is slideably disposed in the track 1008. The illustrated track 1008 is linear and defines a path of travel that extends in a generally vertical direction. However, the tracks can be configured to define a path of travel having any shape, extending in any direction, including arcuate shapes. The path of travel can have one or more straight and/or curved portions.

In the illustrated embodiment, the coupling member 1012 couples the follower 1010 to the drive assembly 104. As a result, the position of the rear anti-tip wheel 108 is at least partially dependent on the position of the drive assembly 104. The coupling member 1012 can take a wide variety of different forms. Any arrangement of transferring at least some portion of movement of the drive assembly 104 to the follower can be used. In the illustrated embodiment, the follower 1012 is an extension of the link 882 that is engaged by the drive assembly 104 when the drive assembly moves upward relative to the frame 102. This upward movement of the follower 1010 relative to the frame translates into downward movement of the rear anti-tip wheel relative to the frame 102 in the embodiment illustrated by FIG. 10A.

The wheelchair 1000 will traverse obstacles in generally the same manner as the wheelchair 800, except the movement of the rear anti-tip wheel 108 relative to the frame is somewhat dependent on the position of the drive assembly 104 relative to the frame.

Figure 11A:
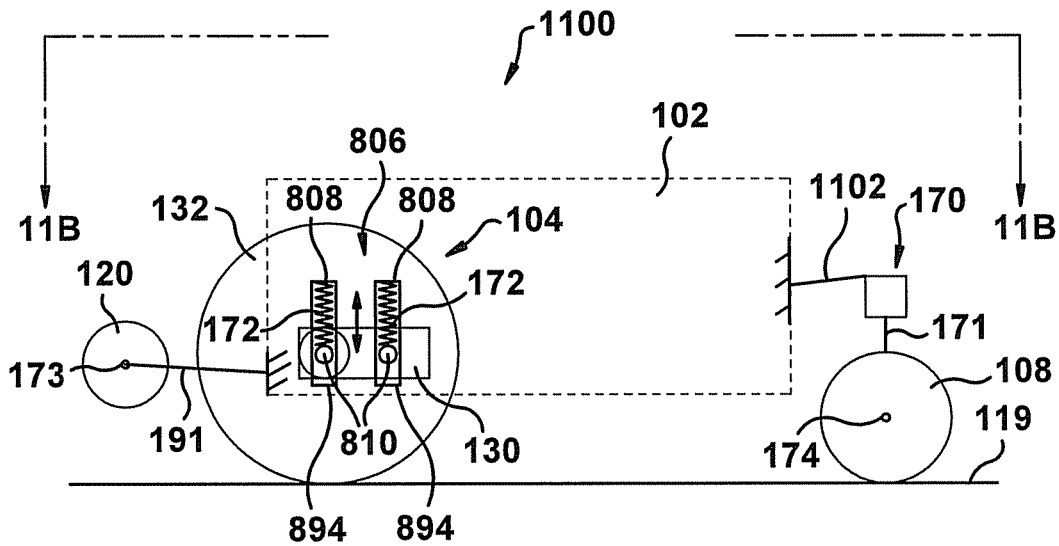
FIG. 11A is a side view of another embodiment of a wheelchair.
Figure 11B:
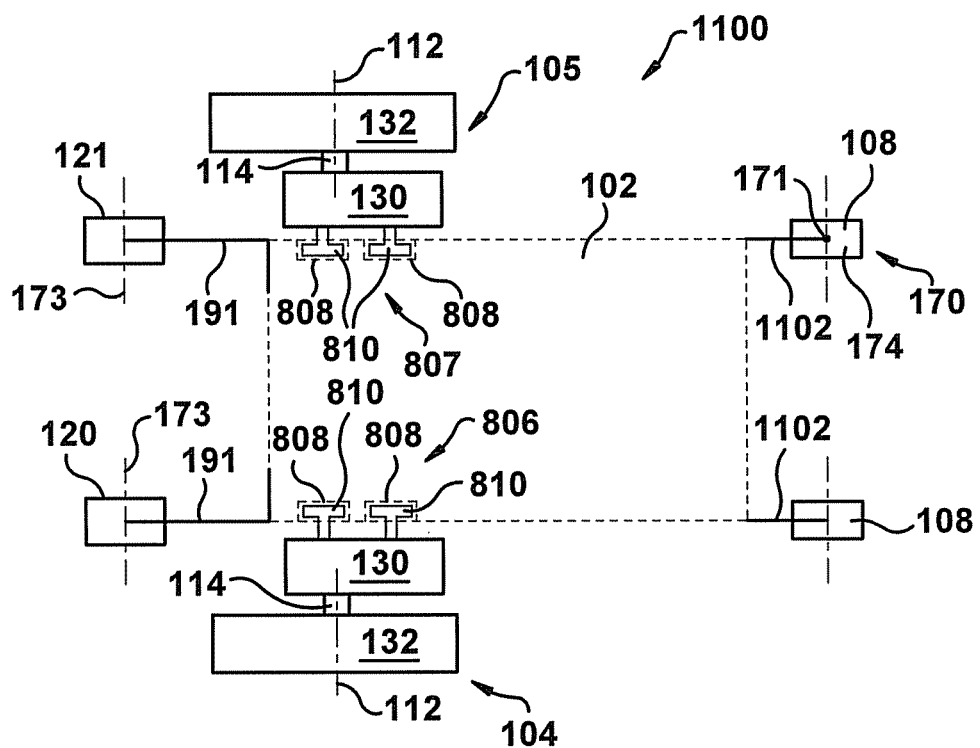
FIG. 11B is a top view of the embodiment of the wheelchair shown in FIG. 11A.
Figure 12:
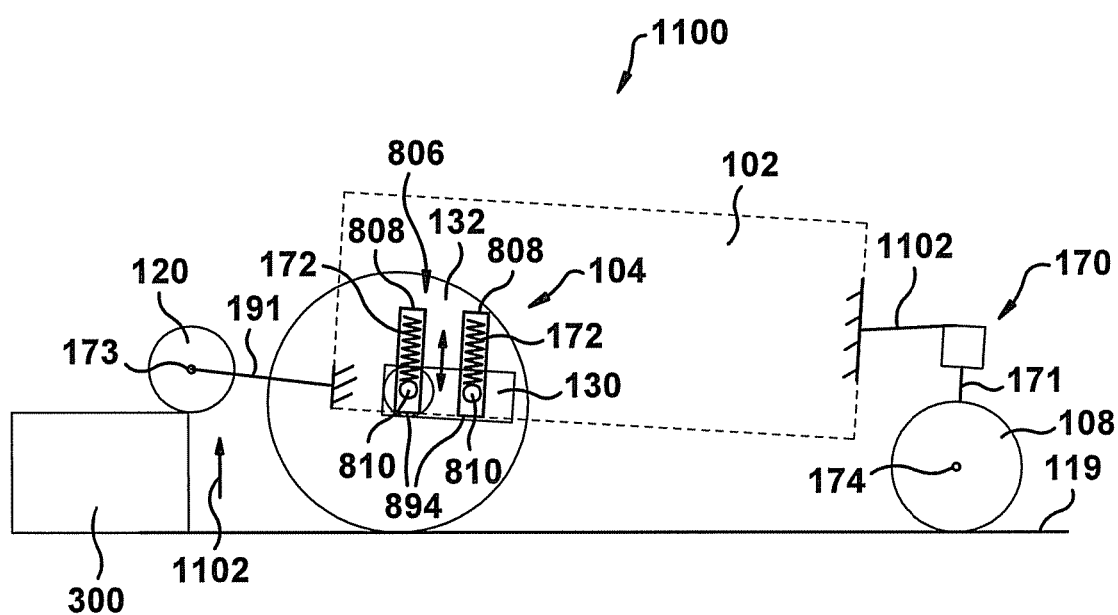
FIG. 12 is a side view of the wheelchair of FIG. 11A traversing an obstacle.

FIGS. 11A and 11B illustrate another embodiment of a wheelchair 1100. The wheelchair 1100 is similar to the wheelchair 1000, except the rear anti-tip wheel 108 is connected to the frame 102 by a fixed arm 1102. FIG. 12 illustrates the wheelchair 1100 traversing over an obstacle 300. The drive wheels 132 bring the front anti-tip wheels 120 into engagement with the obstacle 300. The drive wheels 132 force the anti-tip wheels 120 up and onto the obstacle. The drive wheels 132 are biased against the ground by the biasing member 172. Upward movement (indicated by arrow 1102) of the front anti-tip wheels 120 causes the frame 102 to cant. The canting of the frame 102 may cause some relaxation of the biasing member 172 depending on the arrangement of the biasing member. The drive wheels 132 continue to drive the wheelchair 1100 forward, and the drive wheels climb over the obstacle 300. The drive wheels 132 move the wheelchair 1100 further forward to pull the rear anti-tip wheels 108 over the obstacle 300.

Figure 13A:
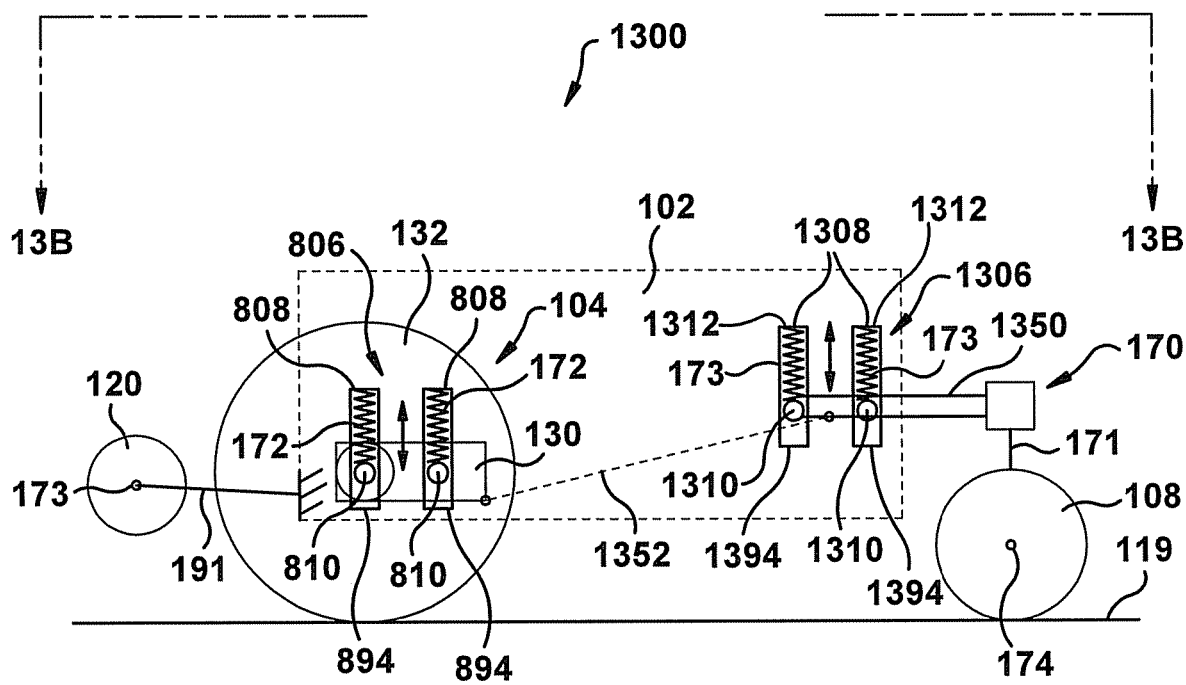
FIG. 13A is a side view of another embodiment of a wheelchair.
Figure 13B:
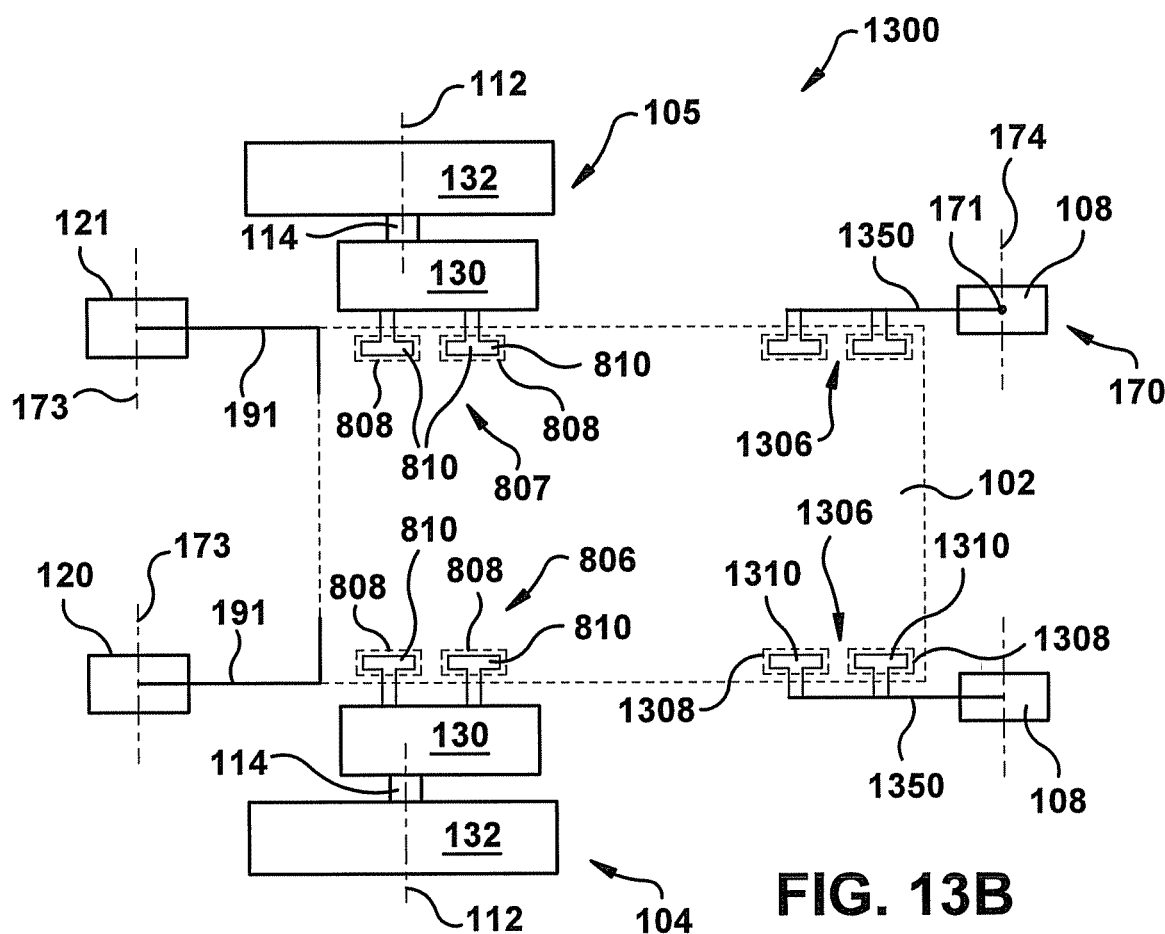
FIG. 13B is a top view of the embodiment of the wheelchair shown in FIG. 13A.

FIGS. 13A and 13B illustrate another embodiment of a wheelchair 1300. The wheelchair 1300 is similar to the wheelchair 800, except the rear anti-tip wheels 108 are each coupled to the frame 102 by a track suspension assembly 1306. The suspension assembly 1306 may be any arrangement that defines a path of travel of the rear anti-tip wheel with respect to the frame. For example, the suspension assembly 1306 may include at least one track 1308, at least one follower 1310, and at least one biasing member 173, such as a spring. The illustrated suspension assembly 1306 includes two tracks 1308 and two followers 1310, but any number of tracks and followers can be used. The illustrated followers 1310 are attached to an arm 1350 that carries the rear anti-tip wheel 108 and the tracks 1308 are attached to the frame 102. Alternatively, the followers 1310 could be attached to the frame 102 with the tracks 1308 attached to the rear anti-tip wheel. Further, the rear anti-tip wheels 108 and/or the frame 102 may be otherwise coupled to the tracks 1308 and followers 1310. In the illustrated embodiment, the followers 1310 are slideably disposed in the tracks 1308 such that the tracks 808 define the path of relative movement of the rear anti-tip wheels 108 with respect to the frame 102. The illustrated tracks 808 are linear and define a path of travel that extends in a generally vertical direction. However, the tracks can be configured to define a path of travel having any shape, extending in any direction. The path of travel can have one or more straight and/or curved portions. Further, the arm 1350 can be pivoted or rotated relative to the frame as the arm 1350 and connected anti-tip wheel 108 moves along the path of travel.

The biasing member 173 can take a wide variety of different forms as described above. In the example illustrated by FIGS. 13A and 13B, the biasing member 173 is disposed in the track 1308 between an end 1312 of the track and the follower 1310. This arrangement biases the anti-tip wheel 108 downward relative to the frame 102. However, the biasing member 173 can be arranged in any manner to provide a biasing force between the rear anti-tip wheel 108 and the frame 102. The biasing member 173 may be connected directly to the frame 102 and the anti-tip wheel 108 or through one or more intermediate members. A stop 1394, such as the end surface of the track, may be fixed to the frame to limit downward movement of the rear anti-tip wheel 108 with respect to the frame. In an exemplary embodiment, the biasing member 173 causes the rear anti-tip wheel 108 to engage the horizontal support surface 119 when the wheelchair is at rest on the horizontal support surface.

Referring to FIG. 13A, an optional motion transfer link 1352 (not shown in FIG. 13B) may be coupled to the drive assembly 104 and the rear anti-tip wheel 108 to control relative motion therebetween. The motion transfer link 1352 can take a wide variety of different forms. For example, the link may be rigid, flexible, or extendible in length. Any link 1352 or arrangement that transfers at least some portion of motion in at least one direction of the drive assembly 104 to the rear anti-tip wheel 108 can be used.

Figure 14A:
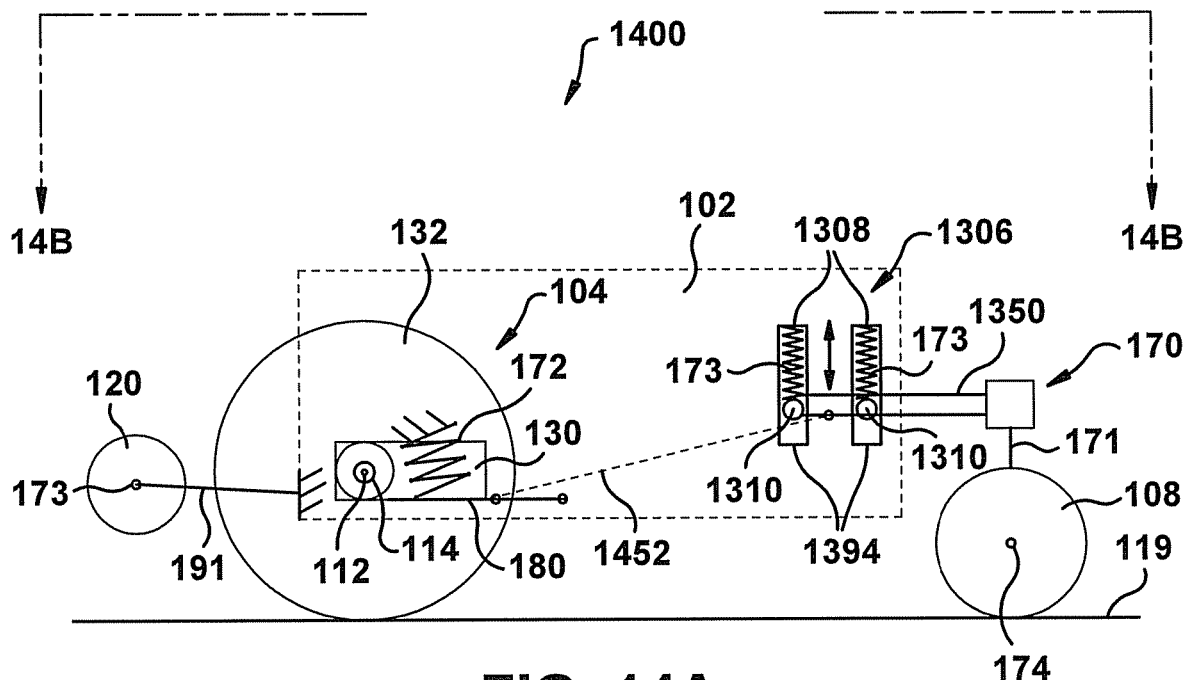
FIG. 14A is a side view of another embodiment of a wheelchair.
Figure 14B:
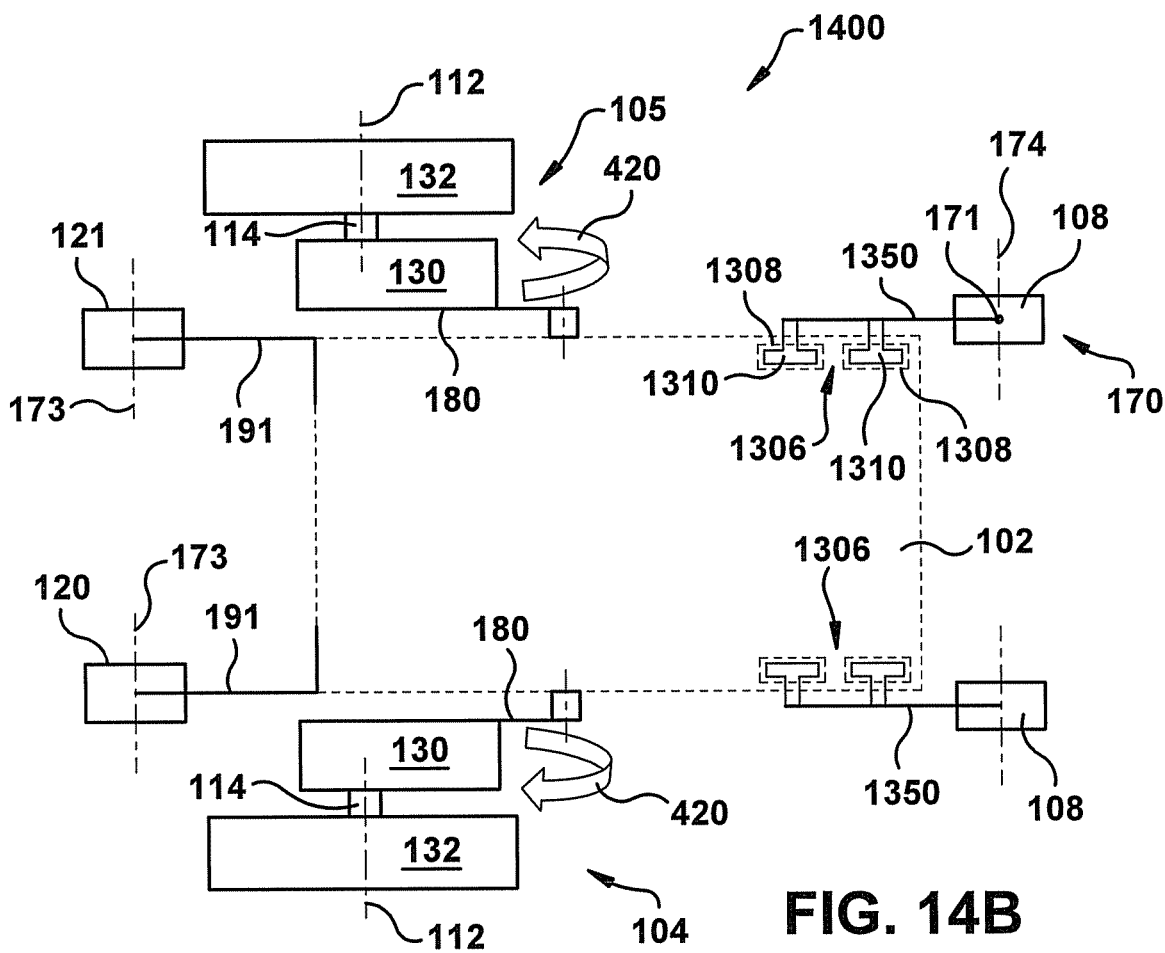
FIG. 14B is a top view of the embodiment of the wheelchair shown in FIG. 14A.

FIGS. 14A and 14B illustrate another embodiment of a wheelchair 1400. The wheelchair 1400 is similar to the wheelchair 1300, except the track suspension assemblies 806 are replaced with the pivot arm 180 and biasing member 172 arrangement shown in FIGS. 4A and 4B. An optional motion transfer link 1452 (not shown in FIG. 14B) may be coupled to the drive assembly 104 and the rear anti-tip wheel 108 to control relative motion therebetween. The motion transfer link 1452 can take a wide variety of different forms and can be coupled to the suspension assemblies in a wide variety of different ways, including, but not limited to, pivot connections, etc. . . . . For example, the link may be rigid, flexible, or extendible in length. Any link 1452 or arrangement that transfers at least some portion of motion in at least one direction of the drive assembly 104 to the rear anti-tip wheel 108 can be used.

Figure 15:
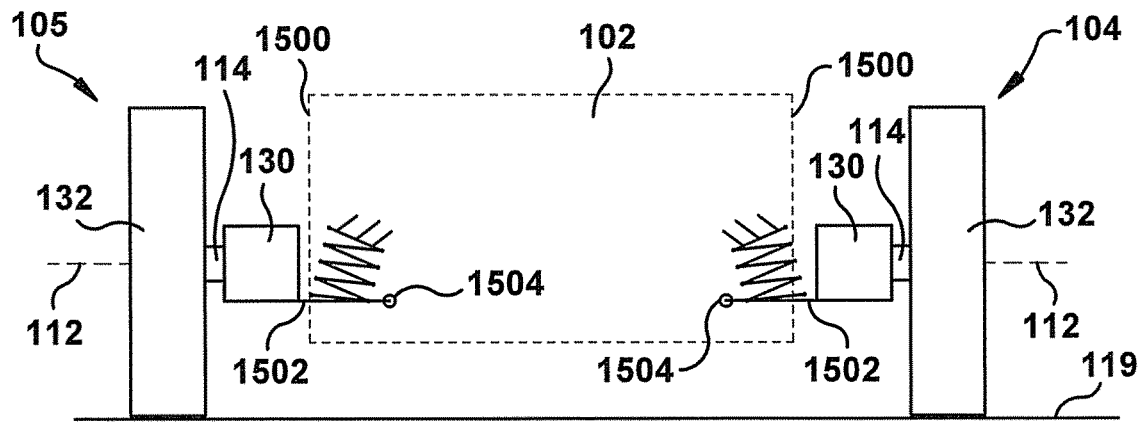
FIG. 15 is a schematic illustration of a pair of drive assemblies independently suspended from a wheelchair frame.

FIG. 15 is a schematic view illustrating drive wheels 132 suspended to sides 1500 of the frame 102. In one embodiment, one or more wheels that are suspended from the frame, such as drive wheels 132, front anti-tip wheels 120, 121 (not shown in FIG. 15) and/or rear anti-tip wheels 108 (not shown in FIG. 15), are suspended such that upward and downward movement of the wheel does not result in significant fore and aft movement of the suspended wheel. This can be accomplished in a variety of different ways. For example, the track and follower arrangements disclosed above may be configured to have this effect. In FIG. 15, drive wheels 132 are coupled to the frame 102 by a pivot arm 1502. A pivot axis 1504 of the pivot arm 1502 is perpendicular or substantially perpendicular to an axis of rotation 112 of the drive wheel (which is generally perpendicular to the sides 1500 of the frame). As a result, when the pivot arm 1502 pivots upward or downward, the drive wheel 132 does not move substantially fore or aft with respect to the frame 102. Any of the suspensions of wheels relative to the frame disclosed in this application can be replaced with this type of suspension.

Figure 16:
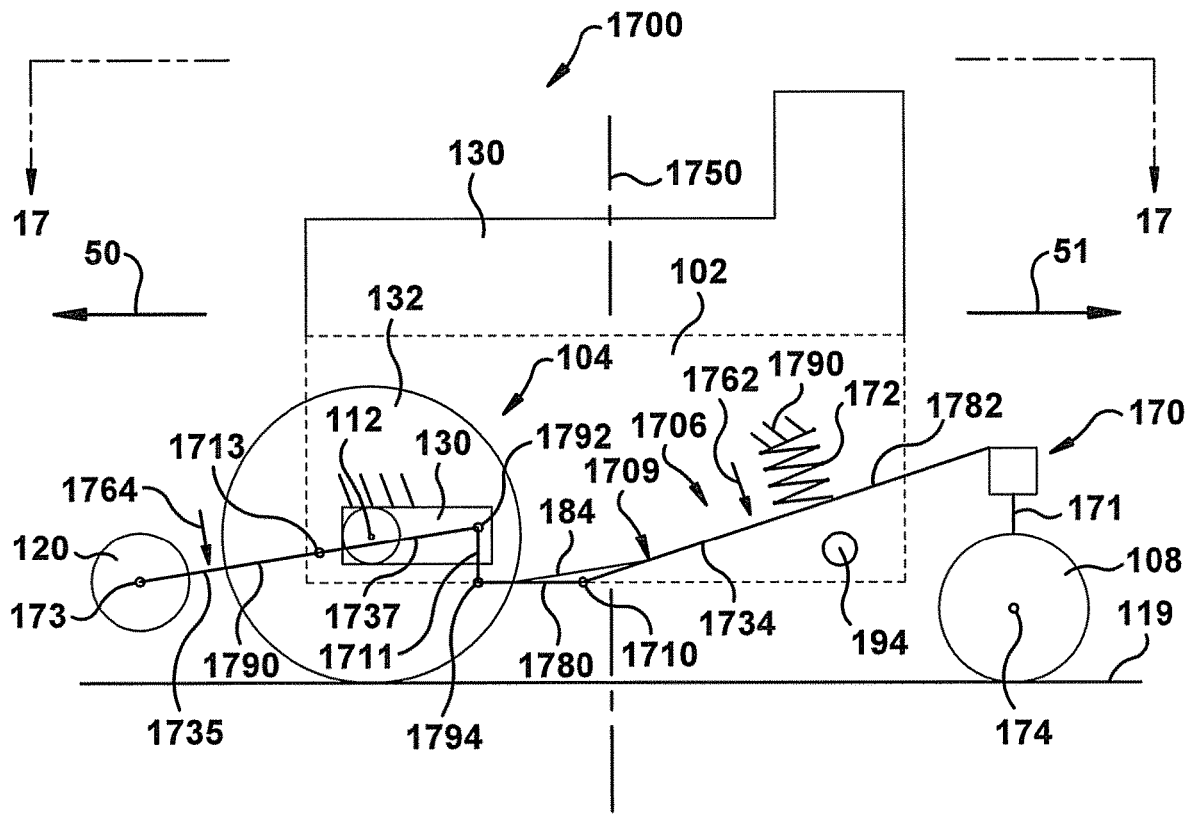
FIG. 16 is a side view of another embodiment of a wheelchair.
Figure 17:
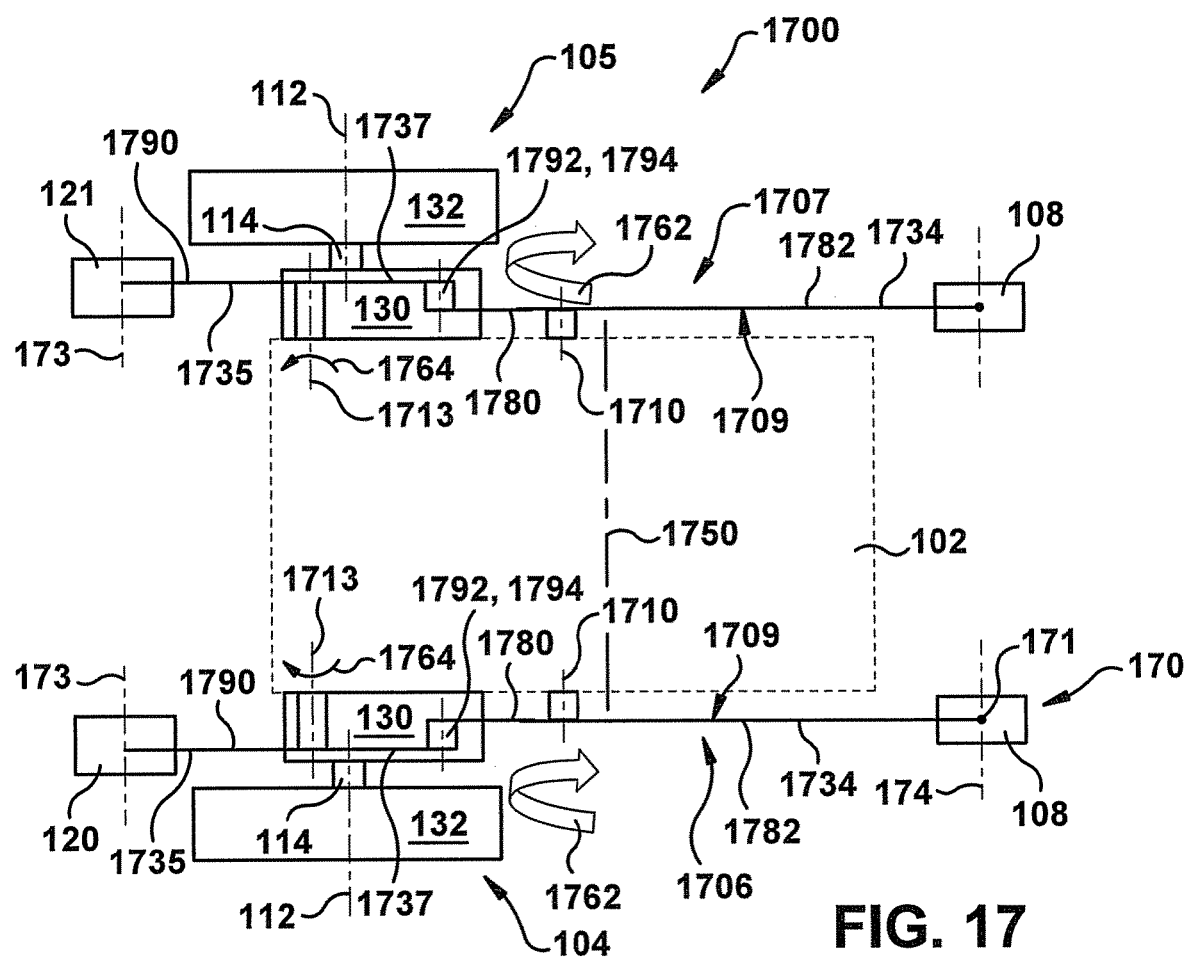
FIG. 17 is a top view of the wheelchair shown in FIG. 16.

FIGS. 16 and 17 illustrate another embodiment of a wheelchair 1700. The wheelchair 1700 includes a frame 102, a seat 103 supported by the frame, first and second drive assemblies 104, 105, first and second suspension assemblies 1706, 1707, first and second front anti-tip wheels 120, 121, and a pair of rear anti-tip wheels 108. Each drive assembly 104, 105 is coupled to the frame 102. In the embodiment illustrated by FIGS. 16 and 17, the drive assemblies are fixed to the frame 102. However, the drive assemblies 104, 105 can alternatively be coupled to the frame in a manner that allows relative movement between the drive assemblies and the frame 102. For example, the drive assemblies 104, 105 can be coupled to the frame 102 using any of the suspension assemblies disclosed in this application.

In the example illustrated by FIGS. 16 and 17, the suspension assemblies 1706, 1707 are mirror images of one another. As such, only suspension assembly 1706 is described in detail. In the exemplary embodiment, a front anti-tip wheel 120 is positioned forward of the drive wheels 122 and the rear anti-tip wheel 108 is positioned rearward of the drive wheels. The suspension 1706 includes a linkage 1709 and a biasing member 172. The linkage 1709 couples the front anti-tip wheel 120 to the rear anti-tip wheel 108 such that movement of the front anti-tip wheel relative to the frame 102 is transferred to the rear anti-tip wheel 108 and/or vice versa. The linkage 1709 may take a wide variety of different forms. Any arrangement that transfers motion of the front anti-tip wheel 120 relative to the frame 102 to the rear anti-tip wheel 108 can be employed. In the exemplary embodiment illustrated by FIGS. 16 and 17, the linkage 1709 couples the front anti-tip wheel 120 to the rear anti-tip wheel 108 such that upward movement of the front anti-tip wheel 120 relative to the frame 102 causes upward movement of the rear anti-tip wheel 108 relative to the frame and/or vice versa. A wide variety of different linkages or arrangements may couple the front anti-tip wheel 120 and the rear anti-tip wheel 108 such that upward movement of the front anti-tip wheel 120 relative to the frame 102 causes upward movement of the rear anti-tip wheel 108 relative to the frame and/or vice versa. The illustrated linkage 1709 is but one example of the many different arrangements that may be used.

The linkage 1709 includes a front anti-tip pivot arm 1790, a rear anti-tip pivot arm 1734, and a connecting link 1711. The front anti-tip pivot arm 1790 is pivotally connected to the frame 102 at a pivot axis 1713. A forward portion 1735 of the front anti-tip pivot arm 1790 extends forward from the pivot axis 1713 and a rearward portion 1737 of the front anti-tip pivot arm 1790 extends rearward from the pivot axis 1713. The rear anti-tip pivot arm 1734 is pivotally coupled to the frame 102 at a pivot axis 1710. A forward portion 1780 of the rear anti-tip pivot arm 1734 extends forward from the pivot axis 1710 and a rearward portion 1782 of the rear anti-tip pivot arm 1734 extends rearward from the pivot axis. The pivot axis 1713 and the pivot axis 1710 can be positioned at a wide variety of different locations. For example, the pivot axis 1713 and the pivot axis 1710 can be positioned at any position on the frame and/or positions below the frame by one or more brackets. In the embodiment illustrated by FIG. 16, the pivot axis 1713 is forward and below the axis of rotation 112 of the drive wheel 132. In the embodiment illustrated by FIG. 16C and the embodiment illustrated by FIG. 19, the pivot axis 1713 is aligned with the axis of rotation 112 of the drive wheel. In another embodiment, the pivot axis is positioned below the axis of rotation 173 of the front anti-tip wheel. In the embodiments illustrated by FIGS. 16 and 19B, the pivot axis 1710 is positioned forward of a midplane 1750 (i.e. a plane located at a position half way between the front and the back of the frame). The illustrated pivot axis 1710 is located at or near a bottom of the frame. Nevertheless, pivot axis 1710 can also be positioned very near or even at or behind the mid-plane 1750.

The pivot arms 1734, 1790 may be substantially rigid members or may be flexible to provide inherent shock absorbing properties in the pivot arm. The pivot arms 1734, 1790 may be made from a wide variety of materials, including, but not limited to, metals and plastics.

The connecting link 1711 couples the front anti-tip pivot arm 1790 to the rear anti-tip pivot arm 1734. The connecting link may take a variety of different forms and may be coupled to the pivot arms 1734, 1790 in a wide variety of different ways. The connecting link 1711 may have any configuration that transfers motion between the front anti-tip pivot arm 1790 and the rear anti-tip pivot arm 1734. In the example illustrated by FIG. 17, the connecting link 1711 is a rigid member that is pivotally connected to the front anti-tip pivot arm 1790 at a pivot axis 1792 and that is pivotally connected to the rear anti-tip pivot arm at a pivot axis 1794. The connecting link could also be flexible, or extendible in length and can be coupled to the pivot arms in any manner.

The biasing member 172 can take a wide variety of different forms. Any spring device, devices, or assembly can be used as the biasing member. The biasing member may be a single spring, a bi-directional spring, or multiple spring elements. The biasing member may include a shock absorbing component, for example, the biasing member may be a shock absorber with a spring return 2006 (See FIG. 20C). In the example illustrated by FIGS. 16 and 17, the biasing member 172 is disposed between a mount 1790 that is fixed to the frame and the pivot arm 1734. The biasing member 172 illustrated by FIG. 16 is a compression spring that biases the rear anti-tip arm 1734 downward as indicated by arrow 1762. A stop 194 may be fixed to the frame to limit downward movement of the pivot arm 1734 with respect to the frame. In the embodiment illustrated by FIGS. 16 and 17, the downward biasing of the rear pivot arm 1734 causes downward biasing of the forward anti-tip arm 1790 through the connecting link 1711 as indicated by arrow 1764.

Figure 16A:
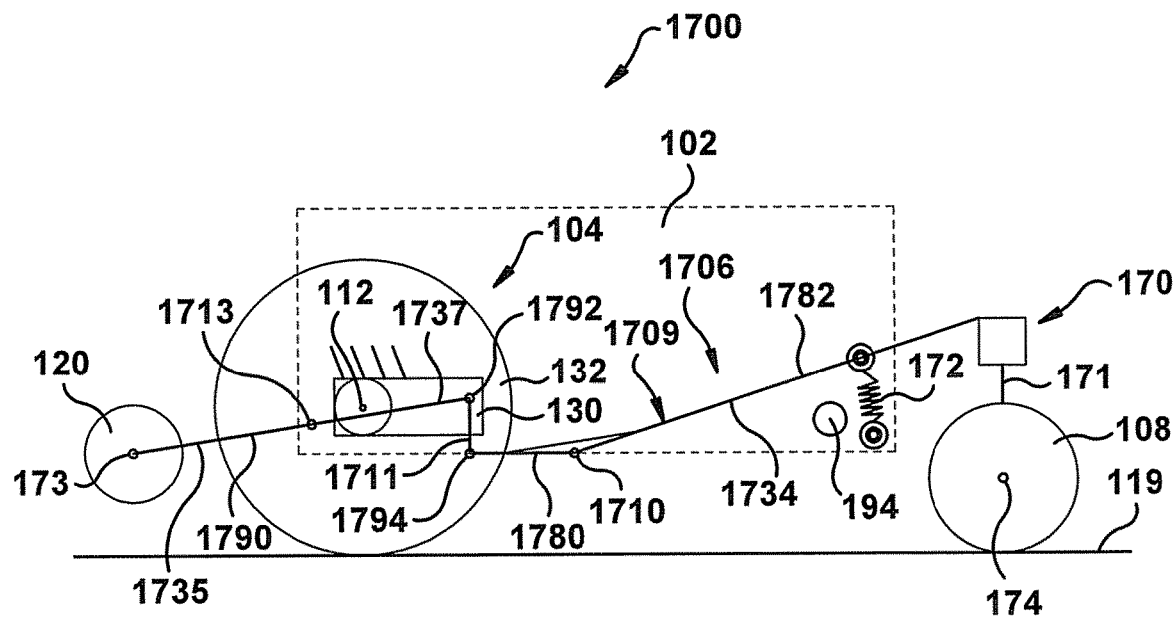
FIG. 16A is a side view of a second configuration of the wheelchair of FIG. 16.
Figure 16B:
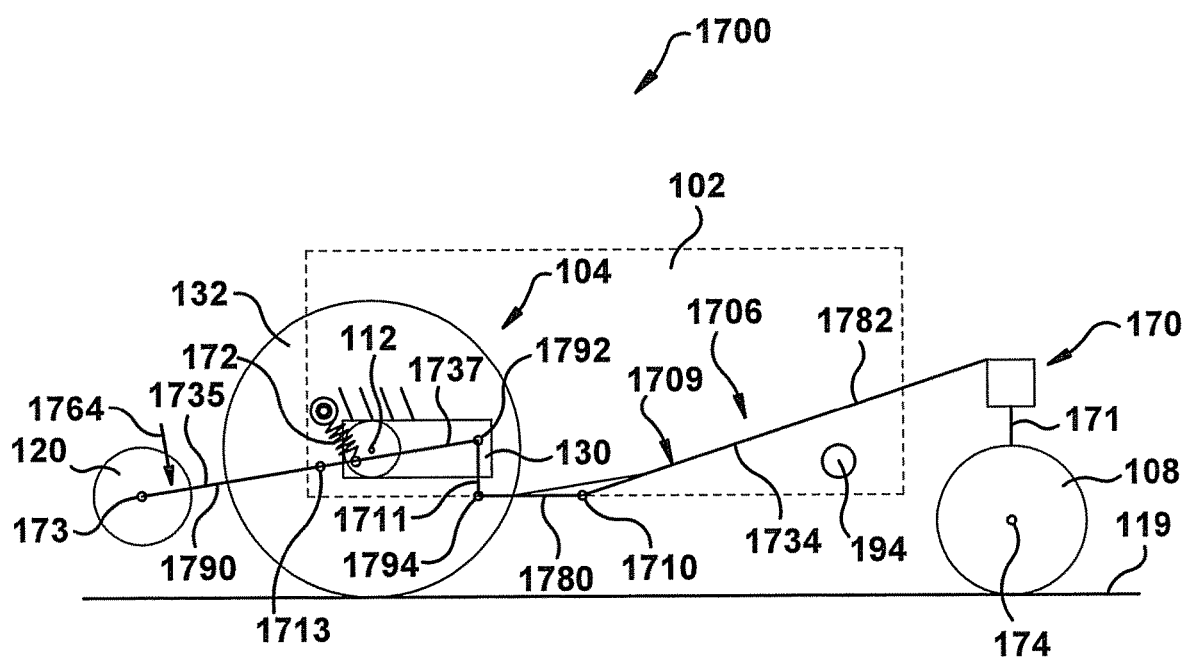
FIG. 16B is a side view of a third configuration of the wheelchair of FIG. 16.
Figure 16C:
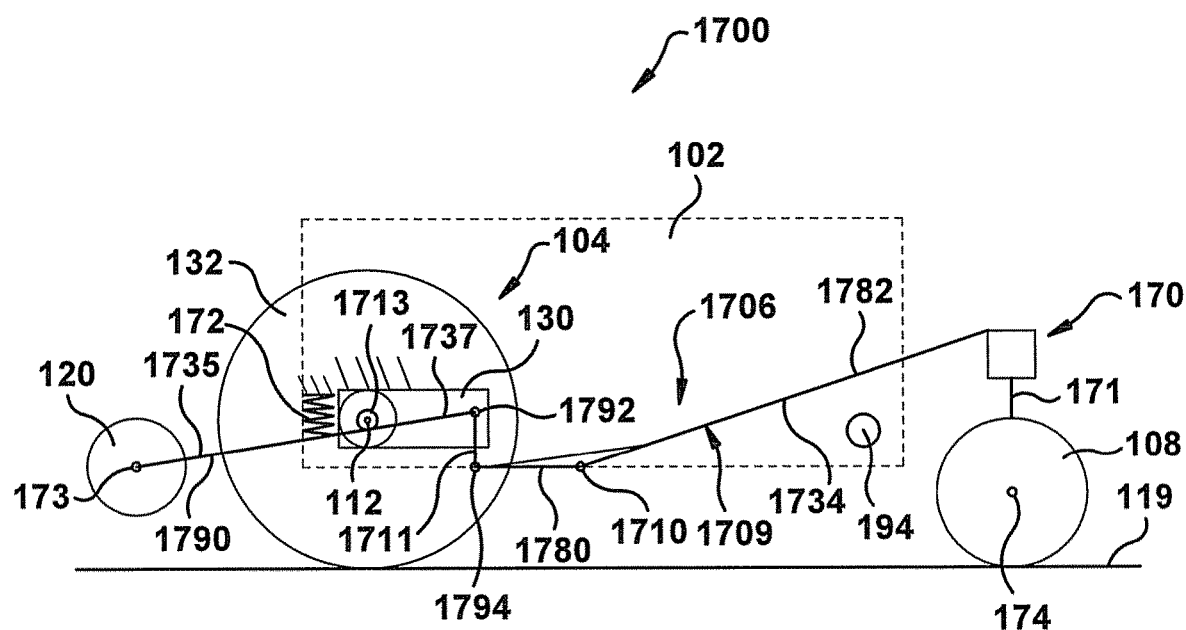
FIG. 16C is a side view of a fourth configuration of the wheelchair of FIG. 16.

FIGS. 16A-16C illustrate that the biasing member 172 can be an extension spring or a compression spring positioned at a variety of different locations to provide the downward front and rear pivot arms 1790, 1734 biasing. For example, in FIG. 16A the biasing member 172 is an extension spring positioned below the rear anti-tip arm 1734. In FIG. 16B the biasing member 172 is an extension spring positioned above the front anti-tip arm 1790. In FIG. 16C, the biasing member 172 is a compression spring positioned above the front anti-tip arm 1790. In another embodiment, the biasing member 172 is configured to bias the front and rear anti-tip arms 1790, 1734 upward. This can be accomplished in a variety of different ways. For example, in the examples illustrated by FIGS. 16 and 16C, the biasing member 172 can be changed from a compression spring to an extension spring and in the examples illustrated by FIGS. 16A and 16B, the biasing member 172 can be changed from an extension spring to a compression spring. In another embodiment, the biasing member 172 is configured to bias the pivot arm 134 to a home position, such as the position relative to the frame illustrated by FIG. 16.

Biasing to a home position can be accomplished in a variety of different ways. For example, a bidirectional spring can be coupled to the linkage 1709 and/or any one or more of the spring arrangements that bias the pivot arms downward can be used with any one or more of the spring arrangements that bias the pivot arms upward. In an exemplary embodiment, whether the biasing member 172 biases the arms upward, downward, or to a home position, the biasing member causes the rear anti-tip wheel 108 to engage the horizontal support surface 119 and the front anti-tip wheel to be spaced apart from the horizontal support surface when the wheelchair is at rest on the horizontal support surface. In another embodiment, the front anti-tip wheel 120 engages the horizontal support surface 119 when the wheelchair is at rest on the horizontal support surface.

The front anti-tip wheel 120 is connected to the forward end 1735 of the front anti-tip arm 1790 and the rear anti-tip wheel is connected to the rearward end 1782 of the rear anti-tip arm 1734. As noted above, the first and second front anti-tip wheels 120, 121 and the rear anti-tip wheels 108 may take a wide variety of different forms. In the embodiment illustrated by FIGS. 16 and 17, the front anti-tip wheels 120, 121 are mounted for rotation only about a substantially horizontal axis 173 and the rear anti-tip wheels 108 are wheels of caster assemblies 170.

Figure 19A:
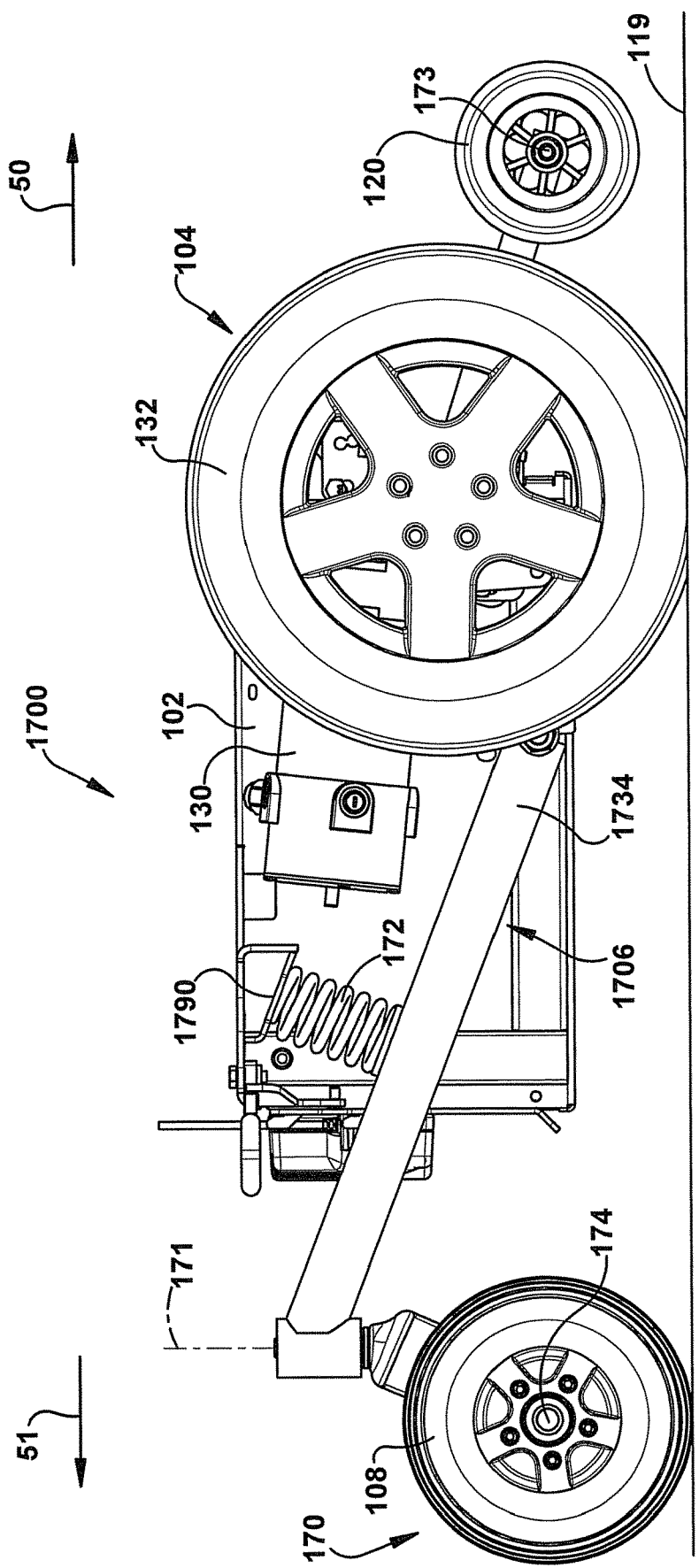
FIG. 19A is a side view of an exemplary embodiment of a wheelchair.
Figure 19B:
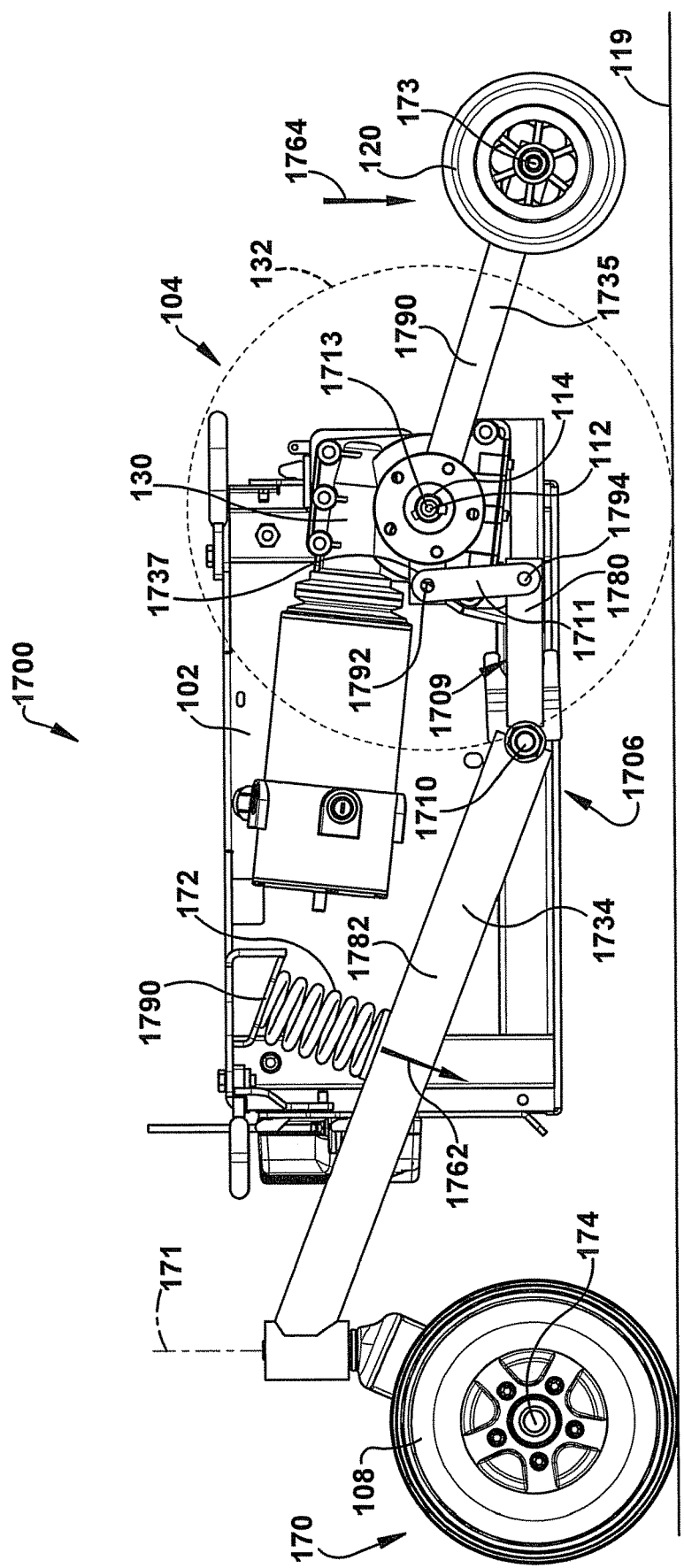
FIG. 19B is a side view of the wheelchair of FIG. 19A, with a drive wheel shown schematically to more clearly illustrate a suspension assembly of the chassis.

FIGS. 19A-19F illustrate a more specific embodiment of the wheelchair 1700 illustrated by FIGS. 16 and 17. It should be understood that the present application is not limited to the more specific embodiment illustrated by FIGS. 19A-19D. FIG. 19A illustrates the wheelchair 1700 at rest in the normal operating position on the horizontal support surface 119. FIG. 19B illustrates the wheelchair of FIG. 19A with the drive wheel 132 shown schematically to more clearly illustrate the suspension 1706.

Figure 18:
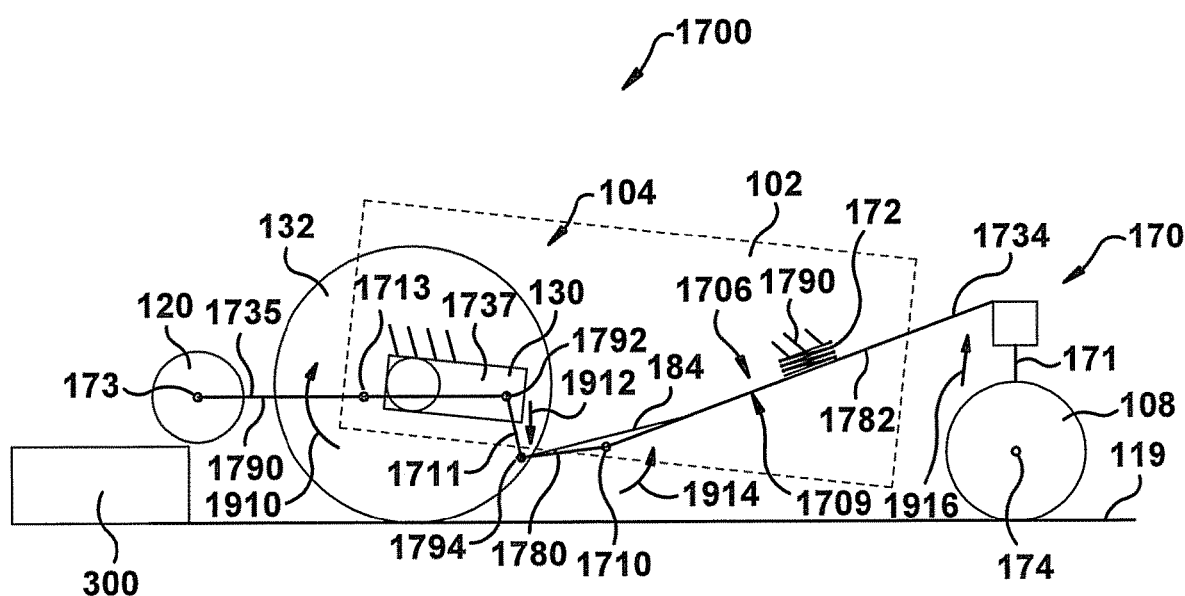
FIG. 18 is a side view of the wheelchair of FIG. 16 traversing an obstacle.
Figure 19C:
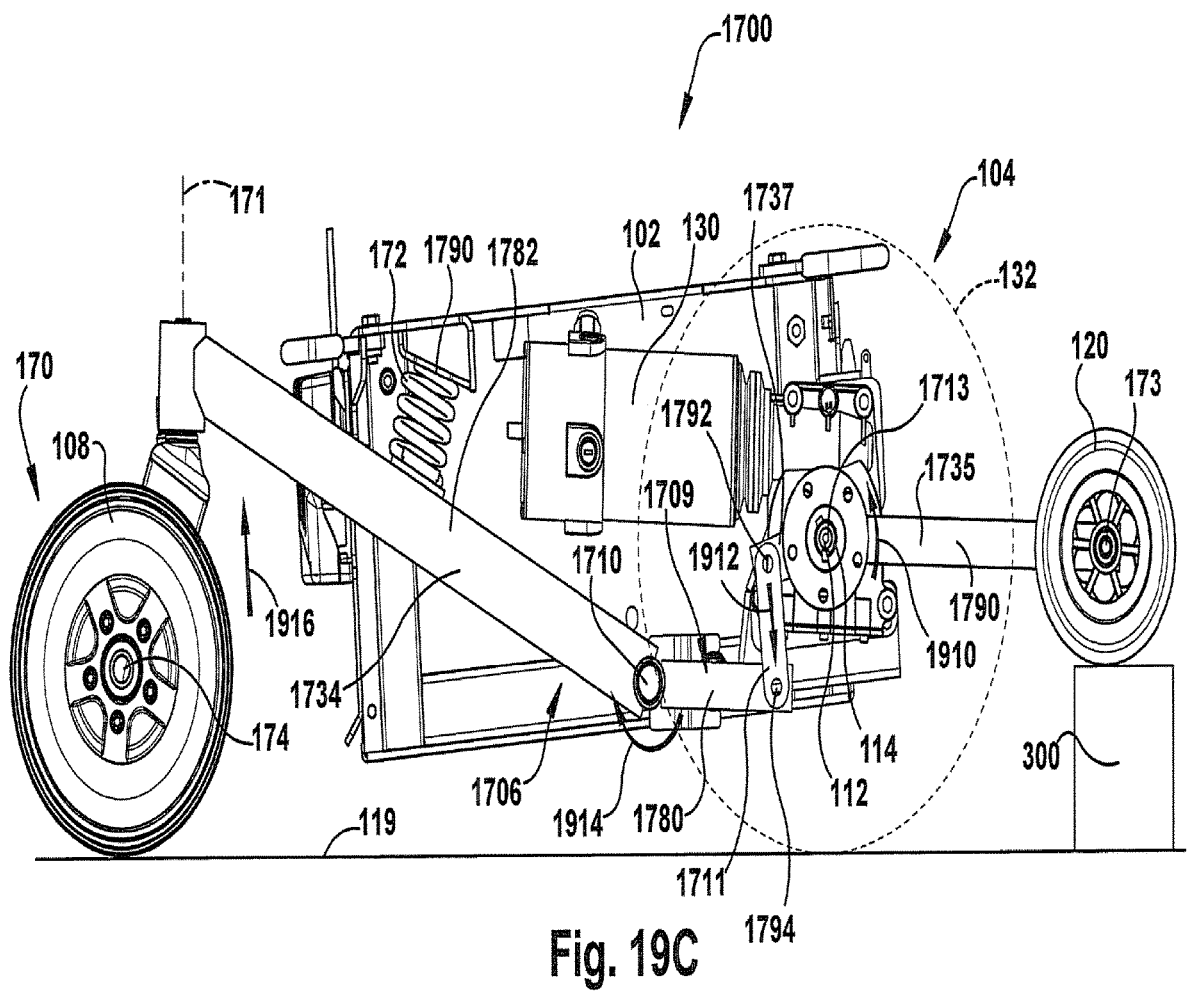
FIG. 19C shows a front anti-tip wheel of the chassis of FIG. 19B traversing an obstacle.

FIGS. 18 and 19C-19E illustrate operation of the wheelchair 1700 to traverse over an obstacle 300. Referring to FIGS. 18 and 19C, the drive wheels 132 bring the front anti-tip wheels 120 into engagement with the obstacle 300. The drive wheels 132 force the anti-tip wheels 120, 121 up and onto the obstacle. This cause the anti-tip wheels 120 to move upward with respect to the frame 102, which, in turn, causes the anti-tip wheels 108 to move upward relative to the frame 102. In the embodiments illustrated by FIGS. 18 and 19C, the linkage 1709 transfers the upward movement of the front anti-tip wheel 120 to the rear anti-tip wheel 108 against the biasing force of the biasing member 172. When anti-tip wheel 120 moves upward, the front anti-tip pivot arm 1790 rotates about the pivot axis 1713 as indicated by arrow 1910. In the embodiment illustrated by FIG. 19C, the pivot axis 1713 is coincident with the axis of rotation 112 of the drive wheel 132, but could be positioned at any location. The rotation of the front anti-tip pivot arm 1790 forces the connecting link 1711 downward as indicated by arrow 1912. The downward movement of the connecting link 1711 causes the rear anti-tip pivot arm 1734 to rotate about the pivot axis 1710 as indicated by arrow 1914. The rearward portion 1782 of the rear anti-tip pivot arm 1734 moves relatively upward with respect to the frame against the biasing force of the biasing member 172 as indicated by arrow 1916. The drive wheels 132 and the rear anti-tip wheels 108 remain on the ground and the upward movement (indicated by arrow 302) of the front anti-tip wheels 120 may cause the frame 102 to cant.

Figure 19D:
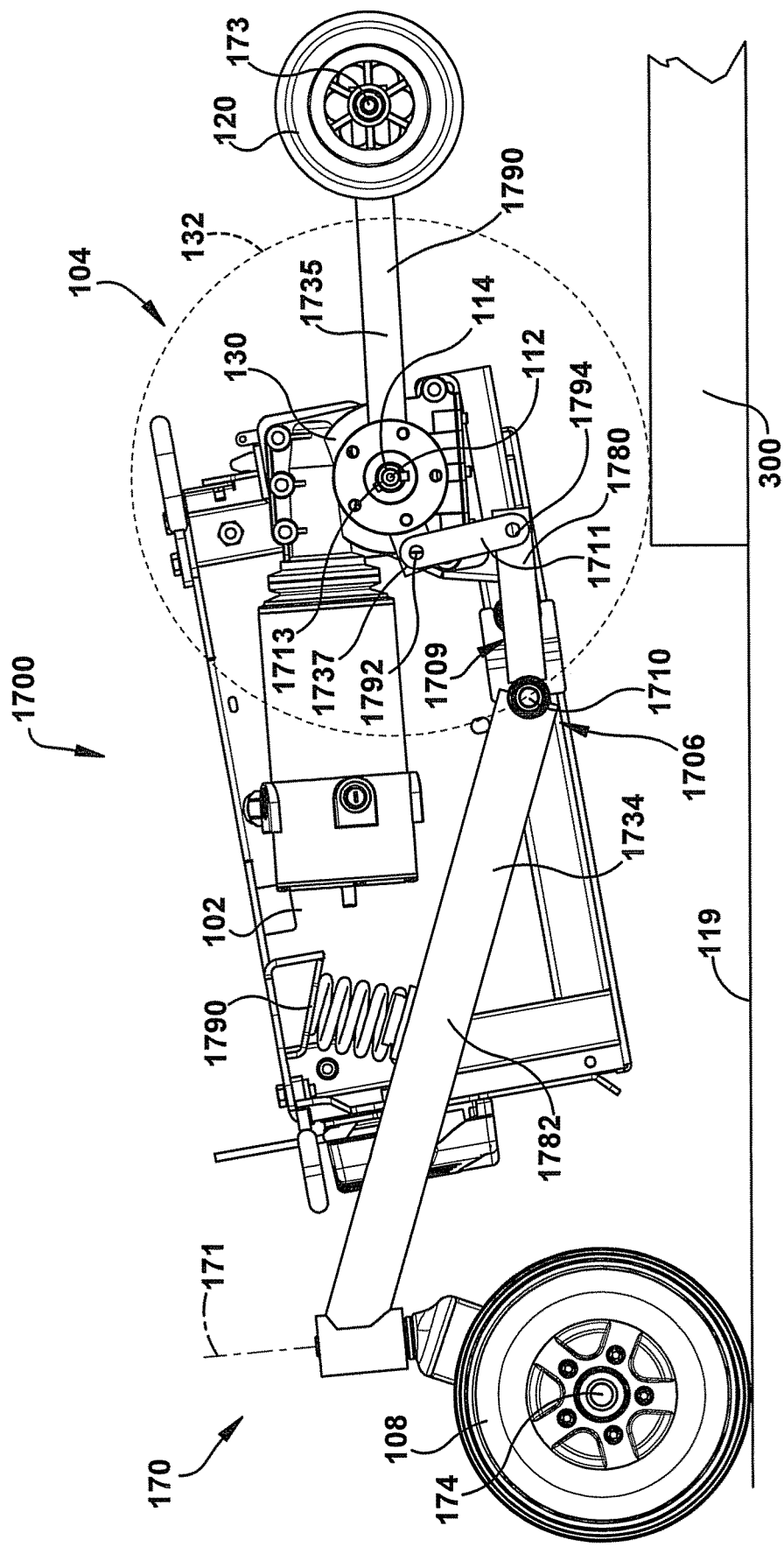
FIG. 19D shows a drive wheel of the chassis of FIG. 19B traversing an obstacle.
Figure 19E:
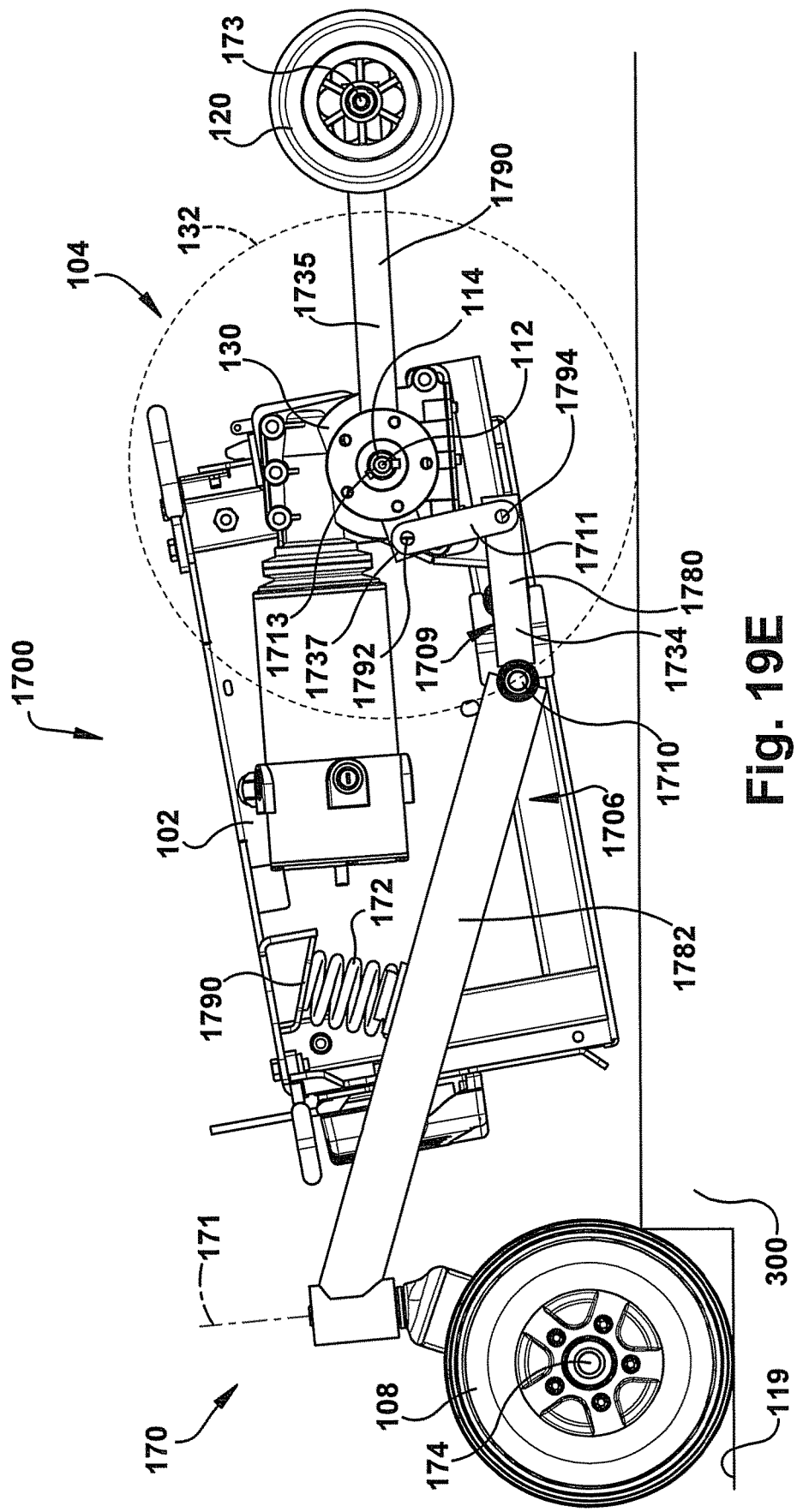
FIG. 19E shows a rear anti-tip wheel of the chassis of FIG. 19B traversing an obstacle.

Referring to FIG. 19D, the drive wheels 132 continue to drive the wheelchair 1700 forward. The drive wheels 132 engage and climb over the obstacle 300. Referring to FIG. 19E, the drive wheels 132 move the wheelchair 1700 further forward on the obstacle 300. The rear anti-tip wheels 108 engage the obstacle 300. The biasing member 172 cushions the impact between the rear anti-tip wheels 108 and the obstacle. The drive wheels 132 continue to drive the wheelchair 1700 forward and pull the rear anti-tip wheels 108 up onto the obstacle 300.

Figure 19F:
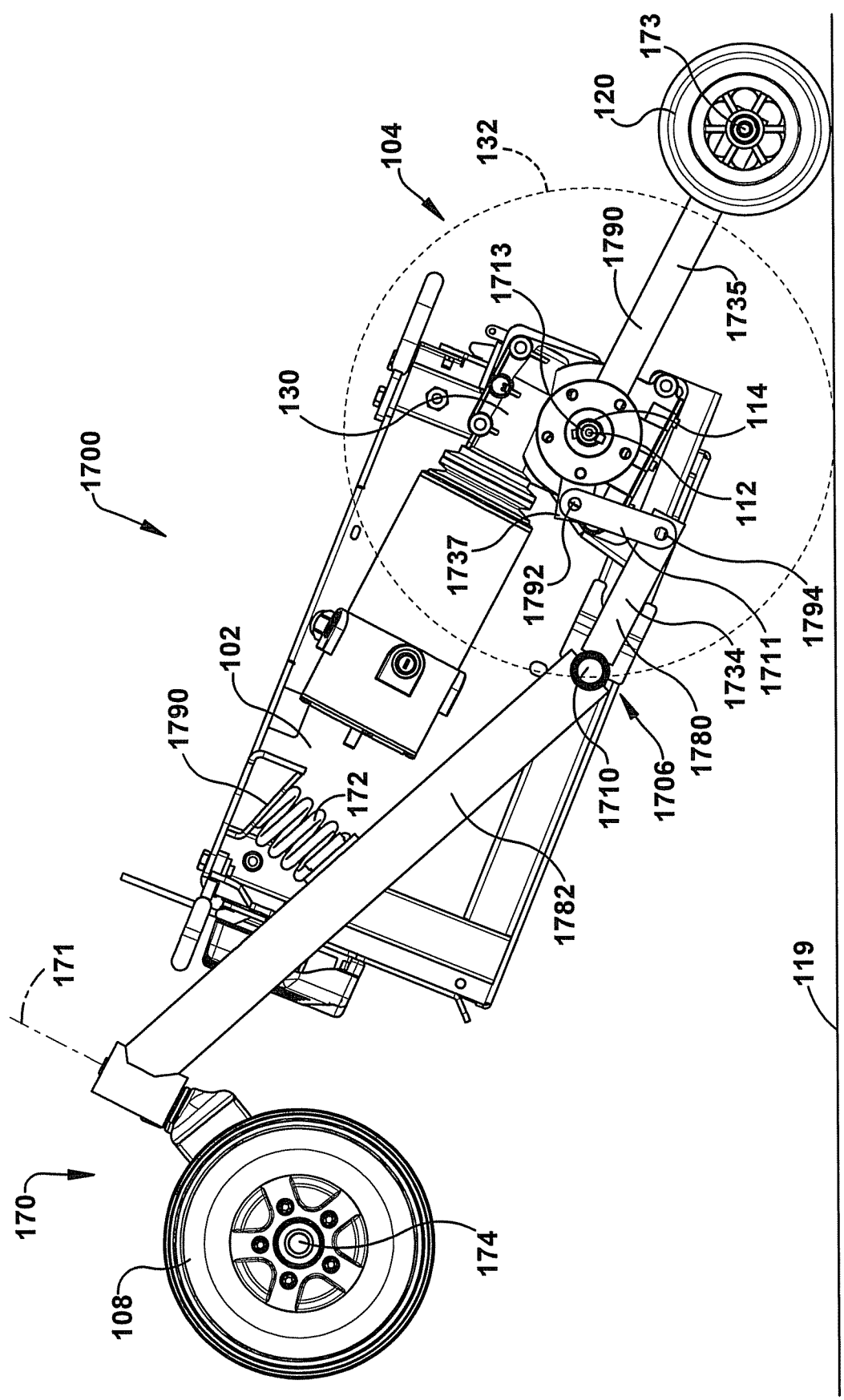
FIG. 19F shows the front anti-tip wheel of the chassis of FIG. 19B in engagement with a support surface to inhibit further tipping.

Referring to FIG. 19F, a variety of situations can cause forward tipping of a wheelchair. For example, traveling down a hill, decelerating rapidly, and driving off of an obstacle, such as a curb can cause forward tipping. In the example illustrated by FIG. 19F, the front anti-tip wheels 120 engage the support surface to prevent excessive forward tipping. When the front anti-tip wheels 120, 121 engage the support surface 119, the biasing member 172 is compressed by the linkage 1709 to cushion the impact with the support surface.

In one exemplary embodiment, the amount of force applied by the biasing member 172, and/or the position of the pivot axis 1713 can be adjusted or selected to control the amount of resistance to forward tip provided by the front anti-tip pivot arm 1790. For example, the resistance to forward tip can be increased for a heavy user by increasing a spring constant of the biasing member and/or shortening the distance between the pivot axis 1713 and the front anti-tip wheel 120. The spring constant of the biasing member can be decreased and/or the distance between the pivot axis 1713 and the front anti-tip wheel 120 can be increased to provide smoother curb climbing for a lighter user that may need less resistance to forward tip.

Figure 23:
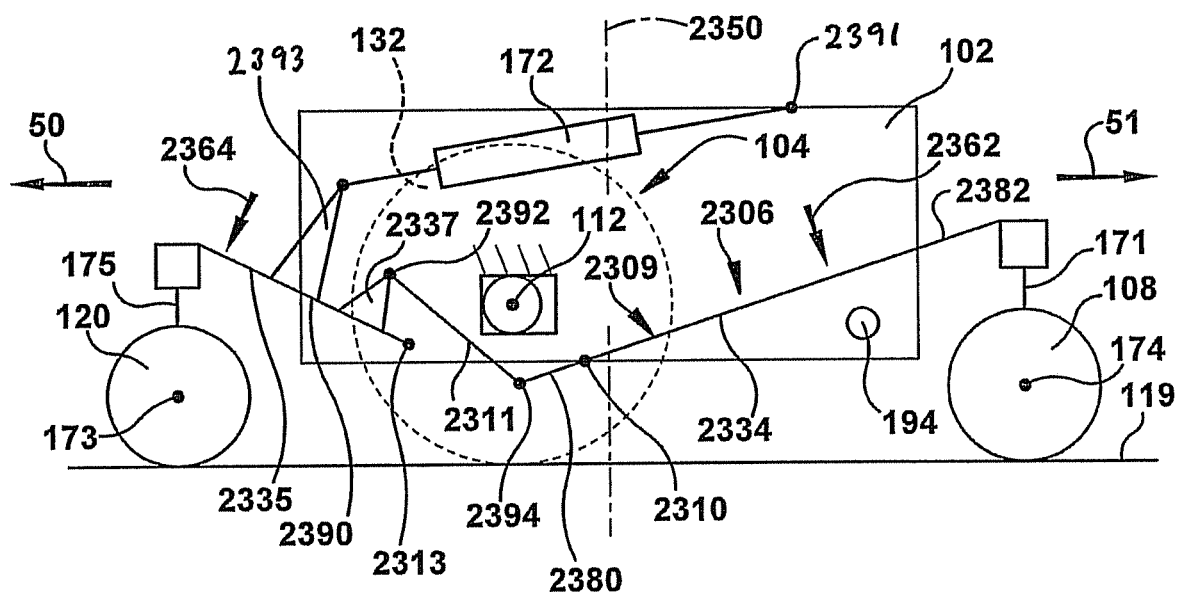
FIG. 23 is a side view of another embodiment of a wheelchair.
Figure 24:
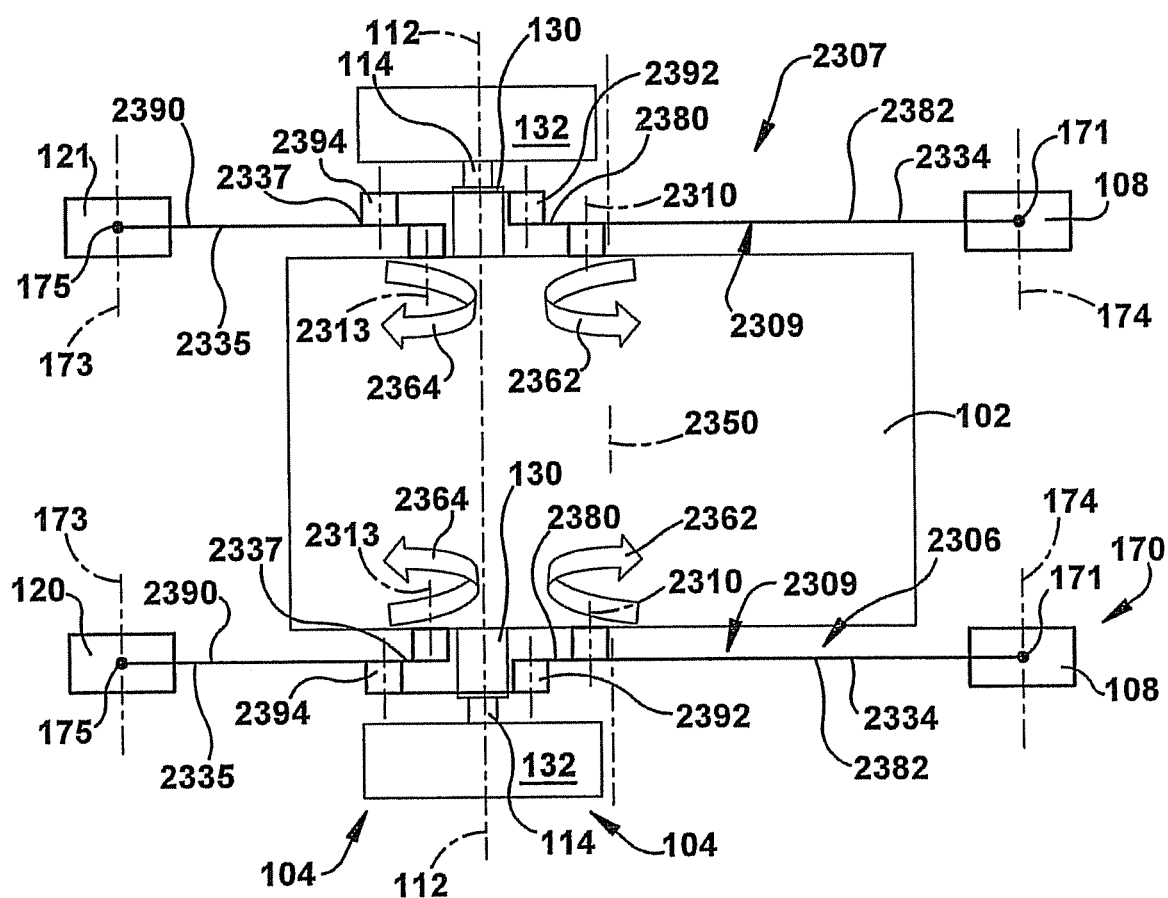
FIG. 24 is a top view of the wheelchair shown in FIG. 23.

FIGS. 23 and 24 illustrate another embodiment of a wheelchair 2300. The wheelchair 2300 includes a frame 102, first and second drive assemblies 104, 105, first and second suspension assemblies 2306, 2307, first and second front anti-tip wheels 120, 121, and one or more rear anti-tip wheels 108. Each drive assembly 104, 105 is coupled to the frame 102. In the embodiment illustrated by FIGS. 23 and 24, the drive assemblies are fixed to the frame 102. However, the drive assemblies 104, 105 can alternatively be coupled to the frame in a manner that allows relative movement between the drive assemblies and the frame 102. For example, the drive assemblies 104, 105 can be coupled to the frame 102 using any of the suspension assemblies disclosed in this application or any other suspension arrangement.

In the example illustrated by FIGS. 23 and 24, the suspension assemblies 2306, 2307 are mirror images of one another. As such, only suspension assembly 2306 is described in detail. In the exemplary embodiment, a front anti-tip wheel 120 is positioned forward of the drive wheels 122 and the rear anti-tip wheel 108 is positioned rearward of the drive wheels. The suspension 2306 includes a linkage 2309 and a biasing member 172. The linkage 2309 couples the front anti-tip wheel 120 to the rear anti-tip wheel 108 such that movement of the front anti-tip wheel relative to the frame 102 is transferred to the rear anti-tip wheel 108 and/or vice versa. The linkage 2309 may take a wide variety of different forms. Any arrangement that transfers motion of the front anti-tip wheel 120 relative to the frame 102 to the rear anti-tip wheel 108 and/or vice versa can be employed. In the exemplary embodiment illustrated by FIGS. 23 and 24, the linkage 2309 couples the front anti-tip wheel 120 to the rear anti-tip wheel 108 such that upward movement of the front anti-tip wheel 120 relative to the frame 102 causes upward movement of the rear anti-tip wheel 108 relative to the frame and vice versa. A wide variety of different linkages or arrangements may couple the front anti-tip wheel 120 and the rear anti-tip wheel 108 such that upward movement of the front anti-tip wheel 120 relative to the frame 102 causes upward movement of the rear anti-tip wheel 108 relative to the frame and/or vice versa. The illustrated linkage 2309 is but one example of the many different arrangements that may be used.

The linkage 2309 includes a front anti-tip pivot arm 2390, a rear anti-tip pivot arm 2334, and a connecting link 2311. The front anti-tip pivot arm 2390 is pivotally connected to the frame 102 at a pivot axis 2313. A first portion 2335 of the front anti-tip pivot arm 2390 extends forward from the pivot axis 2313 and a second portion 2337 of the front anti-tip pivot arm 2390 extends upward from the first portion 2335. The rear anti-tip pivot arm 2334 is pivotally coupled to the frame 102 at a pivot axis 2310. A forward portion 2380 of the rear anti-tip pivot arm 2334 extends forward from the pivot axis 2310 and a rearward portion 2382 of the rear anti-tip pivot arm 2334 extends rearward from the pivot axis. The pivot axis 2313 and the pivot axis 2310 can be positioned at a wide variety of different locations. For example, the pivot axis 2313 and the pivot axis 2310 can be positioned at any position on the frame and/or positions below the frame by one or more brackets. In the embodiment illustrated by FIG. 23, the pivot axis 2313 is forward and below the axis of rotation 112 of the drive wheel 132. In the embodiment illustrated by FIG. 23, the pivot axis 2310 is positioned forward of a midplane 2350 (i.e. a plane located at a position half way between the front and the back of the frame). The illustrated pivot axis 2310 is located at or near a bottom of the frame. Nevertheless, pivot axis 2310 can also be positioned very near or even at or behind the mid-plane 2350.

The pivot arms 2334, 2390 may be substantially rigid members or may be flexible to provide inherent shock absorbing properties in the pivot arm. The pivot arms 2334, 2390 may be made from a wide variety of materials, including, but not limited to, metals and plastics.

The connecting link 2311 couples the front anti-tip pivot arm 2390 to the rear anti-tip pivot arm 2334. The connecting link may take a variety of different forms and may be coupled to the pivot arms 2334, 2390 in a wide variety of different ways. The connecting link 2311 may have any configuration that transfers motion between the front anti-tip pivot arm 2390 and the rear anti-tip pivot arm 2334. In the example illustrated by FIG. 23, the connecting link 2311 is a rigid member that is pivotally connected to the front anti-tip pivot arm 2390 at a pivot axis 2392 and that is pivotally connected to the rear anti-tip pivot arm at a pivot axis 2394. The connecting link could also be flexible, or extendible in length and can be coupled to the pivot arms in any manner.

The biasing member 172 can take a wide variety of different forms. Any spring device, devices, or assembly can be used as the biasing member. The biasing member may be a single spring, a bi-directional spring, or multiple spring elements. The biasing member may include a shock absorbing component, for example, the biasing member may be a shock absorber with a spring return 2006 (See FIG. 20C). In the example illustrated by FIG. 23, the biasing member 172 is connected (optionally pivotally connected) between a first mount 2391 that is connected to the frame 102 and a second mount 2393 that is connected to the front pivot arm 2390. The biasing member 172 illustrated by FIG. 23 is a compression spring that biases the front anti-tip arm 2390 downward as indicated by arrow 2364. A stop 194 may be fixed to the frame to limit downward movement of the pivot arm 2334 and/or the pivot arm 2390 with respect to the frame. In the embodiment illustrated by FIG. 23, the downward biasing of the front pivot arm 2390 causes downward biasing of the rear anti-tip arm 2334 through the connecting link 2311 as indicated by arrow 2362.

Figure 23A:
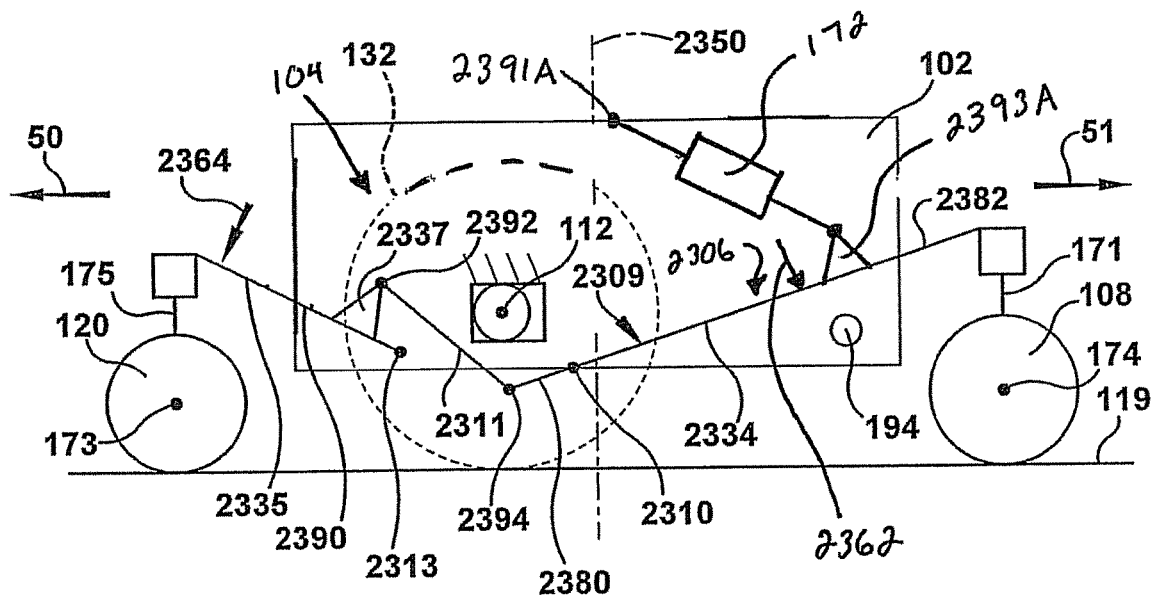
FIG. 23A is a side view of another embodiment of a wheelchair.

The embodiment illustrated by FIG. 23A is similar to the embodiment illustrated by FIG. 23, except, the biasing member 172 is connected (optionally pivotally connected) between a first mount 2391A that is connected to the frame 102 and a second mount 2393A that is connected to the rear pivot arm 2334 (instead of the front pivot arm 2390). In the embodiment illustrated by FIG. 23A, the downward biasing of the rear pivot arm 2334 causes downward biasing of the front anti-tip arm 2390 through the connecting link 2311 as indicated by arrow 2364.

The biasing member 172 can be an extension spring, a compression spring, or any type of extendible or retractable device or member positioned at a variety of different locations to provide the downward front and rear pivot arms 2390, 2334 biasing. In another embodiment, the biasing member 172 is configured to bias the front and rear anti-tip arms 2390, 2334 upward. This can be accomplished in a variety of different ways. For example, the biasing member 172 can be changed to apply force in the direction opposite the direction indicated by arrow 2364.

In the embodiment illustrated by FIG. 23, the front and rear anti-tip wheels 120, 108 are biased into contact with the support surface. However, the front and rear anti-tip wheels 120, 108 can be biased to any home position. For example, the front anti-tip wheel 120 or the rear anti-tip wheel 108 can be biased to a home position that is above the support surface. Biasing to a home position can be accomplished in a variety of different ways. For example, a bidirectional spring can be coupled to the linkage 2309 and/or any one or more spring arrangements that bias the pivot arms downward can be used with any one or more spring arrangements that bias the pivot arms upward. In an exemplary embodiment, whether the biasing member 172 biases the arms upward, downward, or to a home position, the biasing member causes the front anti-tip wheel 120 and the rear anti-tip wheel 108 to engage the horizontal support surface 119 when the wheelchair is at rest on the horizontal support surface. In another embodiment, the front anti-tip wheel 120 is spaced apart from the horizontal support surface 119 when the wheelchair is at rest on the horizontal support surface.

The front anti-tip wheel 120 is a wheel of a caster assembly. The illustrated front anti-tip wheel is rotatable about a caster axis 175. The illustrated front anti-tip wheel is connected to the forward end 2335 of the front anti-tip arm 2390 and the rear anti-tip wheel is connected to the rearward end 2382 of the rear anti-tip arm 2334. As noted above, the first and second front anti-tip wheels 120, 121 and the rear anti-tip wheels 108 may take a wide variety of different forms. In the embodiment illustrated by FIG. 23, the front anti-tip wheels 120, 121 and the rear anti-tip wheels 108 are wheels of caster assemblies.

Figure 26A:
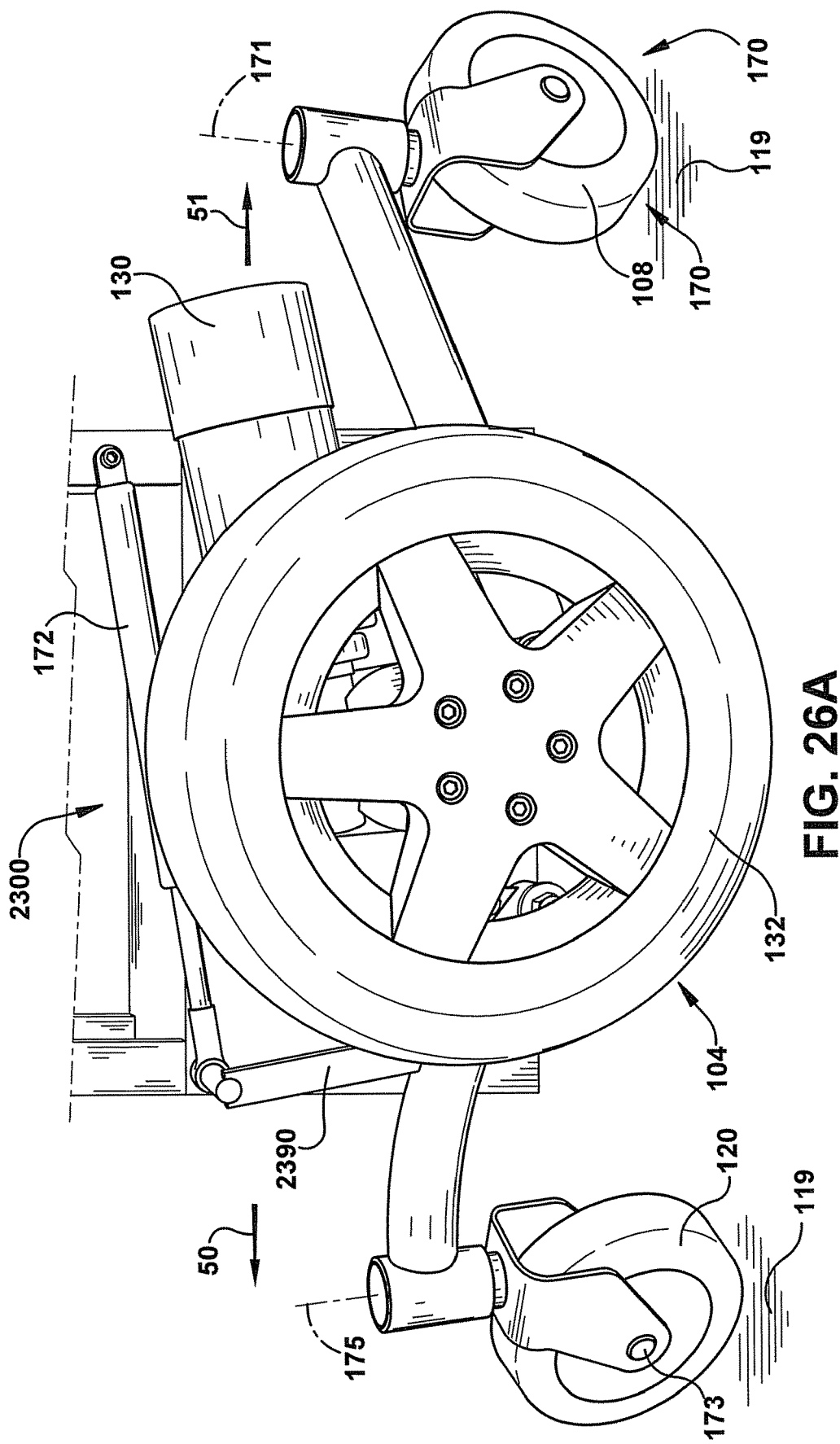
FIG. 26A is a side view of an exemplary embodiment of a wheelchair.
Figure 26B:
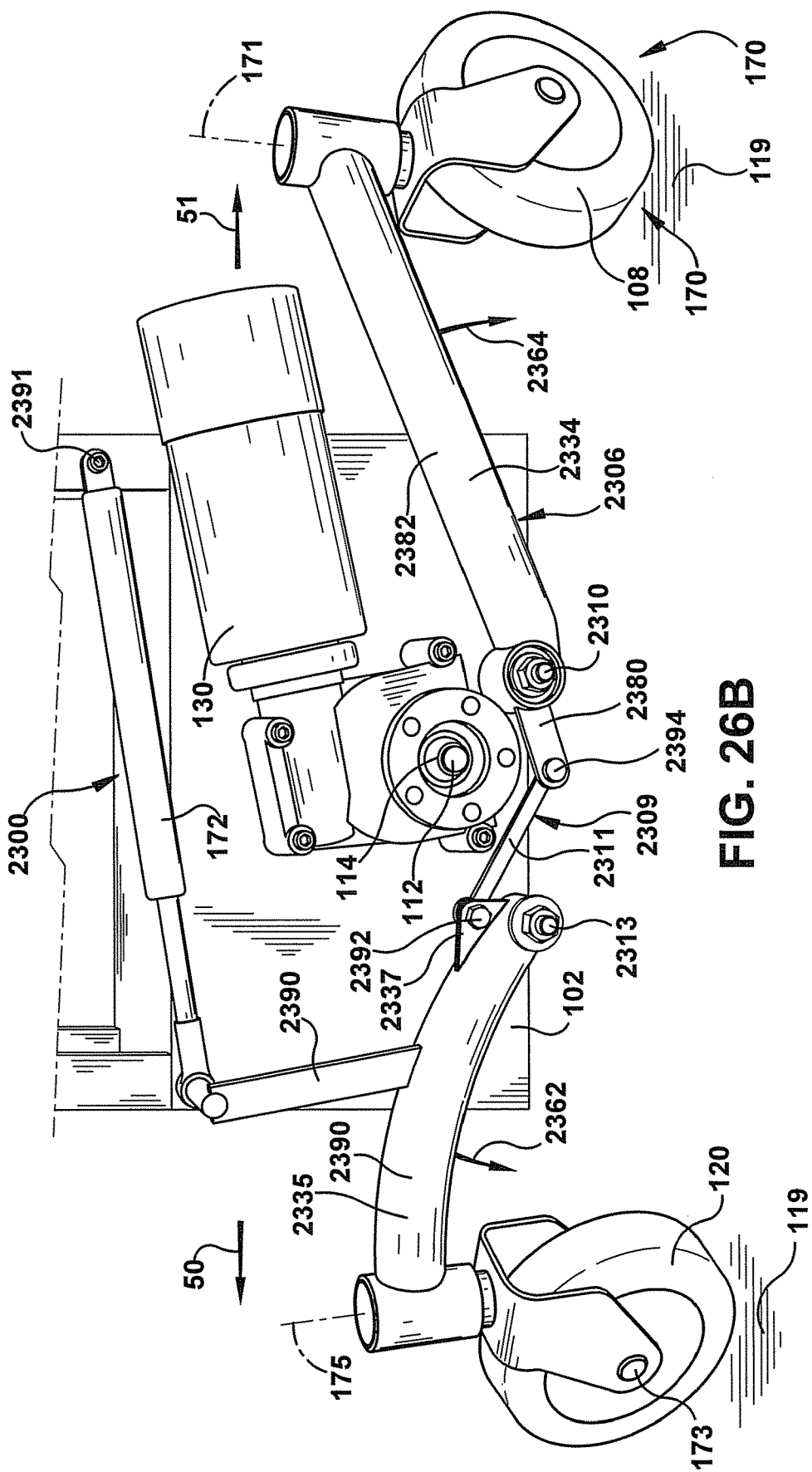
FIG. 26B is a side view of the wheelchair of FIG. 26A, with a drive wheel removed to more clearly illustrate a suspension assembly of the chassis.

FIGS. 26A and 26B illustrate a more specific embodiment of the wheelchair 2300 illustrated by FIGS. 23 and 24. It should be understood that the present application is not limited to the more specific embodiment illustrated by FIGS. 26A and 26B. FIG. 26A illustrates the wheelchair 2300 at rest in the normal operating position on the horizontal support surface 119. FIG. 26B illustrates the wheelchair of FIG. 26A with the drive wheel 132 removed to more clearly illustrate the suspension 2306.

Figure 25A:
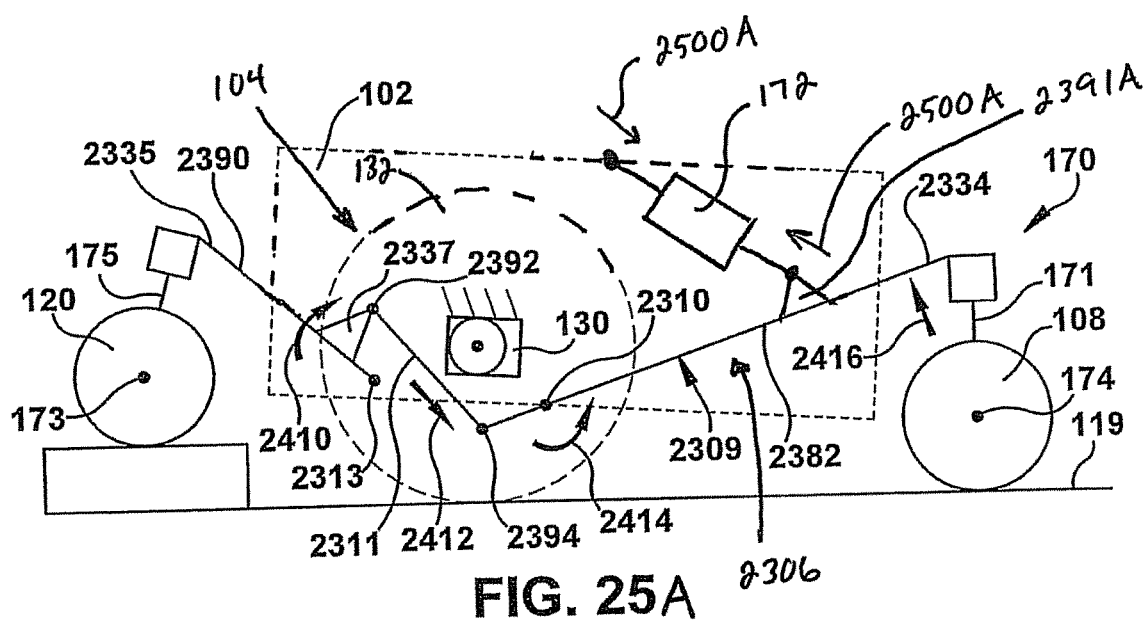
FIG. 25A is a side view of the wheelchair of FIG. 23A traversing an obstacle.
Figure 25:
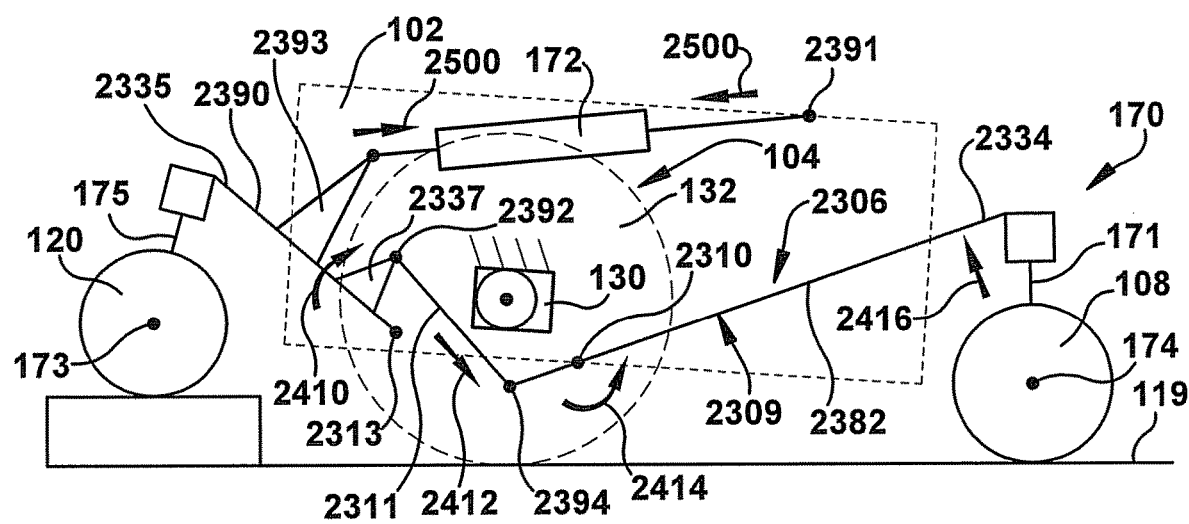
FIG. 25 is a side view of the wheelchair of FIG. 23 traversing an obstacle.

FIGS. 25 and 25A illustrate operation of the exemplary embodiments of the wheelchair 2300 to traverse over an obstacle 300. The drive wheels 132 bring the front anti-tip wheels 120 into engagement with the obstacle 300. The drive wheels 132 force the anti-tip wheels 120, 121 up and onto the obstacle. This cause the anti-tip wheels 120 to move upward with respect to the frame 102, which, in turn, causes the anti-tip wheels 108 to move upward relative to the frame 102. The linkage 2309 transfers the upward movement of the front anti-tip wheel 120 to the rear anti-tip wheel 108 against the biasing force of the biasing member 172. The biasing member 172 is compressed as indicated by arrows 2500 in FIG. 25 and arrows 2500A in FIG. 25A. When anti-tip wheel 120 moves upward, the front anti-tip pivot arm 2390 rotates about the pivot axis 2313 as indicated by arrow 2410. The rotation of the front anti-tip pivot arm 2390 forces the connecting link 2311 downward as indicated by arrow 2412. The downward movement of the connecting link 2311 causes the rear anti-tip pivot arm 2334 to rotate about the pivot axis 2310 as indicated by arrow 2414. The rearward portion 2382 of the rear anti-tip pivot arm 2334 moves relatively upward with respect to the frame against the biasing force of the biasing member 172 as indicated by arrow 2416. The drive wheels 132 and the rear anti-tip wheels 108 remain on the ground and the upward movement (indicated by arrow 302) of the front anti-tip wheels 120 may cause the frame 102 to cant.

The drive wheels 132 continue to drive the wheelchair 2300 forward. The drive wheels 132 engage and climb over the obstacle 300. The drive wheels 132 move the wheelchair 2300 further forward on the obstacle 300. The rear anti-tip wheels 108 engage the obstacle 300. The biasing member 172, through the linkage 2309 in the FIG. 23 embodiment (or directly in the FIG. 23A embodiment), cushions the impact between the rear anti-tip wheels 108 and the obstacle. The drive wheels 132 continue to drive the wheelchair 2300 forward and pull the rear anti-tip wheels 108 up onto the obstacle 300.

A variety of situations can cause forward tipping of a wheelchair. The front anti-tip wheels 120 are configured to engage the support surface to prevent excessive forward tipping. When the front anti-tip wheels 120, 121 engage the support surface 119, the biasing member 172 is compressed by the linkage 2309 to cushion the impact with the support surface.

In one exemplary embodiment, the amount of force applied by the biasing member 172, and/or the position of the pivot axis 2313 can be adjusted or selected to control the amount of resistance to forward tip provided by the front anti-tip pivot arm 2390. For example, the resistance to forward tip can be increased for a heavy user by increasing a spring constant of the biasing member and/or shortening the distance between the pivot axis 2313 and the front anti-tip wheel 120. The spring constant of the biasing member can be decreased and/or the distance between the pivot axis 2313 and the front anti-tip wheel 120 can be increased to provide smoother curb climbing for a lighter user that may need less resistance to forward tip.

In the embodiments disclosed above, the motion of one or more wheels with respect to the frame may be linked to the motion of one or more other wheels with respect to the frame. The wheels may be linked in a wide variety of different ways. For example, one or more rigid links may couple the relative motion of one or more wheels relative to the frame to one or more other wheels with respect to the frame or a variable length link may couple the relative motion of one or more wheels to one or more other wheels. FIGS. 20A, 20B, and 20C illustrate examples of variable length links. FIG. 20A illustrates a shock absorber 2002, FIG. 20B illustrates a spring 2004, and FIG. 20C illustrates a shock absorber with a spring return 2006. In these examples, the variable length links are pivotally connected to pivot arms, but the variable length links could be coupled to the wheels in any manner. A wide variety of other variable length links may also be used.

In one exemplary embodiment, one or more of the anti-tip wheels 120, 121, 108 of the wheelchair are replaced with an anti-tip structure that is not a wheel. Such an arrangement may be particularly useful applications where the corresponding wheel is normally off the ground. For example, the front anti-tip wheels 102, 121 in the embodiments disclosed above may be replaced with an anti-tip structure that is not a wheel. However, an anti-tip structure that is not a wheel may be used in any wheelchair configuration. Anti-tip wheels may be replaced with a wide variety of different anti-tip structures. For example, any structure capable of engaging an obstacle (for example, a curb), and sliding or otherwise moving over the obstacle can be used. Examples of anti-tip structures that can be used in place of a wheel include, but are not limited to, members with inclined surfaces (such as inclined skis), continuous tracks (such as those used on tanks), cylinders having a spiral flange (such as those used on screw propelled vehicles), rotatable geometric shapes (such as triangles, squares, etc), and the like.

FIGS. 21A and 21B illustrate embodiments where the anti-tip structure is a ski 2100. The illustrated ski 2100 has arched contact surfaces 2102, but can have any shape and may be flat. FIGS. 22A and 22B illustrate embodiments where the anti-tip structures are continuous tracks 2200. The tracks 2200 include belts 2202 disposed around rollers 2204, such that the belts are moveable around the rollers.

The anti-tip structures may be mounted to the wheelchair in any orientation with respect to the wheelchair. In the embodiments illustrated by FIGS. 21A, 21B, 22A, and 22B, bottom or contact surfaces 2102, 2202 of the anti-tip structures are inclined upward, away from a support arm 2104 that connects or couples the anti-tip structure to the frame. This upward inclination facilitates movement of the anti-tip structure over the obstacle.

The anti-tip structures 2100, 2200 can be mounted or coupled to the support arm 2104 in a variety of different ways. In the embodiments illustrated by FIGS. 21A and 22A, the anti-tip structures 2100, 2200 are fixed to the support arm 2104. In the embodiments illustrated by FIGS. 21B and 22B, the anti-tip structures 2100, 2200 are moveably coupled to the support arm 2104. The anti-tip structures 2100, 2200 can be moveably coupled to the support arm 2104 in a variety of different ways. Any arrangement that allows the anti-tip structure 2100, 2200 to move with respect to the support arm 2104 can be used. In the illustrated examples, the anti-tip structures 2100, 2200 are pivotally connected to the support arm 2104. An optional biasing member 2150, such as a spring, biases the anti-tip structure 2100, 2200 forward as indicated by arrow 2152. The biasing member 2150 cushions impact between the anti-tip structure 2100, 2200.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, pivotal connections can be made of any number of structures including bearing assemblies, pins, nuts and bolts, and frictionless sleeve assemblies. Additionally, springs or shock absorbers can be added between pivoting and non-pivoting components to limit, dampen, or somewhat resist the pivotal motions of these components. Therefore, the invention, in its broader aspects, is not limited to the specific details, the representative apparatus, and illustrative examples shown and described. Accordingly, departures can be made from such details without departing from the spirit or scope of the applicant's general inventive concept.

What is claimed:

1. A power wheelchair comprising:
    a frame;
    a suspension assembly having:
        a rear arm having a pivot connection to a lower portion of the frame and a body extending rearward and upward from the pivot connection and extending rearward of the frame;
        a drive assembly mounting arm having a pivot mount and a body extending forward of the pivot mount, the pivot mount located forward of the rear arm pivot connection;
        a link having a body connecting the rear arm to the drive assembly mounting arm;
        a first biasing member in contact with the frame and the rear arm;
        a second biasing member in contact with the frame and the drive assembly mounting arm; and
        a rear wheel connected to the rear arm.

2. The power wheelchair of claim 1 further comprising a front anti-tip assembly having:
    a front arm pivotably connected to a lower front portion of the frame and extending forward of the frame; and
    an anti-tip wheel connected to the front arm, the front arm maintaining the anti-tip wheel above a horizontal supporting surface of the wheelchair.

3. The power wheelchair of claim 1 wherein the first biasing member contacts a central portion of the rear arm.

4. The power wheelchair of claim 1 wherein the first biasing member comprising a spring.

5. The power wheelchair of claim 1 wherein the first biasing member comprises a spring and shock absorber.

6. The power wheelchair of claim 1 wherein the drive assembly mounting arm independently pivots with respect to the rear arm.

7. The power wheelchair of claim 1 wherein the link transfers motion from the rear arm to the drive assembly mounting arm.

8. The power wheelchair of claim 1 wherein the link allows the drive assembly mounting arm to independently move with respect to the rear arm.

9. The power wheelchair of claim 1 wherein the link comprises a rigid link.

10. The power wheelchair of claim 1 wherein the link comprises a flexible link.

11. The power wheelchair of claim 1 wherein the link comprises an extendable link.

12. The power wheelchair of claim 1 wherein the link comprises a spring and shock absorber.

13. The power wheelchair of claim 1 wherein the rear arm pivot connection and the drive assembly mounting arm pivot mount are proximate a central lower portion of the frame.

14. A power wheelchair comprising:
    a frame;
    a suspension system having a plurality links; the plurality of links comprising:
        a first link pivotably connected to a lower central portion of the frame and extending upwardly and rearwardly therefrom;
        a second link pivotably connected with respect to a lower portion of the frame and forward of the first link;
        a third link connected to the first and second links;
        wherein the first link movement is transferred to the second link by the third link;
    a drive wheel connected to the second link to provide a front wheel drive configuration; and
    a rear wheel connected to the first link.

15. The power wheelchair of claim 14 further comprising:
    a fourth link pivotably connected to a lower front portion of the frame and extending forward of the frame; and
    an anti-tip wheel connected to the fourth link, the fourth link maintaining the anti-tip wheel above a horizontal supporting surface of the wheelchair.

16. A power wheelchair comprising:
    a frame;
    a first pivot connection disposed proximate a lower central portion of the frame and on the frame;
    a second pivot connection disposed proximate a lower central portion of the frame and forward of the first pivotal connection;
    a first arm extending rearward and upward from the first pivot connection and extending rearwardly of the frame;

a second arm connected to the second pivot connection and extending forward from the second pivot connection;

a link connected to the first and second pivot connections;

a drive wheel connected to the second arm and wherein the drive wheel axis is forward and above the second pivot connection; and a front wheel connected to the frame and wherein the front wheel is maintained above a horizontal supporting surface of the wheelchair.

* * * * *